(12) United States Patent
Hegemier et al.

(10) Patent No.: US 9,462,093 B2
(45) Date of Patent: Oct. 4, 2016

(54) METHOD AND APPARATUS FOR PERSONALIZING CONSUMER PRODUCTS

(75) Inventors: Darrin G. Hegemier, Del Mar, CA (US); Xin F. Mathers, Poway, CA (US); Peter M. On, Encinitas, CA (US); Yen F. Chang, San Diego, CA (US); Frank M. Tyneski, Austin, TX (US); Terry Favish, Carlsbad, CA (US)

(73) Assignee: Skinit Acquisition LLC, San Diego, CA (US)

( * ) Notice: Subject to any disclaimer, the term of this patent is extended or adjusted under 35 U.S.C. 154(b) by 30 days.

(21) Appl. No.: 14/124,975

(22) PCT Filed: Jun. 8, 2012

(86) PCT No.: PCT/US2012/041667
§ 371 (c)(1),
(2), (4) Date: Jan. 7, 2015

(87) PCT Pub. No.: WO2012/170892
PCT Pub. Date: Dec. 13, 2012

(65) Prior Publication Data
US 2015/0111623 A1  Apr. 23, 2015

Related U.S. Application Data

(60) Provisional application No. 61/495,374, filed on Jun. 9, 2011, provisional application No. 61/553,847, filed on Oct. 31, 2011, provisional application No. 61/565,458, filed on Nov. 30, 2011, provisional application No. 61/636,455, filed on Apr. 20, 2012.

(51) Int. Cl.
*H04M 1/00* (2006.01)
*H04M 1/02* (2006.01)
*H04B 1/3888* (2015.01)
*B44C 1/10* (2006.01)
*B44C 5/04* (2006.01)
*A45C 11/00* (2006.01)

(52) U.S. Cl.
CPC ............ *H04M 1/0254* (2013.01); *B44C 1/105* (2013.01); *B44C 5/04* (2013.01); *B44C 5/0453* (2013.01); *H04B 1/3888* (2013.01); *H04M 1/0283* (2013.01); *A45C 2011/002* (2013.01)

(58) Field of Classification Search
None
See application file for complete search history.

(56) References Cited

PUBLICATIONS

Gyeong-Hwan Yang, Case for Protecting Mobile Phone, Oct. 30, 2008, KR 10-2008-0095971.*
Seo Jung Ki, Mobile Phone Case, Oct. 29, 2009, WO 2009131258 A1.*

* cited by examiner

*Primary Examiner* — Martin Mushambo
(74) *Attorney, Agent, or Firm* — Jill D. Martin

(57) ABSTRACT

Various devices and methods are provided for personalizing an appearance of a consumer product (14, 54, 64, 84, 94, 1800). In one embodiment, a device for personalizing an appearance of a consumer product comprises a design element (13, 53, 63, 73, 83, 93, 103, 113, 123, 1804) having a substrate (1930) having a first image (1914) applied on a first side of the substrate; and a connector (11, 51, 61, 81, 91, 121, 131, 1802) in contact with the design element, wherein the connector has an opening and is configured to be removably connected to the consumer product, wherein at least a portion of the first image is directly visible to a user via the opening.

37 Claims, 22 Drawing Sheets

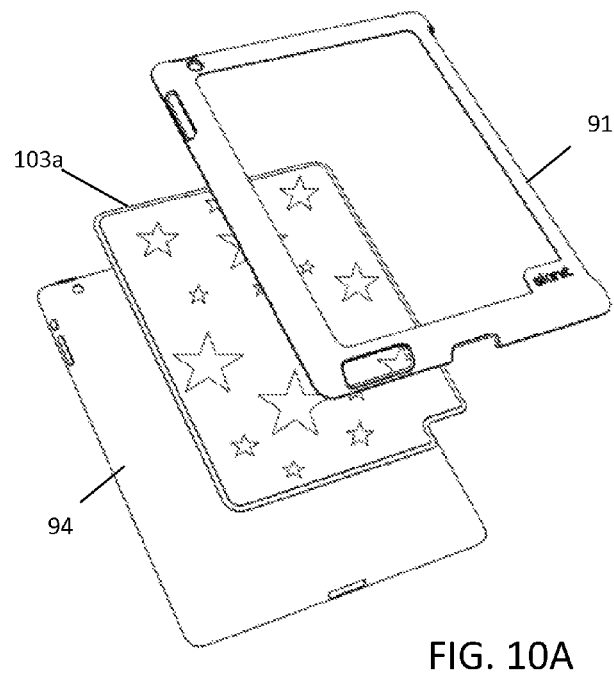
FIG. 10A
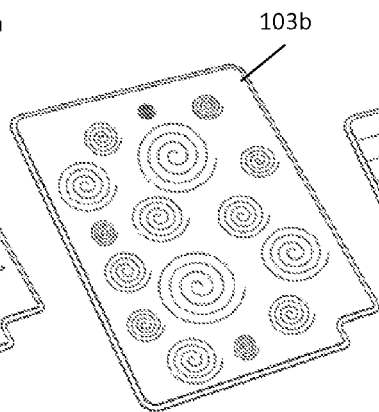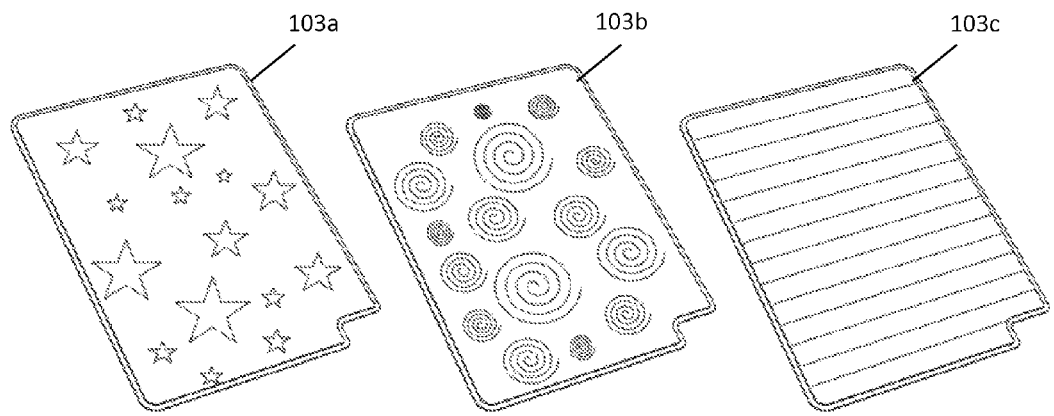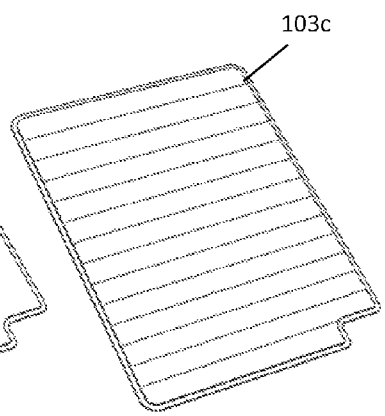
FIG. 10B    FIG. 10C    FIG. 10D

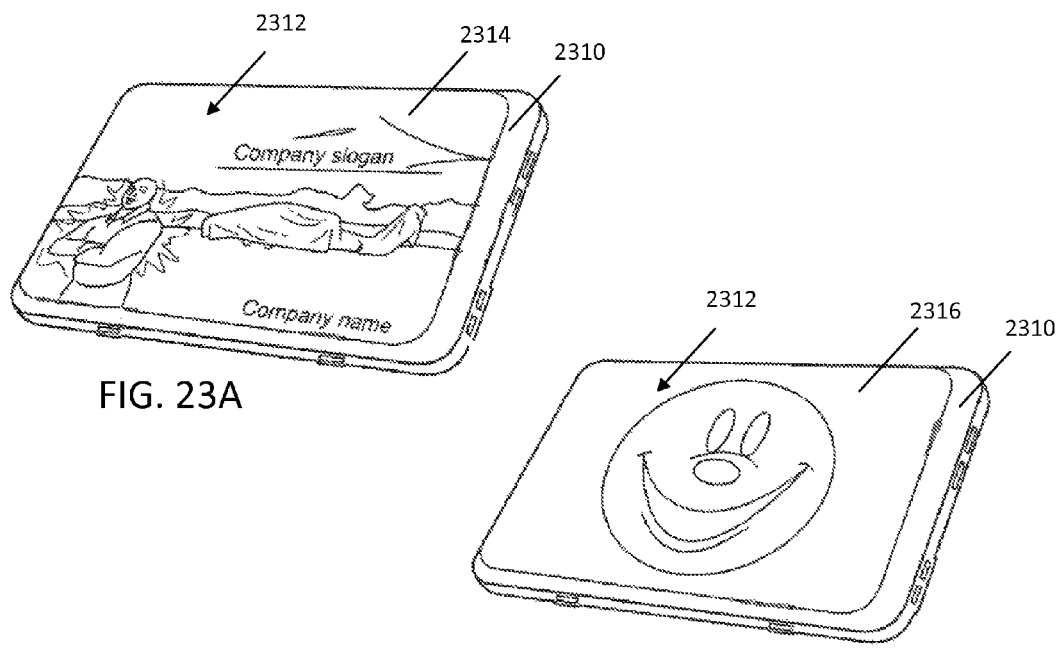
FIG. 23A
FIG. 23B
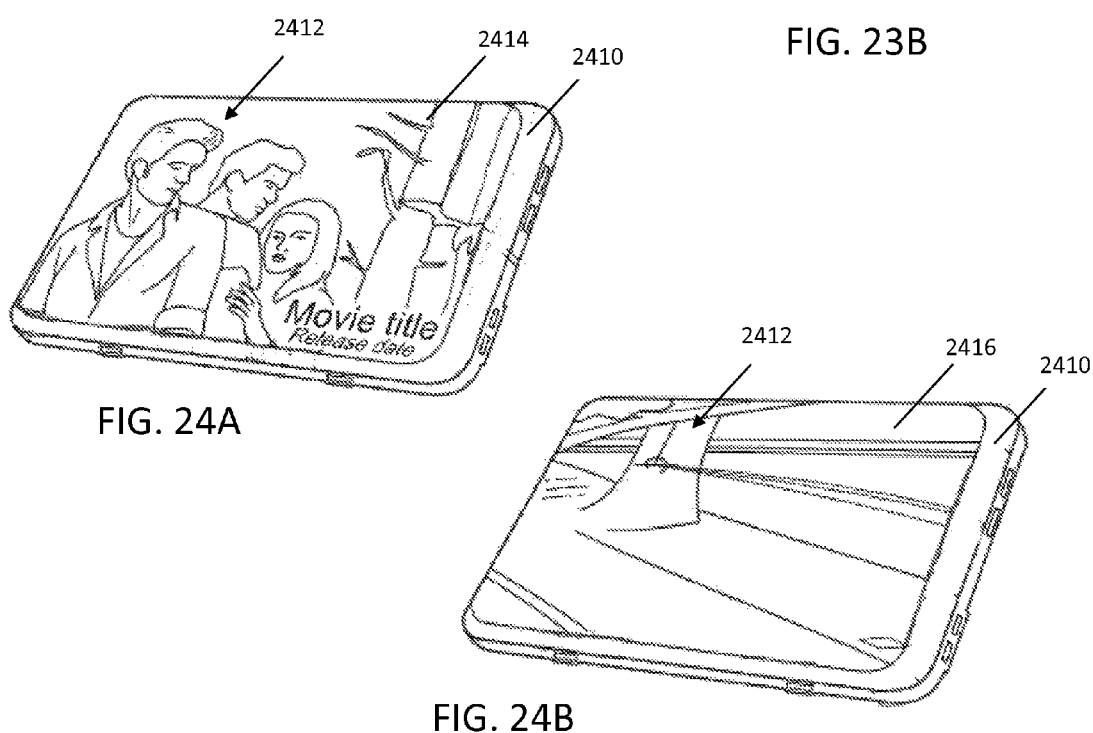
FIG. 24A
FIG. 24B

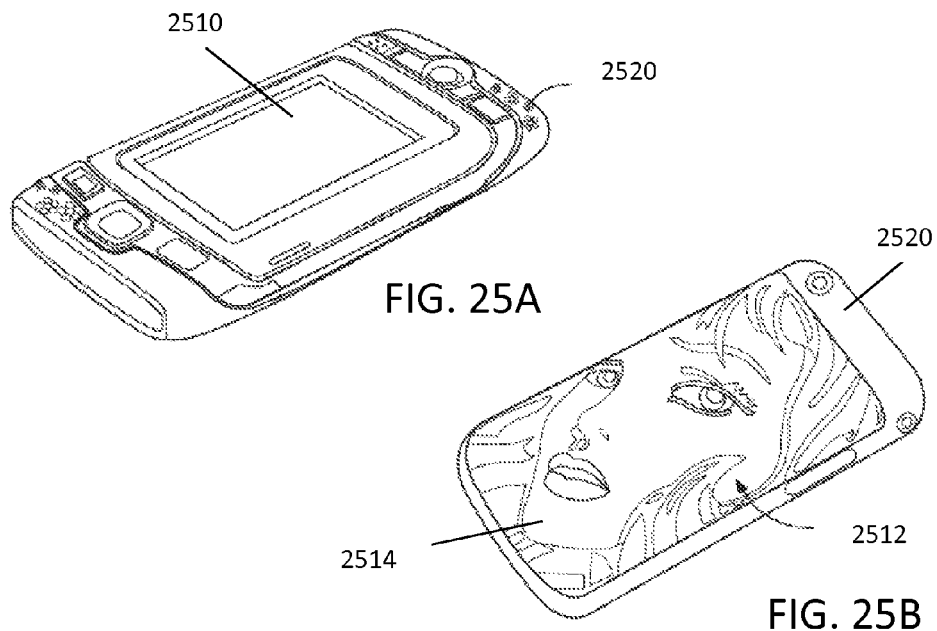
FIG. 25A
FIG. 25B
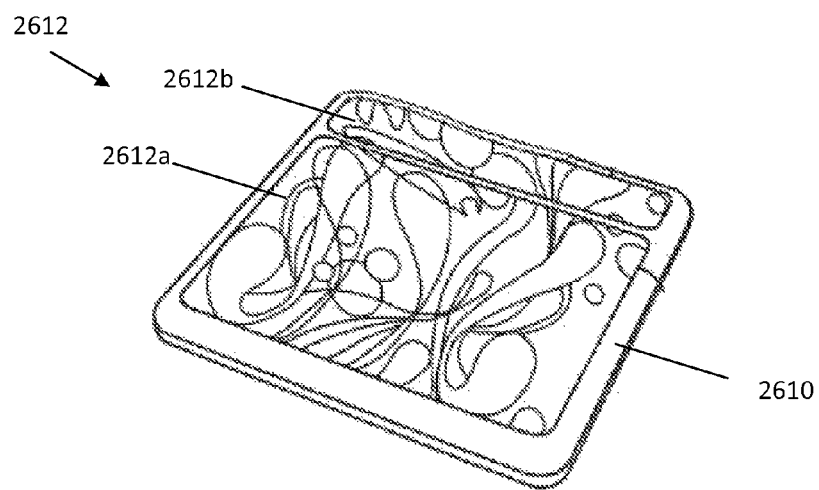
FIG. 26

METHOD AND APPARATUS FOR PERSONALIZING CONSUMER PRODUCTS

This application is a 371 U.S. National Stage filing of international application PCT/US12/041667, filed Jun. 8, 2012, by Hegemier et al., entitled Method and Apparatus for Personalizing Consumer Products, which claims the benefit of U.S. Provisional Application No. 61/495,374, filed Jun. 9, 2011, by Hegemier et al., entitled Method and Apparatus for Personalizing Consumer Products; this application also claims the benefit of U.S. Provisional Application No. 61/565,458, filed Nov. 30, 2011, by Hegemier et al., entitled Method and Apparatus for Personalizing Consumer Products; this application also claims the benefit of U.S. Provisional Application No. 61/636,455, filed Apr. 20, 2012, by Hegemier et al., entitled Method and Apparatus for Personalizing Consumer Products; and this application also claims the benefit of U.S. Provisional Application No. 61/553,847, filed Oct. 31, 2011, by Hegemier et al., entitled Method and Apparatus for Personalizing Consumer Products, all of which are incorporated in their entirety herein by reference.

BACKGROUND OF THE INVENTION

1. Field of the Invention

The present invention relates generally to methods and apparatus for personalizing or customizing products, and more specifically to methods and apparatus for personalizing or customizing an appearance of consumer products.

2. Discussion of the Related Art

Many consumer products, (e.g., mobile phones, laptop computers, personal digital assistants, personal audio devices, etc.), look identical or nearly identical to other products and there is a desire by consumers to customize or personalize such products not only to help the consumer distinguish his or her product from other similar looking, products, but also to allow the consumer to make his or her product their own in special and unique ways, such as by selecting a specific color, design, message or slogan, etc. Thus, there is a need to provide apparatus and methods that allow consumers to personalize such products.

SUMMARY OF THE INVENTION

Several embodiments provide devices and methods for personalizing an appearance of a consumer product. In one embodiment, a device for personalizing an appearance of a consumer product comprises a design element having a substrate having a first image applied on a first side of the substrate; and a connector in contact with the design element, wherein the connector has an opening and is configured to be removably connected to the consumer product, wherein at least a portion of the first image is directly visible to a user via the opening.

In another embodiment, a device for personalizing, an appearance of an electronic consumer product comprises: a bumper having a front opening and a back opening, the bumper having a shape configured to wrap around at least two sides of the electronic consumer product, wherein the front opening is configured to allow a display screen on a front surface of the electronic consumer product to be directly viewed therethrough, wherein the back opening is configured to be adjacent to at least a portion of a back surface of the electronic consumer product, wherein the bumper is configured to be removably connected to the electronic consumer product at least partially covering the at least two sides of the electronic consumer product; and a plate having a first image applied on a first, side of the plate, wherein the plate is configured to be removably received within the back opening and held in position against the back surface of the electronic consumer device by a periphery edge of the bumper at a periphery of the back opening when the bumper is removably connected to the electronic consumer product, wherein the Plate is substantially rigid, wherein the first image comprises a print layer, wherein an outer surface of the plate is flush with an outer surface of the bumper; wherein at least a portion of the first image is directly visible to a user via the back opening; and wherein the plate comprises a first alignment member and the bumper comprises a corresponding alignment member such that the plate fits within the opening in a given orientation.

In another embodiment, a method of personalizing a consumer product comprises: providing a design element having a substrate having a first image applied on a first side of the substrate; and removably connecting a connector having an opening to the consumer product such that the design element is positioned between a portion of the consumer product and a portion of the connector, wherein at least a portion of the first image is directly visible to a user via the opening.

BRIEF DESCRIPTION OF THE DRAWINGS

The above and other aspects, features and advantages of several embodiments of the present invention will be more apparent from the following more particular description thereof, presented in conjunction with the following drawings.

FIGS. 10A-10D are perspective views of a structure used to personalize an exemplary consumer product, such as a tablet computer, in accordance with another embodiment, with the illustrated structure comprising a design element and connector similar to that illustrated in FIGS. 9A-9B where a user can select and interchange between different design elements to differently personalize the product.

FIGS. 20A and 20B illustrate, respectively, the mechanism in a first position wherein the reversible structure is connected to the consumer product and a second position wherein at least a portion of the reversible structure is spaced from the consumer product to assist in removing the reversible structure from the consumer product;

FIGS. 23A-23B and 24A-24B are exemplary notebook style computers in which a portion of their housing is personalized with a reversible structure in accordance with at least one embodiment of the invention, with FIGS. 23A and 23B, respectively, illustrating first and second images of the reversible structure and FIGS. 24A and 24B illustrating first and second images of an alternate reversible structure;

FIGS. 25A-25B illustrate an exemplary mobile phone in which a portion of its housing is customized with a reversible structure in accordance with at least one embodiment of the invention; and FIG. 26 is an exemplary cover for a tablet or notebook computer in which a portion of the product is personalized with a reversible structure that is separated into a plurality of pieces in accordance with at least one embodiment of the invention.

Figure 1A:
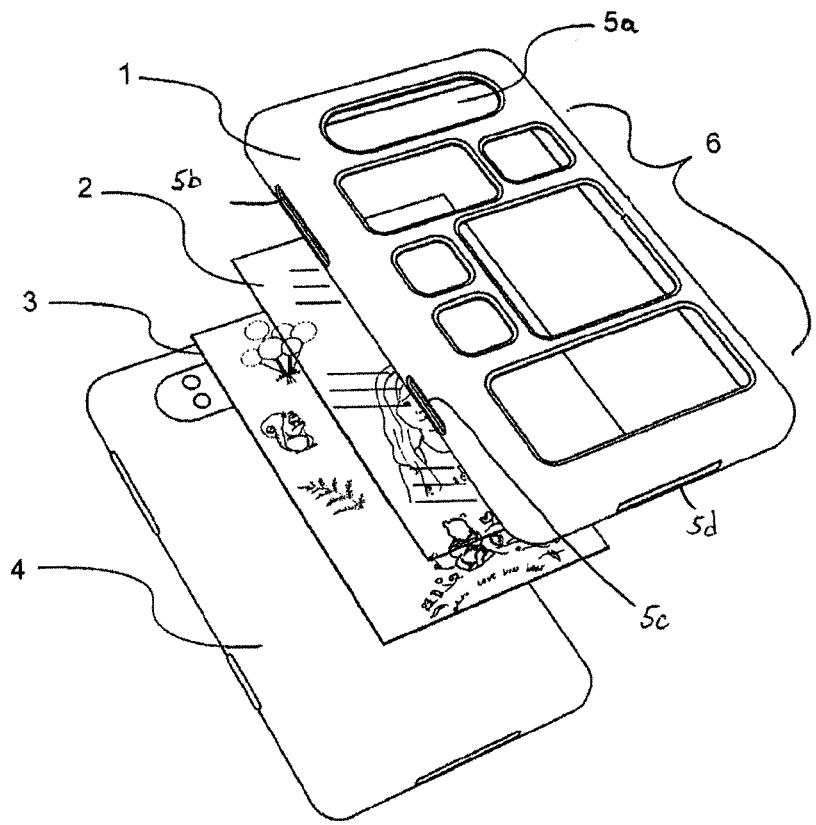
FIGS. 1A-1B are exploded and perspective views, respectively, of a structure used to personalize a consumer product in accordance with at least one embodiment, with the illustrated structure comprising a collage of images/designs applied to a consumer product.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments" Of similar language means that a particular feature, structure, or characteristic described in connection with the embodiment is included in at least one embodiment of the present invention. Thus, appearances of the phrases "in one embodiment," "in an embodiment," "some embodiments", "in one form", "in another form", and similar language throughout this specification may, but do not necessarily, all refer to the same embodiment.

Furthermore, the described features, structures, or characteristics of the invention may be combined in any suitable manner in one or more embodiments. In the following description and the materials incorporated by reference, numerous specific details are provided to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Several embodiments provide methods and systems for providing for customization or personalization of a product or device and the ability to readily change the customization or personalization of a product from a first image or design to another image or design as desired. In some embodiments, the methods and systems provide this personalization or customization in an on-demand manner such that devices can be customized as needed for the intended purpose without the need to forecast and carry inventory anticipating demand for the specific customization. Accordingly, in several embodiments, an end customer can select and customize imagery to be applied to a device/product or an accessory to the device/product in order to personalize or customize the device/product for the purposes and preferences of the end customer.

In some embodiments, images may be selected from available images and designs, licensed artwork (e.g., Disney, NFL, artwork, etc), or uploaded by users From user computers or computing devices, smart phones or uploaded from other image services, websites, social media sites (e.g., Facebook, Twitter, Flickr, Photobucket, Tumblr, Pinterest, and so on) and players, etc.

In some embodiments, the end customer or consumer may be one or more of an individual, an organization, an agency, a company, a retailer, a distributor, an original equipment manufacturer (OEM), an original design manufacturer (ODM). The device or the accessory of the device may be for the use of the end customer or other purpose, such as for distribution or commercial sale.

The imagery to be applied for customization may also take a variety of forms. For example, in some embodiments, the imagery includes one or more of the following components: color elements, text, size and font elements, language and regional options, photographic elements, graphic images and designs, pattern, artwork elements, transparency, texture, identification elements such as asset tags and readable codes, logo elements, material choice elements, and coating and surface treatments.

Similarly, the products to be customized or personalized can be any physical object, preferably an object that may be commercially purchased by consumers. Devices, portions of devices, accessories for devices and/or their surfaces whether plastic, metal, glass, ceramic, fabric or other material that may be customized include, but are not limited to: consumer electronic devices (mobile handsets, notebook computers, netbook computers, keyboards, tablets, touch screen computing devices, servers, digital music players, etc) and accessories, electronic and non-electronic medical devices, household products (kitchen appliances, switch plates, tile, ceramics, etc.), tools (cordless drills, saws, tool boxes, etc.), health and beauty products (containers, makeup cases, compacts, hair dryers, curling irons, etc.), automobiles, parts and accessories, jewelry, media cases, sporting equipment, fishing equipment and lures, luggage, apparel, street signage, advertising and bill boards, and furnishings.

In some embodiments, such devices are relatively non-unique in appearance relative to other commercially available devices from the same and other manufacturers. For example, in the case of consumer electronics devices, such as netbook computers, mobile phone and so on, most products are relatively comparable in the technical ability of the computer or phone within certain product price ranges. That is, there is little from the functional feature set of the product to distinguish one manufacturer's products from another. Thus, for manufacturers and retailers, products are differentiated by the degree of personalization that a customer has in the design of the product or in the post purchase decoration of the product, and these entities will have a commercial advantage in view of the growing trend and desire for consumers to want to personalize purchased products to "make them their own". Those that are able to provide flexibility in the personalization and customization of the product, particularly the option to readily change from one design to another for from among a plurality of designs, images, etc.) to accommodate certain moods, emotions, thoughts or feelings, or to accommodate certain environmental circumstances and/or situations, will have an even better commercial advantage.

Methods and systems according to several embodiments allow customers to apply imagery to the product/device, a portion of the product/device and/or an accessory to the product/device to achieve customization or personalization and further allow for the changing of this imagery between two or more designs. Due to the on-demand nature of several embodiments, customization can be offered to take advantage of current trends or events with the need to forecast the consumer popularity of the trend or event with the normal manufacturing design cycle. In some embodiments, the devices, parts thereof or accessories therefor may be customized for use by consumers, retailers, distributors and other commercial and non-commercial entities, and/or governmental entities such as local, regional and/or national entities.

As will be described further below, in different embodiments, customized imagery may be applied in a variety of ways. For example, imagery may be applied or printed to a pressure sensitive film (e.g., a skin) or an adhesive material applied to a substrate that is, in turn, connected to the product, a portion or the product or to an accessory. For example, this adhesive material may be printed with the desired imagery and then permanently or removably applied to a substrate, with another image applied to the opposite side of the substrate thereby forming a reversible structure with first and second images located on opposite sides thereof. In one example, the substrate is applied to a mobile phone or to the lid or cover of a notebook computer, or to a portion of the product, such as a battery door of the mobile phone, and/or to an accessory such as a hard case or shell for the mobile phone or a snap an lid cover and/or base for a notebook computer and can be removed, possibly reversed and re-applied to the product, or replaced or swapped with another substrate similarly designed to change the visible image as desired. In other embodiments, the imagery is directly painted, printed, heat or cold transferred, thermo-formed, etched or otherwise formed on a surface of substrate that is in turn connected to the product, portion of the product and/or an accessory of the product. In some embodiments, one or both of the first and second images are permanently or non-permanently applied to the substrate. In some embodiments, texture is formed in one or both of the first image, fir example, using an image application process that leaves vertical displacement resulting in texture across the image. For example, texture printing techniques such as described in U.S. Provisional Application No. 61/491,320, filed May 30, 2011 and entitled SYSTEMS AND METHODS FOR USE IN INLINE PRINTING, which is incorporated herein by reference, may be used to print imagery including texture.

Depending on the embodiment, the image is solvent or UV painted, thermal or solvent printed, laser printed, UV inkjet printed, transferred via dye sublimation via a transfer media, pad printed or silk screened directly to the substrate and connected to a surface of the product, a portion of the product or an accessory for the product. In some embodiments. Surface treatments are optionally applied, such as chemical film treatments or other treatments to modify the surface energy to promote good adhesion between adjacent layers. Example surface treatments to modify surface energy, e.g., to alter or raise dyne levels to ensure good adhesion between paint and/or print layers, include plasma treatment (atmospheric and flame plasma treatments), corona treatment, and chemical plasma treatments. Direct to substrate printing may be accomplished using post mold decoration or in-mold decoration techniques. In on-demand embodiments, post mold decoration is preferred due to shorter lead times in the printing process. For example, in-mold decoration films are well suited for producing large quantities of a single design on a part/substrate, such that changing a design to be printed requires additional tooling and set up charges with subsequent down time. Thus, in-mold decoration often requires forecast volumes in advance. Whereas, in some embodiments using post mold decoration, can allow for an infinite number of different images and designs or customization options to be printed next to one another and in succession (even on the same image application device) without tear down, set-up or additional tooling.

In embodiments which employ customization in an on-demand manner, manufacturers can quickly manufacture and make available for commercial sale small special edition or limited edition runs of the structures discussed herein to take advantage of current events and interests, promotions and advertising for upcoming events and interests, etc. This allows the manufacturer to adapt to a shape shifting marketplace. Since limited numbers of products can be produced under a typical business model, there is less risk of carrying excess inventory of commercially undesirable products.

In several embodiments, an on-demand software management platform is provided that manages the customization process. In some embodiments, the management platform is installed and executed on computing devices of a particular company, or may be stored and executed on servers in an ASP model (i.e., a peer-to-peer hosted solution) providing network access to remote users to interact with the management system. In some embodiments, the management platform generally performs at least one or more of the following functions: provide an interactive image selection and customization tool for customers to upload and/or select then customize imagery for use in customization of one or more products or devices; store and maintain a library of licensed and pre-formatted or me-approved imagery and selection options; provide an image selection file format to end customers that allows for easy editing and selection of image options; receiving and evaluating purchase orders from a variety of customer types for customized products, parts, accessories, adhesive materials, etc.; scheduling and monitoring in real-time the image application process coordinating a variety of application devices (such as painters, printers, waters, curing devices, layer applicators, and so on) in order to meet the on-demand nature of customer orders; monitoring and directing inventory and part flow through the image application facility; and coordinating with enterprise resource planning systems of other entities in a manufacturing supply chain.

Figure 1B:
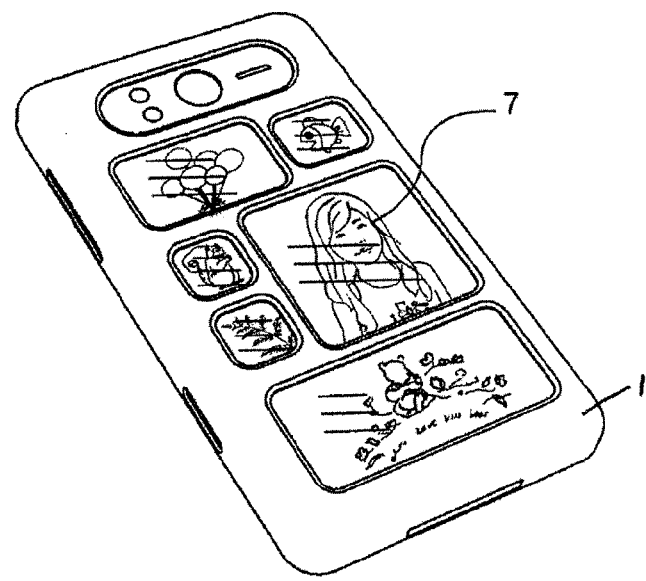

Referring now to FIGS. 1A-1B, there is illustrated a structure for customizing or personalizing a consumer product. In the form illustrated, the structure includes a connector, such as cover 1, and a design element, such as substrate 3. In a preferred form, the cover 1 is provided in the form of a case for an electronic component, such as the illustrated mobile phone device 4, and a protective cover or film 2 is applied over the substrate 3 to protect the images thereon. The cover 1 may include openings or cutouts for functional items of the electronic component like camera and/or flash opening 5a located on the face of the cover 1 or volume and power inputs 5b, 5c located on the side of the cover 1. Other openings may be provided in cover 1 for functional features of the consumer device including, but not limited to, openings for power and bus plugs or connectors 5d, ear phone and/or microphone jacks, subscriber identification module ("SIM") cards, memory cards, mute inputs, speakers, microphones, etc.

In addition to these openings, however, the cover 1 further includes a plurality of additional openings 6 that are used to separate an image or images into a collage of images. These collage openings 6 may take on a variety of different shapes and sizes and may vary in number depending on the number of collage openings that are desired. For example, in one form a consumer that is selecting or identifying images to be printed on substrate 3 using the on-demand methods described herein or incorporated herein may first be offered a variety of different covers with different collage openings 6 to choose from and then the consumer is asked to select or identify which images are to be positioned in which collage openings 6. Once this is done, the substrate 1 is manufactured and shipped or provided to the consumer or any intermediate party or middleman arranging for the order along with the selected cover 1. In other forms, however, the consumer may select or identify images to be printed in an on-demand manner as described or incorporated herein and, from this, the manufacturer or service provider may either select an appropriate cover that will properly display the images or produce a cover having collage openings 6 that match the image pattern selected or provided by the consumer.

Once assembled, the cover 1 and images on substrate 3 are arranged in such a manner to align the collage openings 6 with the desired corresponding images on substrate 3, as illustrated at reference numeral 7, to provide the desired collage effect used to customize or personalize the consumer product 4. In some cases, one image is it within the space provided by an opening 6, whereas in other cases, multiple images fit within the space defined by an opening 6. In addition, the functional openings 5*a-d* of cover 1 allow the consumer product 4 to retain its functionality while the cover 1 is connected thereto so that the device can continue to be used in its normal manner or maintain its normal operability.

In the form illustrated, substrate 3 includes images or designs on only one side. However, it should be understood that in alternate forms substrate 3 may include images or designs on opposite sides and/or be reversible to allow consumers to farther personalize or customize their device by reversing the substrate to show new or different images/designs from those depicted on the opposite side of the substrate 3, or simply cleaner images/designs of the images from the other side of the substrate (if the same images/designs appear on both sides of the substrate) as described in U.S. Provisional Patent Application No. 61/553,847, filed Oct. 31, 2011 by Hegemier et al and entitled "Method and Apparatus for Personalizing Consumer Products" which is incorporated herein by reference in its entirety. The reversible nature of substrate 3 may effectively double the useful life of the structure by allowing the consumer or user to simply flip the substrate 3 once the images or designs on one side become too worn for the consumer's liking. Furthermore, it may allow the consumer to use a more formal or conservative collage an one side, such as for work, and a more casual or personal collage on the opposite side, such as for non-work environments. Thus, a consumer can readily change the structure from containing a family themed collage to something more professional or formal such as various logos or marks of a consumer's employer or work-related designs.

It should also be understood that the substrate 3 may be made in a variety of different forms, shapes and sizes, and using a variety of different materials. For example, in the form illustrated, the substrate 3 is a pressure sensitive adhesive (PSA) skin as discussed above that adheres to an outer surface of the consumer device. In another form, however, the substrate 3 may be a dual sided leather piece with printable and/or paintable surfaces on at least one side thereof. In alternate embodiments, the substrate of the structure 3 may be made of wood, metal, glass, plastic, vinyl, fabric or other fibrous material (whether natural or synthetic) or any combination thereof, and may be in the shape of a smaller or larger geometrical or non-geometrical designs or combinations thereof, and/or may be symmetrical or asymmetrical. Further, the structure may be of varying degrees of rigidity or flexibility and may or may not adhere to the consumer product. For example, in one form, the substrate 3 may be a non-adhesive sheet that rests over the top of the consumer product, rather than adhering to the device. In yet other forms, the substrate 3 may be provided in a plurality of pieces, rather than as one single piece.

It also should be appreciated that the imagery elected to be used on any of the sides of substrate 3 may be any of the examples of imagery described or incorporated herein and may be selected from any number of different designs, shapes, sizes and materials. For example, one image may be of the substrate material itself, such as raw wood or leather. Whereas, another image may be selected from anything such as, but not limited to, a logo, picture, design, pattern, word, words, drawing, texture, etc., or may be of the substrate material itself (whether the same or different than that used in the first image) or an outer layer applied to the substrate.

In the form illustrated in FIGS. 1A-1B, the substrate 3 may be single or multi-layered. For example, in a multi-layered form, the substrate 3 may include a base substrate layer and optionally have an additional layer or layers applied on one or both sides of the base substrate layer to form the first and/or second collage images of the substrate 3, respectively, and collectively the substrate 3 itself. As mentioned above, in some forms a protective coating, such as finish or top coat layer 2, may be applied over the substrate images in order to protect the images. Exemplary layering diagrams and construction/assembly methods for creating such a specimen 3 and/or protective coating 2 are disclosed or incorporated by reference in U.S. Provisional Patent Application No. 60/856,495, filed Nov. 3, 2006 by Hegemier and entitled "Fulfillment Integration", U.S. Utility patent application Ser. No. 11/726,960, filed Mar. 23, 2007 by Hegemier and entitled "Adhesive Cover for Consumer Device", and U.S. Utility patent application Ser. No. 11/759,600 filed Jun. 7, 2007 by Hegemier and entitled "Fishing Lures and Adhesive Covers for Same", which are collectively incorporated herein by reference in their entirety. In some embodiments, the protective cover 2 is integrated into the substrate 3 (e.g., a layer of the substrate) or in other embodiments, may be a separate material that is positioned over the top of the decorated substrate, (e.g., an additional layer that attaches to the substrate via adhesive, an additional layer that rests over the top of the substrate but does not adhere to the substrate, etc.), such that the cover 3 protects the imagery on the substrate and allows the imagery to be viewed therethrough. In some embodiments, the protective cover 3 is optional and not included and the substrate 3 may either adhere to the consumer product 4 or simply rest on the consumer product 4 and be secured or connected thereto by the cover 1.

In still other embodiments, the collage design may be accomplished without the need for external cover 1 by printing the images and a collage border on the substrate 3 and placing the collage printed substrate 3 below a portion of the Consumer product 4. For example, in one form the substrate 3 may be printed with the various collage images as well as a border or frame design that breaks-up or frames the separate images into a collage and the substrate 3 may be adhered to the backside (e.g., second side or non-exposed side) of a light transmissive surface, such as the rear glass portion of a smart phone or inside back of is transparent phone cover such as disclosed in U.S. Provisional Patent Application No. 61/554,473, filed Nov. 1, 2011 by Hegemier et al., and entitled "Method and Apparatus for Customizing Consumer Products with Images applied to Second surfaces of Light Transmissive Structures", which is hereby incorporated herein by reference in its entirety. Thus, making the phone appear to have a collage of images without the need for cover 1 to frame the images and using the light transmissive surface itself to protect the images or collage of substrate 3. In still other forms, no framework or border may be required and the collage may simply include multiple images placed next to one another without a border or framing using one of the forms of customizing a substrate disclosed or incorporated herein by reference (e.g., printing, painting, etching, etc.).

Although the images depicted in FIGS. 1A-1B are two dimensional ("2D"), it should be understood that in alternate embodiments, the structure may be designed with one or more three dimensional ("3D") images or design elements to be used in the collage. Such 2D and 3D design elements are disclosed in U.S. Provisional Patent Application No. 61/495,374, filed Jun. 9, 2011 by Hegemier et al, and entitled "Method and Apparatus for Personalizing Consumer Products" which is incorporated herein by reference in its entirety. In addition, and as disclosed in this incorporated provisional patent application, other forms of structures may be used to personalize or customize consumer products including swappable bumper and plate concepts.

Figure 2A:
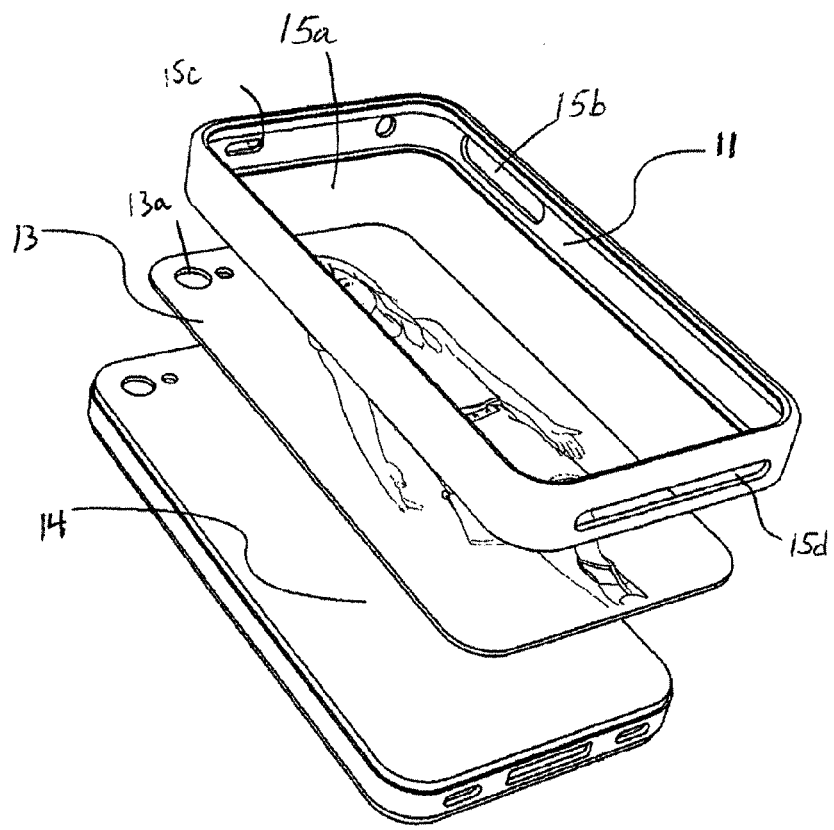
FIGS. 2A-2B are exploded and perspective views, respectively, of another structure used to personalize a consumer product in accordance with at least another embodiment, with the illustrated structure comprising, a swappable design element and/or connector (e.g., guard or bumper) for a consumer product.
Figure 2B:
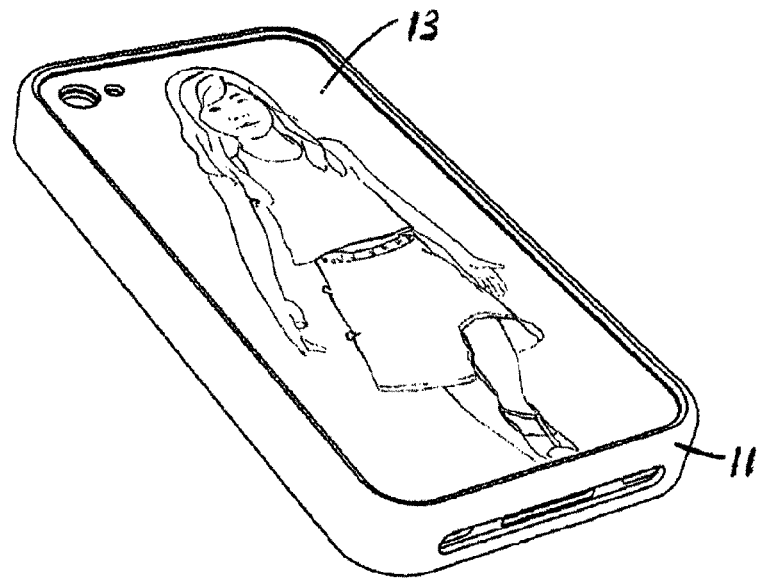

For example, in FIGS. 2A-2B, an alternate structure for customizing a consumer product is illustrated having a design element, such as substrate or plate 13, connected to consumer product 14 via a connector, such as product cover or bumper 11. For convenience, this embodiment will use the same reference numerals for similar items as those mentioned above with respect to FIGS. 1A-1B, but with the addition of a prefix "1" just to distinguish one embodiment from another. Thus, in FIGS. 2A-2B, the cover, substrate and consumer product will be denoted using reference numerals 11, 13 and 14, respectively. This disclosure will also focus on the items that differ from the embodiment of FIGS. 1A-1B rather than repeat a discussion of other common features and items to avoid redundancy.

Like the above mentioned embodiment, the substrate of FIGS. 2A-2B may be made in a variety of different forms, shapes, sizes and from a variety of different materials. For example, in one form the substrate 13 is a plate made from wood, metal, plastic, vinyl, glass, fabric or other fibrous materials (whether natural or synthetic), etc., with images applied to one or both sides of the substrate 13, e.g., first or second surface imaged, having cutouts or openings (if desired) and using the image deposition methods disclosed or incorporated herein including, but not limited to image deposition via printer, laser, chemical etching or other known image deposition processes.

In forms where both sides of the substrate 13 contain images, consumers can readily switch between the images by simply removing, flipping and reinstalling the substrate 13 on the consumer product 14. Alternatively, and regardless of whether the substrate 13 has images on both sides, consumers can simply remove the substrate 13 and replace the substrate 13 with another substrate containing a new and/or different image. This gives the user or consumer the ability to swap a substrate with one design with another substrate with another design as often as desired. In addition, multiple substrates may be maintained thereby allowing the user or consumer to change from a plurality of substrates without being limited to the one or two images or collages of images that may exist on a substrate. In one form, the connector 11 may be designed to hold more than one substrate 13 so that the user can simply place the substrate with a desired image on top of the others so that it is displayed to those who look at the consumer device while the other substrates are hidden below. In a preferred form, however, the connector or cover 11 will hold only one substrate 13 in order to maintain a small size and profile.

In the form illustrated in FIGS. 2A-2B, the connector or bumper 11 is a resilient but flexible material that has a generally U-shaped cross section allowing the consumer product 14 to be inserted within the U-shaped channel formed by the cover or bumper 11. In addition and like the embodiment of FIGS. 1A-1B, the cover 11 includes openings or cutouts (e.g., 15a, 15b, 15c, 15d, etc.) that correspond to functional items or features of the consumer product 14 to accommodate such things as power switch openings, quite/vibration mode inputs, ear phone jacks, volume controls, connecting and/or charging ports, etc. Similarly, the substrate 13 includes openings or cutouts, (e.g., camera cutout 13a), to accommodate features of the consumer product 14.

In addition to allowing consumers to readily swap or flip substrates 13 to display different images, the structure illustrated in FIGS. 2A-B also allows consumers to swap or reverse the cover or bumper 11. For example, consumers may collect bumpers 11 of different colors, patterns, designs, styles, etc. and swap among these different bumpers to further personalize and/or customize their consumer products. In other forms, a single bumper 11 may be provided, with different imagery on opposite sides so that consumers can display one image or design and then remove and turn the bumper 11 inside out to display another image or design (which may or may not be the same as or similar to the first image or design).

Figure 3A:
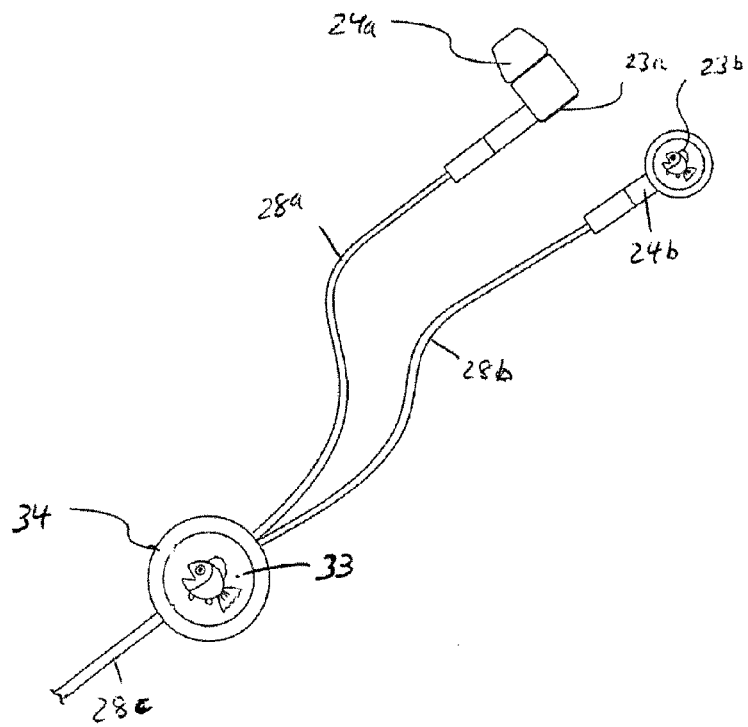
FIG. 3A is a perspective view of another structure used to personalize consumer product in accordance with at least another embodiment, with the illustrated consumer product being an ear piece with audio control.
Figure 3B:
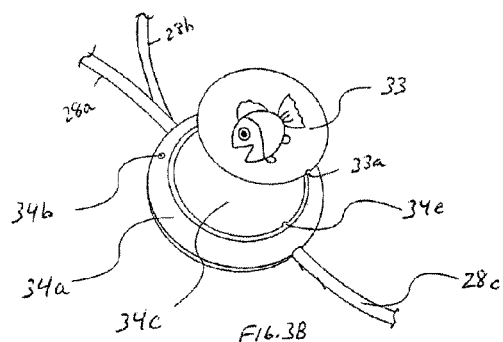
FIGS. 3B-3C are exploded and perspective views, respectively, of the structure and volume control of FIG. 3A.
Figure 3C:
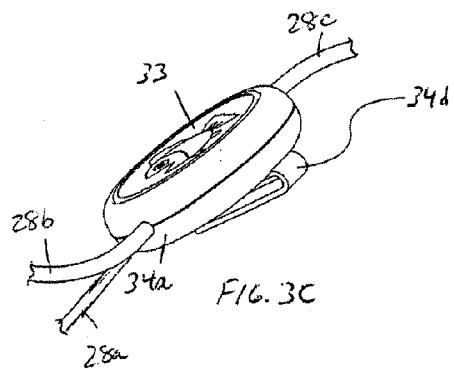

Yet other forms of structures for customizing or personalizing consumer products are illustrated in FIGS. 3A-3C. More particularly, an earphone accessory is illustrated having ear pieces or buds 24a, 24b, integrated microphone/earphone controller 34, interconnecting earphone wires 28a, 28h and 28c, and structures 23a, 23b and 33 for personalizing the ear pieces 24a, 24b and controller 34, respectively. For convenience, this embodiment will use the same reference numerals for similar items as those mentioned above with respect to FIGS. 1A-1B and 2A-2B, but with the addition of a prefix "2" for the ear pieces 24a, 24b and prefix "3" for the controller 34 just to distinguish these items from earlier embodiments. This disclosure will also focus on the items that differ from the embodiments of FIGS. 1A-1B and 2A-2B rather than repeat a discussion of other common features and items to avoid redundancy.

The integrated microphone/earphone controller 34 is generally circular in shape with an outer housing, 34a defining a microphone opening 34b and containing at least a portion of wiring and a microphone positioned in alignment with the microphone opening 34b. The controller 34 further includes an input 34c which allows the consumer to control at least one function associated with the earphone accessory. In one form, input 34c is a volume control which the consumer can use to increase or decrease the volume of earpieces 24a, 24b, e.g., by pressing the upper or lower portion of the input 34c, in other forms, it should be understood that input 34c may be used for controlling other function either in lieu of or in addition to volume control, such as answering/disconnecting telephone calls, swapping between telephone calls or answering call waiting, powering on/off a consumer device connected to the earphones, activating/deactivating a music player connected to the earphones, playing/pausing audio playback, etc. The controller 34 may also include a fastener, such as clip 34, for connecting the controller to an article of clothing, clothing accessory or other item to position the controller 34 so that the microphone opening 34b is positioned generally near or proximate to a user's mouth.

In the form illustrated, customizing or personalizing structure 33 corresponds in shape to input 34c and is preferably a skin as described above and incorporated herein and can be adhered to input 34c and readily removed if desired. One or more of the input 34c, housing 34a and personalizing structure 33 may be designed with alignment mechanisms for aligning and orientating the skin 33 in a desired position. For example, in the embodiment illustrated in FIGS. 3A-3C, the input 34c has a raised, circumferential outer wall with a protrusion 34e extending from the upstanding circumferential outer wall toward the center of the circular input 34c. The personalizing structure 33 includes a notch or kerf 33a cutout that corresponds in shape to the protrusion 34e so that the consumer can align and orientate the skin 33 when placing the skin on input 34c. Such alignment mechanisms may be used to help prevent the skin 33 from interfering with the operation of input 34c as it is moved in relation to housing 34a and/or may be used to simply align the skin 33 so that it is displayed in a desired orientation when the earphone accessories are worn by a consumer or user. Generically, the notch 33a and protrusion 34e may be referred to as first and second alignment members (or mating members or structures) that mate OF align together in order to ensure a desired fit, position and/or orientation of the personalizing structure 33.

It should be understood that in alternate embodiments, the protrusion 34e and notch structure 33a may be swapped so that the skin 33 has a protruding portion and the input 34c or housing 34a have a corresponding notch if so desired. In addition, the personalizing structure 33 may be made in other forms, shapes, sizes and materials similar to those discussed above. In addition, the structure 33 may be positioned elsewhere on the earphone accessory either in lieu of or in addition to the controller location illustrated in FIGS. 3A-3C. For example, as also illustrated in FIGS. 3A-3C, alternate personalizing, structures 23a, 23b are positioned on exterior surfaces of the earpieces 24a, 24b, respectively. Aligning/orientating mechanisms may be used with this embodiment as well in order to display the personalizing structures 23a, 23b in a desired orientation when the earpieces 24a, 24b are worn by the consumer/user.

In some embodiments, the controller 34 and the input 34c are designed to be of a larger physical size than known integrated button controls of many earphone type devices. That is, many known earphone controls are very small in order to not add additional profile and weight to the wire of the earphone. Such small controls may be difficult to operate, especially if the user is wearing gloves or the wire is in contact or underneath one or more layers of clothing. Additionally, such small controls offer little effective surface area to allow for customization of the accessory. In some embodiments, the controller 34 and input 34c are large enough (e.g., having a dimension, such as diameter, of at least 0.5 inches across) to be easily operated by someone wearing winter gloves where it is undesirable to remove the gloves to operate the controller 34 and, more particularly, input 34c. In some embodiments, the input 34c has a dimension across (e.g., diameter) between about 0.25 and 5 inches, in some embodiments between about 0.5 and 5 inches, in some embodiments between about 0.5 and 3 inches, in some embodiments between about 0.5 and 2 inches, and in some embodiments between about 0.5 and 1.5 inches. Further, due to its larger relative size, a larger surface area is provided for the customization of the decorated structure 33 thereby making it easier to be seen by others and distinguished from other such items by the user or consumer.

Figure 4A:
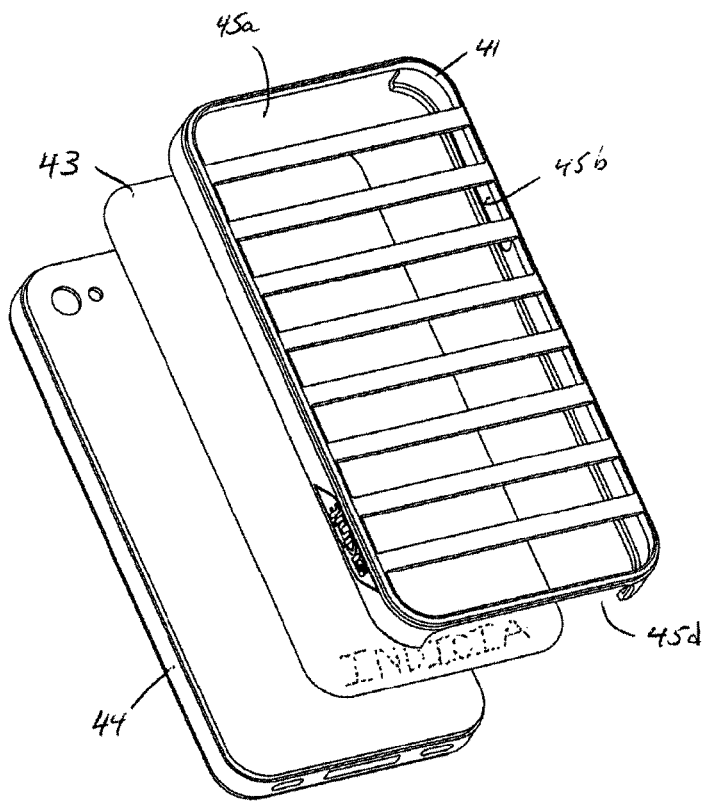
FIGS. 4A-4B are exploded and perspective views, respectively, of another structure used to personalize a consumer product in accordance with at least another embodiment, with the illustrated structure comprising a slotted or ribbed consumer product cover with optional protective liner layer.
Figure 4B:
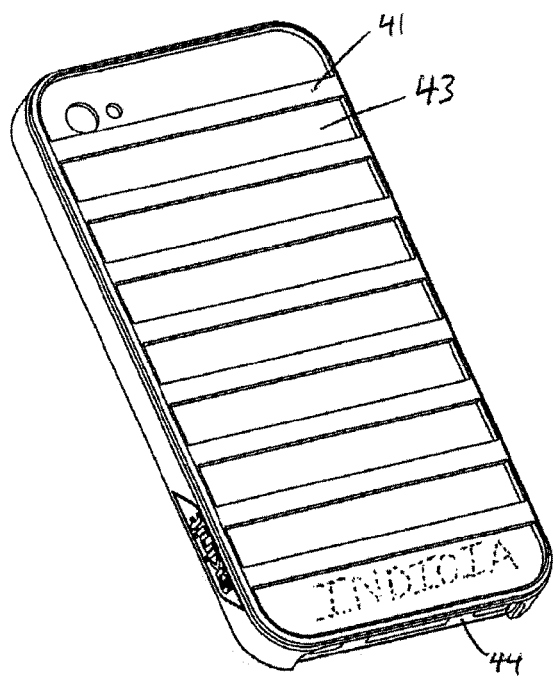

Yet another embodiment is illustrated in FIGS. 4A-4B in which a consumer product, such as mobile phone, is illustrated having a cover and substrate that, together with the cover, customize the consumer product. For convenience, this embodiment will use the same reference numerals for similar items as those mentioned above with respect to FIGS. 1A-1B, 2A-2B and 3A-3C, but with the addition of a prefix "4" to distinguish these items from earlier embodiments. Thus, the consumer product will be referenced by reference numeral 44, the substrate by reference numeral 43 and the cover by reference numeral 41. This disclosure will also focus on the items that differ from the earlier embodiments rather than repeat a discussion of other common features and items to avoid redundancy.

In the form illustrated, cover 41 covers at least a portion of consumer product 44 and preferably protects the consumer product from damage relating to minor drops and the like. The cover 41 defines a plurality of openings or slots and, in the form illustrated, creates a plurality of slats or ribs which make-up a portion of the design element chosen for this embodiment, in addition to these openings, cover 41 also includes a plurality of functional openings, such as camera cutout 45a, volume control cutout 45b and speaker/serial connector cutout 45d which allow the consumer product 14 to retain all of its functionality when the cover 41 is placed on the consumer product. The cover 41 may be provided in a variety of colors and, in some forms, may be reversible to allow a consumer or user to select, which surface of the cover 41 is visible to observers, such as discussed above with respect to bumper 11 in FIGS. 2A-2B.

As illustrated, cover 41 has a generally U-shaped cross-section that forms a channel within which the consumer product 44 may be inserted or disposed. The cover 41 preferably friction fits or snap fits onto the consumer product 44 with the slats crossing over the rear of the consumer product 44 and the slats or ribs of cover 41 further providing grip or a ribbed surface that assists the user in holding and gripping the consumer product 44.

In a preferred form, the cover 41 is designed to provide a gap between the rear of the consumer product 44 and the slats by spacing the slats apart from the rear of the consumer product to create a pocket, slot or recess within which substrate 43 may be disposed. The substrate 43 may contain any desired design element, such as indicia or any of the other types of designs mentioned or incorporated herein by reference. The substrate 43 may be connected to the consumer product in any of the manners discussed or incorporated herein the substrate may be a pressure sensitive adhesive skin that is adhered to the consumer product, alternatively the substrate may simply rest on or against the consumer product and be secured thereto by the cover 41, in other forms the substrate 43 may be a plate-type structure that is captured between the consumer product 44 and cover 41 by the cover 41, etc.). In a preferred form the substrate is a plate-like structure similar to plate 13 of FIGS. 2A-13 with designs on either or both sides and is easily reversible and/or swappable with other plate like structures to allow consumers to readily change the design or customization applied to the consumer product. The plate-like structure 43 may be rigid or flexible, made of any number of materials (e.g., plastic, wood or paper-based, metal, leather, etc.) or in any number of shapes and sizes (e.g., large enough to cover the entire side or sides of a consumer product, smaller such that it covers only a portion of a side of the consumer product, etc.), and may include any of the designs discussed herein (e.g., 2D, 3D, painted, printed, sputtered, natural finish of substrate material, etc.).

Although the form illustrated in FIGS. 4A-4B, shows the cover capturing at least some portion of all four sides of substrate 43, it should be understood that in alternate embodiments, the cover 41 may be designed with an opening on one side or a combination of adjacent sides that the substrate 43 may be inserted into or removed from. For example, the cover 41 may form a pocket that the substrate 43 is inserted into when installing and slid out of when removing, reversing or swapping the side walls of the cover 41 may allow the substrate 43 to be inserted between the slats or ribs and the consumer product via camera opening 45a). In such an embodiment, the spacing of the slats or ribs of cover 41 and the consumer product 44 would be designed to form a friction fit with the substrate 43 to hold the substrate in position once inserted between the cover 41 and the consumer product 34.

In other embodiments, the slats may be curved rather than straight and/or the cover may make-up different designs to be displayed on the rear of the consumer product, rather than slats/shutters or ribs. These other designs may be preselected and stored as inventory or, alternatively, may be created, supplied or selected by consumers and manufactured on an on-demand customization basis as discussed and incorporated herein. For example, a consumer may provide a design in an on-demand customization model that is made on the back of cover 41 so that the design is visible on the rear of the consumer product. The cover 41 could be molded with the design or, more easily, the design could be etched or carved out of the back of the cover after the cover is molded.

Figure 5A:
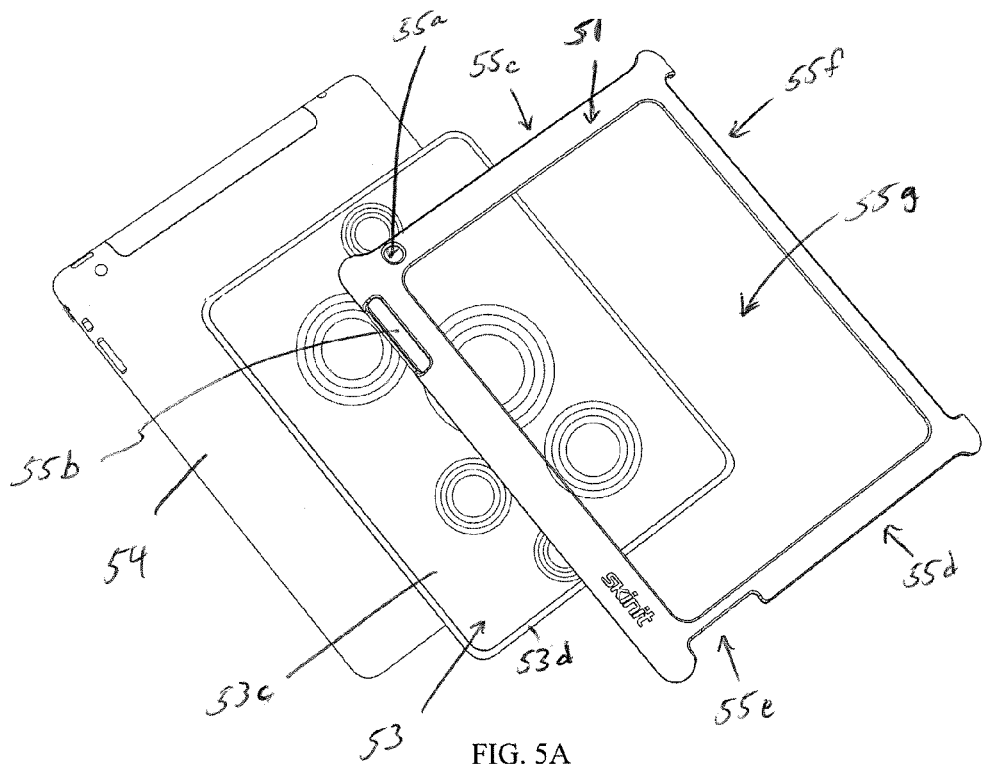
FIGS. 5A-5B are exploded and perspective views, respectively, of another structure used to personalize an exemplary consumer product, such as a tablet computer, in accordance with another embodiment, with the illustrated structure comprising another form of design element and connector for the consumer product.
Figure 5B:
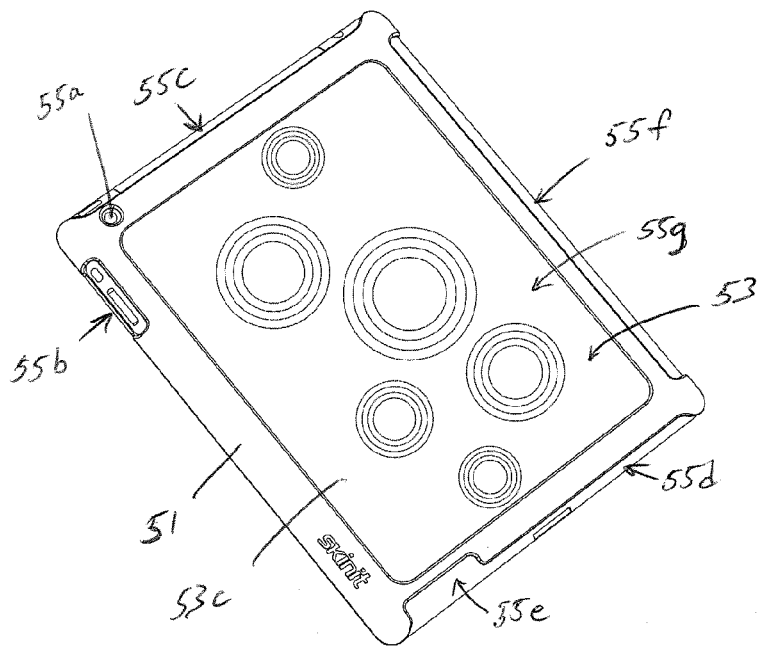
Figure 6A:
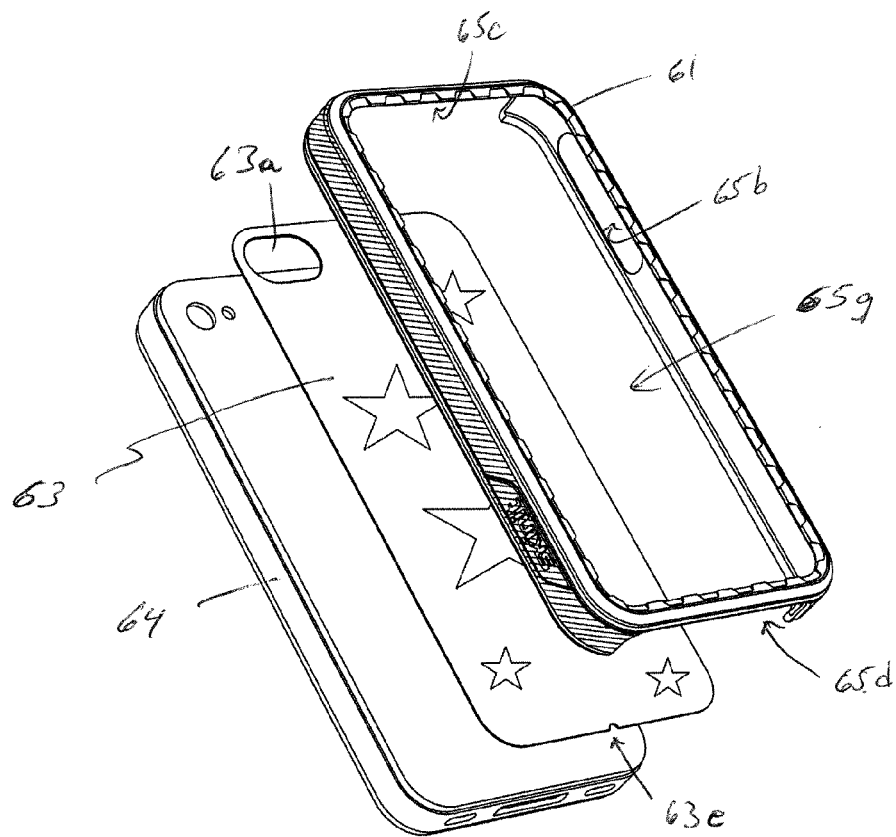
FIGS. 6A-6B are exploded and perspective views, respectively, of another structure used to personalize an exemplary consumer product, such as a smart phone, in accordance with another embodiment, with the illustrated structure comprising a design element and connector having a mating arrangement for aligning and/or orientating the design element and connector with one another.
Figure 6B:
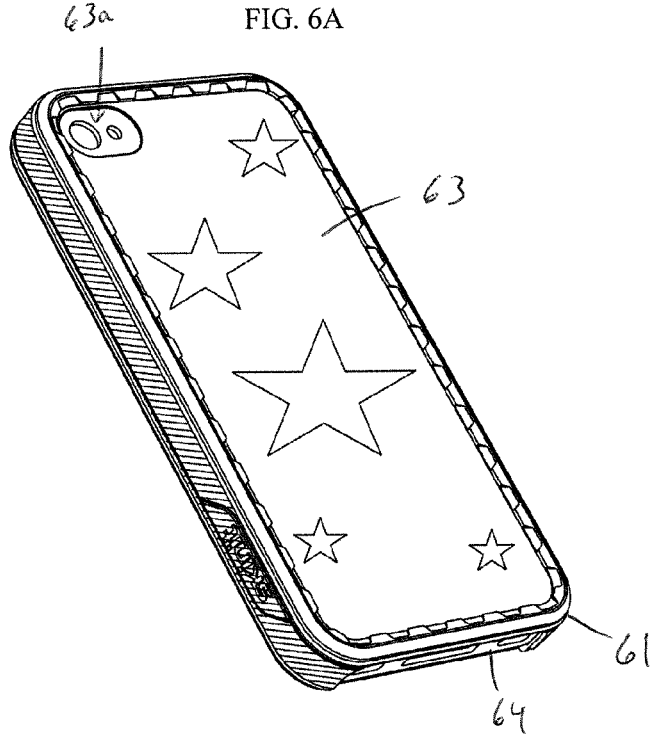
Figure 6C:
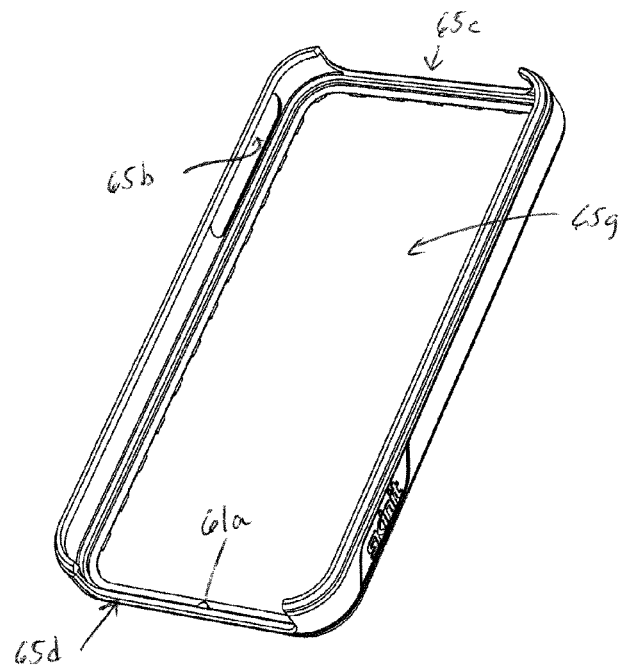
FIGS. 6C-6D are perspective views of the connector and design element illustrated in FIGS. 6A-6B, respectively, illustrating how in one embodiment the mating structure may comprise a notch or kerf located on the design element and a corresponding or mating protrusion on the connector.
Figures 6D, 7:
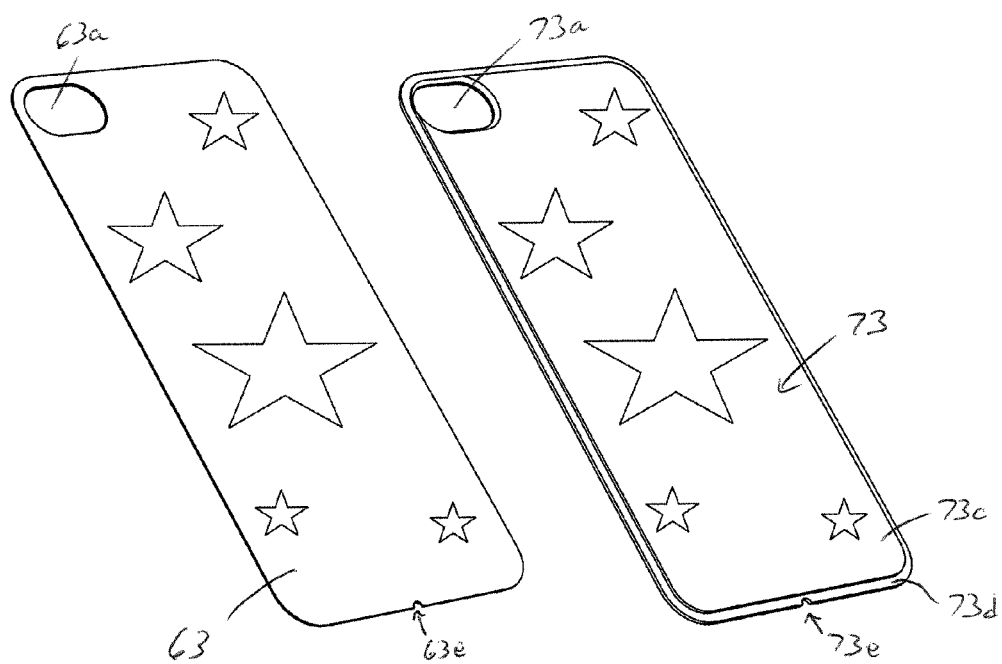
FIG. 7 is a perspective view of alternate design element embodiment in accordance with another embodiment that may be used in place of or in combination with the uniformly thick design element illustrated in FIGS. 6A-6D, which illustrates a substrate of varying thickness, such as a stepped configuration.

Another structure for personalizing a consumer product in accordance with some embodiments is illustrated in FIGS. 5A-5B. In keeping with prior practice, this embodiment will use the same reference numerals for similar items as those discussed above but with the addition of the prefix "5" to distinguish one embodiment from another. In the form illustrated, the consumer product comprises a tablet computer 54 and the structure for personalizing the tablet comprises a design element, such as substrate 53 and a connector, such as bumper or frame 51. In this embodiment, substrate 53 preferably has a stepped configuration wherein at least a portion of the design is raised above another portion of the substrate 53. For example, in the form illustrated, first portion 53c is raised with respect to second portion 53d. The exemplary circular designs illustrated in FIGS. 5A-5B are all contained on the raised portion 53c, however, in alternate embodiments it should be understood that the designs used may be located on the non-raised portion 53d or may be positioned on both the raised and non-raised surfaces 53c, 53d, respectively, and/or may contain any number of different images. In the form illustrated, the raked portion 53c is generally planar, however, in alternate embodiments this structure may not be planar so as to allow for more designs, such as 3D designs, to be used if desired. In one form, the planar raised portion 53c is flush with the surface of the frame 51. In other forms, the planar raised portion 53c may be recessed or extend above the frame 51. In some embodiments, the raised portion 53c may have several different raised levels to implement further steps, texture or structure in the portion 53c.

One advantage to the stepped design illustrated in FIGS. 5A-5.13 is that the lowered or non-raised portion 53d of substrate 53 forms a generally planar lip or rim which can be overlapped by at least a portion of frame 51 to secure the design element 53 to the consumer product 54. In addition, the raised surface 53c forms a shoulder that extends through the central opening 55g of frame 51 and can thus be used to help position or align the design element 53 with respect to frame 51 so that it not only fits, but also displays the design element 53 in the intended manner or fashion. This lip and shoulder configuration further secures the design element 53 in position and prevents the design element from sliding or slipping out of position in any direction (i.e., prevents unintentional x, y or z axis movement of the design element 53), in alternate forms, the design element 53 and cover opening 55g may be further designed to correspond in shape with one another and to use such corresponding shapes to help orientate, (in addition to position), the design element 53 with respect to the cover 51 and/or consumer product 54. For example, the opening 55g, and raised surface 53c may both have particular corresponding shapes (e.g., like mating triangular shapes, etc.) that not only help position the design element 53 on the tablet computer 54, but also help orientate it in a particular direction on the tablet 54. In this example, if the corresponding shapes are in the form of equilateral, isosceles or scalene triangles, the design element 53 would be capable of being positioned and orientated on the consumer product 54 and in the cover 51 in different number of orientations per shape. For example, the design element would likely be positionable on the consumer product 54 in numerous orientations with the equilateral triangle design (e.g., at least three per side for a total of six orientations), in two orientations with the isosceles triangle design (e.g., one per side for a total of two), and one orientation with the scalene triangle design.

In the form illustrated in FIGS. 5A-5B (and like other embodiments discussed above), the frame or cover 51 includes openings or cutouts for functional items of the electronic component 54, like camera and/or camera and flash opening 55a located on the face of the cover 51, volume and power input openings 55b, 55c, respectively, located on the side of the cover 51, and power jack/SIM connector opening 55d. In addition, the cover 51 includes a speaker notch or opening, 55e and cover cutout or opening 55f which is designed to allow for or accommodate a tablet cover that is snapped onto or already connected to consumer product 54, such as the IPAD SMART COVER put out by Apple, Inc. In the form illustrated, a mute input is also positioned next to the volume inputs and located within volume opening 55b. Similarly, an earphone or headset jack is located within the power opening 55c. The cover 51 further includes a display or screen opening 51g which is generally centrally located in the face of the cover 51 so that the display or screen of the tablet computer 54 remains visible once the cover 51 is attached thereto. As mentioned above, these openings allow the consumer to decorate the consumer product 54 with cover 51 without sacrificing any functionality or functional use of the consumer product 54. In yet other embodiments, fewer or less openings may be included in cover 51 if desired and any one or more of these openings may be broken-up into two or more openings if desired (e.g., such as collage openings 6 discussed above).

As mentioned above, design element substrate 53 may include imagery on one side or both sides and may be reversible if desired. Again, U.S. Provisional Patent Application No. 61/553,847, filed Oct. 31, 2011 by Hegemier et al and entitled "Method and Apparatus for Personalizing Consumer Products" is incorporated herein by reference in its entirety with respect to such reversible design element concepts. If the substrate 53 in FIGS. 5A-5B is reversible, however, the substrate 53 will preferably be designed so that the non-raised portion 53b of the design element is designed so that the lip 53d can be overlapped by at least a portion of the cover 51 regardless of what side is positioned against, the consumer product 54 or what side is visible with respect to opening 55g. For example, in one form, both sides of the raised portion 53c of substrate 53 will be raised with respect to the non-raised portion 53d. Meaning that in at least some forms, shoulders separate the raised portion 53c and non-raised portion 53d on both sides of the substrate 53.

In one form, the non-raised portion 53d may be generally centrally located between opposite sides of the substrate 53 and the raised portions 53d on those opposite sides so that the cover 51 can overlap at least a portion of the lip formed by the non-raised portion 53d regardless of what side of the substrate 53 is positioned against the consumer product 54 or regardless of how the substrate is oriented when it is sandwiched between the consumer product 54 and the cover 51. The reversible nature of substrate 53 may effectively double the useful life of the structure by allowing the consumer or user to simply flip the substrate 53 once the images or designs on one side become too worn for the consumer's liking. Furthermore, it may allow the consumer to use a more formal or conservative design on one side, such as for work, and a more casual or personal design on the opposite side, such as for non-work environments. Thus, a consumer can readily change the structure from containing a family themed design to something more professional or formal such as various logos or marks of a consumer's employer or work-related designs.

As mentioned above, the substrate 53 may also be made in a variety of different forms, shapes and sizes, and using a variety of different materials. For example, in the form illustrated, the substrate 53 is a PSA skin as discussed above that adheres to an outer surface of the consumer device. In another form, however, the substrate 53 may be a dual sided leather piece with printable and/or paintable surfaces on at least one side thereof. In alternate embodiments, the substrate of the structure 53 may be made of wood, metal, glass, plastic, vinyl, fabric or other fibrous material (whether natural or synthetic) or any combination thereof, and may be in the shape of a smaller or larger geometrical or non-geometrical design, designs or combinations thereof, and/or may be symmetrical or asymmetrical. Further, the structure may be of varying degrees of rigidity or flexibility and may or may not adhere to the consumer product. For example, in one form, the substrate 53 may be a non-adhesive sheet that rests over the top of the consumer product, rather than adhering to the device. In yet other forms, the substrate 53 may be provided in a plurality of pieces, rather than as one single piece. In some embodiments, the substrate may be at least partially transmissive to light. For example, the substrate may be transparent or translucent, tinted, etc.

It also should be appreciated that the imagery elected to be used on any of the sides of substrate 53 may be any of the examples of imagery described, or incorporated herein and may be selected from any number of different designs, shapes, sizes and materials. For example, one image may be of the substrate material itself, such as raw wood or leather. Whereas, another image may be selected from anything such as, but not limited to, a logo, picture, design, pattern, word, words, drawing, texture, etc., or may be of the substrate material itself (whether the same or different than that used in the first image) or an outer layer applied to the substrate 53.

In the form illustrated in FIGS. 5A-5B, the substrate 53 may be single or multi-layered. For example, in a multi-layered form, the substrate 53 may include a base substrate layer and may optionally have an additional layer or layers applied on one or both sides of the base substrate layer to form the first and/or second images of the substrate 53, respectively, and collectively the substrate 53 itself. As mentioned above, in some forms a protective coating, such as a finish or top coat layer may be applied over the substrate images in order to protect the images. Exemplary layering diagrams and construction/assembly methods for creating such a specimen 53 and/or protective coatings are disclosed or incorporated by reference in U.S. Provisional Patent Application No. 60/856,495, filed Nov. 3, 2006 by Hegemier and entitled "Fulfillment Integration", U.S. Utility patent application Ser. No. 11/726,960, filed Mar. 23, 2007 by Hegemier and entitled "Adhesive Cover for Consumer Device", and U.S. Utility patent application Ser. No. 11/759,600 filed Jun. 7, 2007 by Hegemier and entitled "Fishing Lures and Adhesive Covers for Same", which are collectively incorporated herein by reference in their entirety.

The image or images may be applied to the substrate 53 in any of the manners discussed or incorporated, herein including, but not limited to, printing, painting, etching, texturing or by application of one or more materials such as fabrics, leather, etc. in addition, first side imaging may be used wherein the imagery is applied to an exposed surface of the component or substrate. In alternate forms, backside imaging may be used wherein the imagery is applied to an unexposed surface of the component or substrate. In still other forms, a combination of front side and backside imaging may be used if desired. In this regard. U.S. Provisional Patent Application No. 61/554,473, filed Nov. 1, 2011 by Hegemier et al., and entitled "Method and Apparatus for Customizing Consumer Products with Images applied to Second surfaces of Light Transmissive Structures", is hereby incorporated herein by reference in its entirety.

Although the firm illustrated in FIGS. 5A-5B shows the shoulder portion being formed in the area where the design element 53 transitions from the lower surface 53d to the raised surface 53c and traveling about the entire outer portion of the design element 53, it should be understood that in alternate embodiments, the shoulder portion may be located elsewhere on the design element 53 and may cover any amount of the design element 53 that is desired. For example, in one form, the stepped configuration of the design element may be used in only a small portion of the design element to serve as an alignment mechanism for aligning and orientating the design element 53 in a manner similar to that discussed above with respect to the embodiment of FIGS. 3A-3C.

Another example of such an alignment mechanism is illustrated in FIGS. 6A-6D, which depicts a structure for customizing a consumer product in accordance with another embodiment of the invention. More particularly, the consumer product in this form is a smart phone that has a substrate or plate type design element connected to the phone along with a cover or bumper, similar to the embodiment discussed above with respect to FIGS. 2A-2B, but the design element and cover include mating structures that are used to align and/or orientate the design element on the consumer product. In keeping with prior practice, this embodiment will use the same reference numerals for similar items as those discussed above but with the addition of the prefix "6" to distinguish one embodiment from another.

In the form illustrated in FIGS. 6A-6D, the design element or substrate 63 is positioned over a surface of the phone 64 and secured thereto by connector or cover 61. The substrate 63 has a notch, such as kerf 63e, for receiving a protrusion, such as knob 61a, located on an inner surface of the cover 61. In as preferred form, the knob 61a, 63e correspond in shape with one another in order to mate with one another. These mating structures 61a, 63e help align the substrate 63 and cover 61 so that the substrate 63 is securely held by the cover 61 once installed on the phone 64. In addition, these mating structures 61a, 63e may further help orientate the substrate 63 so that it is positioned properly on the phone 64 and under the cover 61. More particularly, in the form illustrated the substrate 63 must be positioned on the phone so that the notch 63c matches up with protrusion 61a in order for the cover 61 to properly fit over the phone 64 and substrate 63. For example, if substrate 63 is positioned on the phone 64 with the notch 63e at the top of the phone 64, the cover 61 will not fit properly cover the phone 64 thereby indicating the substrate is not orientated correctly. To fix this, the user will have to position the substrate 63 so that the notch 63e is positioned at the bottom of the phone 64 so that the protrusion 61a can be fit into notch 63e and the cover 61 can be fully inserted onto the phone. If the user tried to simply rotate the cover 61, the openings defined by the cover (e.g., 65b, 65c, 65d, etc.) would not fit properly over their corresponding inputs on the phone 64 and, thus, the user would know that the cover is not oriented properly. Generically, the notch/kerf 63e and protrusion 61a (and other forms described herein) may be referred to as first and second alignment members (or mating members or structures) that mate or align together in order to ensure a desired fit, position and/or orientation of the personalizing structure 33.

An additional benefit to such mating structures is that a vendor can ensure that only its substrates 63 will be used with cover 61 and not those of another vendor. In addition, the vendor's substrates should remain usable with other vendor's products due to the lack of such mating structures being present on the other vendor's products. This allows the vendor to maintain the quality of its products and the products used with its products, without limiting the vendor's ability to make sales of its products for use with other vendor's products. Thus, product that is of inferior quality or design can be kept from being used with the vendor's products with the use of such mating structures.

Although the illustrated embodiment shows the substrate 63 having the notch 63e and the cover 61 having the protrusion 61a, it should be understood that in alternate embodiments the substrate 63 could have the projection and the cover 61 could have the mating recess or notch. In still other forms, a combination of these features could be used on both the substrate 63 and the cover 61 (e.g., the substrate could have a notch and projection and the cover could have a corresponding projection and notch that mate with the notch and projection of the substrate). Similarly, although a notch 63e and protrusion 61a of a particular shape and size is illustrated, it should be understood that these mating structures could be designed in a variety of different shapes and sizes (e.g., any mating projection and recess, mortise and tenon, groove and tongue, etc). Some shapes and sizes could be chosen to correspond in shape and size with their respective mating structure, alternatively in some embodiments more general shapes and sizes could be used that are not necessarily meant to correspond in shape or size with their respective structures, but rather are meant to be of a sufficient shape or size to be able to be used with their respective mating structure (e.g., for example a large rectangular notch could be used that does not necessary correspond in shape to its corresponding mating semicircular structure, but is large enough so that the semicircular structure can fit within its rectangular shape). As mentioned above, however, in a preferred form the mating structures 61a, 63e will correspond in shape and mate with one another. Even with mating structures that correspond in shape and size, however, it should be understood that numerous different ornamental shapes and sizes may be used for these mating structures and, thus, the shapes selected do not themselves make-up the functionality of the disclosed mating features.

Like the above mentioned embodiments, the substrate 63 of FIGS. 6A-6D may be made in as variety of different forms, shapes, sizes and from a variety of different materials. For example, in one form the substrate 63 is a plate made from wood, metal, plastic, vinyl, glass, fabric or other fibrous materials (whether natural or synthetic), etc., with images applied to one or both sides of the substrate 63, e.g., first or second surface imaged, having cutouts or openings if desired) and using the image deposition methods disclosed or incorporated herein including, but not limited to image deposition via printer, laser, chemical etching or other known image deposition processes.

In forms where both sides of the substrate 63 contain images, consumers can readily switch between the images by simply removing, flipping and reinstalling the substrate 63 on the consumer product 64. Alternatively, and regardless of whether the substrate 63 has images on both sides, consumers can simply remove the substrate 63 and replace the substrate 63 with another substrate containing a new and/or different image. This gives the user or consumer the ability to swap a substrate with one design for a different substrate with another design as often as desired. In addition, multiple substrates may be maintained thereby allowing the user or consumer to change from a plurality of substrates without being limited to the one or two images or collages of images that may exist on a substrate. In one form, the connector 61 may be designed to hold more than one substrate 63 so that the user can simply place the substrate with a desired image on top of the others so that it is displayed to those who look at the consumer device while the other substrates are hidden below. In a preferred form, however, the connector or cover 61 will hold only one substrate 63 in order to maintain a small size and profile.

In the form illustrated in FIGS. 6A-6D (and like the previously discussed embodiment of FIGS. 2A-2B), the connector or bumper 61 is a resilient but flexible material that has a generally U-shaped cross section allowing, the consumer product 64 to be inserted within the IS-shaped channel formed by the cover or bumper 61. More particularly, when connecting the design element 63 to the consumer product 64, at least a portion of one of the legs of the U-shaped structure will preferably overlap a portion of the design element 63 to secure the design element 63 to the consumer product 64 in a manner similar to that discussed above with respect to FIGS. 2A-2B.

Alternatively, however, a stepped design element may be used like that discussed above with respect to FIGS. 5A-5B. For example, in FIG. 7 such an alternate stepped design element is shown and identified by reference numeral 73 wherein at least a first portion of the design element is raised above another portion (or second portion) of the design element. For example, in the firm illustrated, first portion 73c is raised with respect to second portion 73d. A shoulder is formed where the design element 73 transitions from the first portion 73d to the second portion 73c. When connecting the design element 73 to the consumer product, at least a portion of one of the legs of the U-shaped cover will preferably overlap a portion of the second portion 73d of the design element 73, leaving the raised portion 73c and shoulder to extend through the main or central opening defined by the cover. Thus, the shoulder and raised portion 73c can help position the design element 73d in the cover and prevent the design element from moving or sliding once connected to the consumer product via the cover just like the embodiment discussed above with respect to FIGS. 5A-5B. In one form, the raised portion 73c is flush with the surface of the cover or frame. In other forms, the raised portion 73c may be recessed or extend above the cover or frame. In some embodiments, the raised portion 73c may have several different raised levels to implement further steps, texture or structure in the portion 73c. In addition, however, the design element 73 will have alignment members or mating structures, such as notch or kerf 73e which can also be used to mate the design element 73 with the cover and/or orientate the design element 73 with the cover. As with the embodiments discussed above, the mating structure may take on any shape and size and may be positioned in either the first portion 73c or the second portion 73d, or a combination of both. In the form illustrated, the design element 73 further defines a camera opening 73a similar to the embodiments discussed above.

Turning back to the embodiment illustrated in FIGS. 6A-6D, the cover 61 may also include a design and, in some forms, the design element may itself be incorporated into the cover 61. For example, in the form illustrated, the sides of the cover 61 are shaded to indicate a portion of the cover 61 that is colored to look silver while the remaining portions of the cover 61 are colored to look black leaving a combined silver and black color scheme or appearance to the consumer product. This ability to alter the color or appearance of the cover 61 may be used to replicate the appearance of the consumer device being covered or to simulate a different consumer product or its appearance. In addition to this design, the cover may include other design elements besides color if desired. For example, in the form illustrated in FIGS. 6A-6O, the cover further includes an ornamental design in the outer surface of the U-shaped cover 61. More particularly, cover 61 includes a saw tooth design in the outer surface of the same leg of the U-shaped cover that is used to overlap the design element 63. This allows the consumer product display to be ringed or framed in an ornamental way and provides yet another way in which a consumer can personalize his or her consumer product.

As mentioned the illustrated design is merely ornamental in the embodiment illustrated. It should be understood, however, that in alternate embodiments the a functional design may be used, such as a design that minimizes the amount of material needed to manufacture the cover 61 and/or that minimizes the amount of mold time required to manufacture the cover 61. In other forms, the selected design may be used to further hold the substrate 63 onto the consumer device or to secure the substrate 63 to the cover 61. For example, in another form the teeth of the saw tooth design might be used to create a slot or recess within which at least a portion of the substrate 63 is inserted to secure the substrate 63 to cover 61.

Alternatively, in yet other forms, the design element 63 may be incorporated into the cover 61 so that no separate design element 63 is needed or used. In some forms this may mean that the cover 61 is less a U-shaped bumper and more a cup-shaped cover, while in other forms, this may mean that there is no design element on the back of the consumer product as shown in the above-mentioned embodiments, but rather the entire design element is incorporate in the U-shaped bumper itself. In a preferred form, however, the structure for customizing the consumer device 64 will include a cover 61 and separate design element 63 which can be flipped, swapped and/or replaced as discussed above.

In addition to allowing consumers to readily swap or flip the design element 63 to display different images, the structure illustrated in FIGS. 6A-6D may also be designed to allow consumers to swap or reverse the cover or bumper 61. For example, consumers may collect bumpers 61 of different colors, patterns, designs, styles, etc. and swap among these different bumpers to further personalize and/or customize their consumer products. In other forms, a single bumper 61 may be provided with different imagery on opposite sides so that consumers can display one image or design and then remove and turn the bumper 61 inside out to display another image or design (which may or may not be the same as or similar to the first image or design).

Figure 8A:
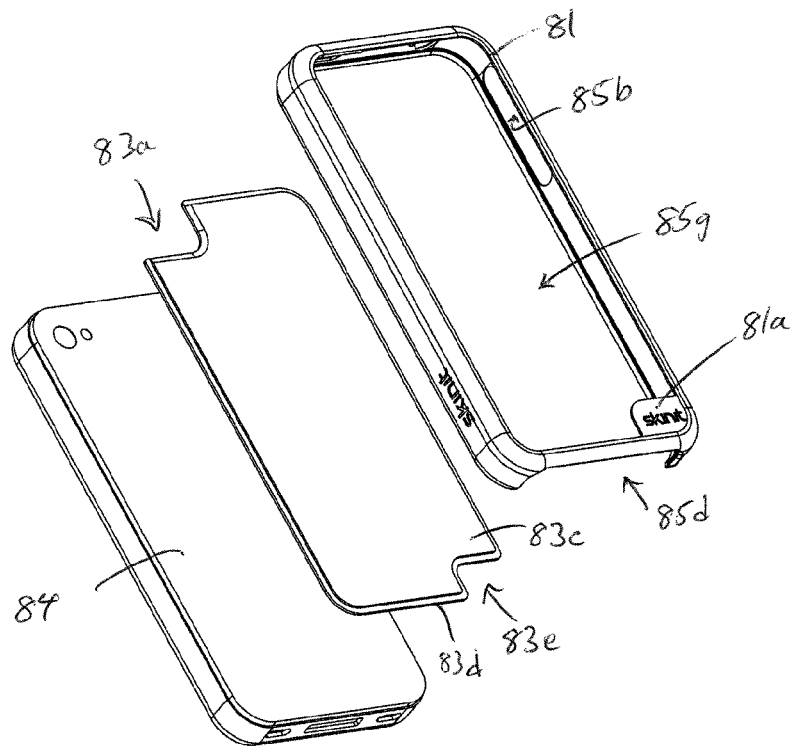
FIGS. 8A-8B are exploded and perspective views, respectively, of another structure used to personalize an exemplary consumer product, such as a smart phone, in accordance with another embodiment, with the illustrated structure comprising a design element and connector having an asymmetrical mating arrangement that allows the design element and connector to only be assembled in a desired manner, such as a single orientation.
Figure 8B:
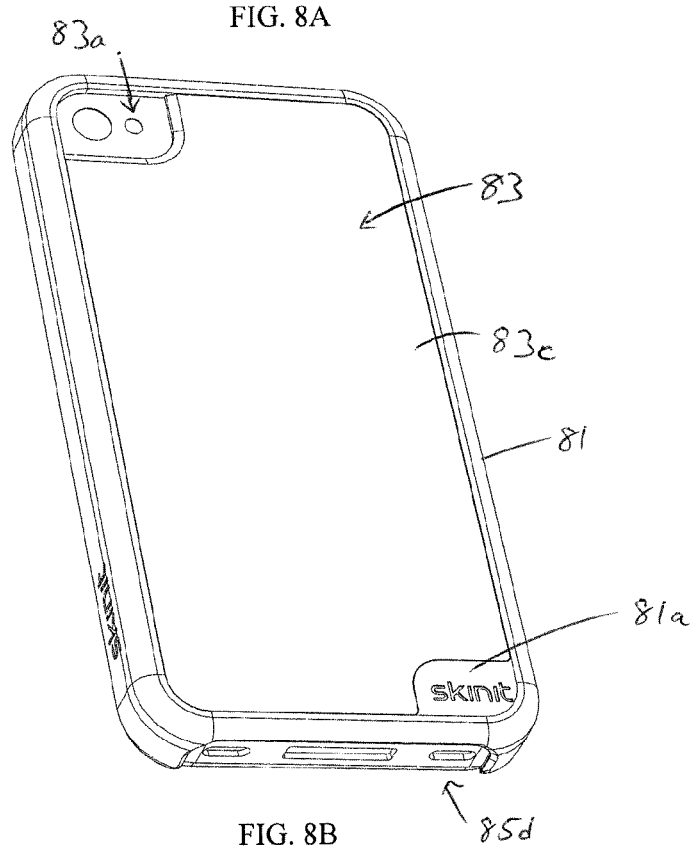
Figure 12A:
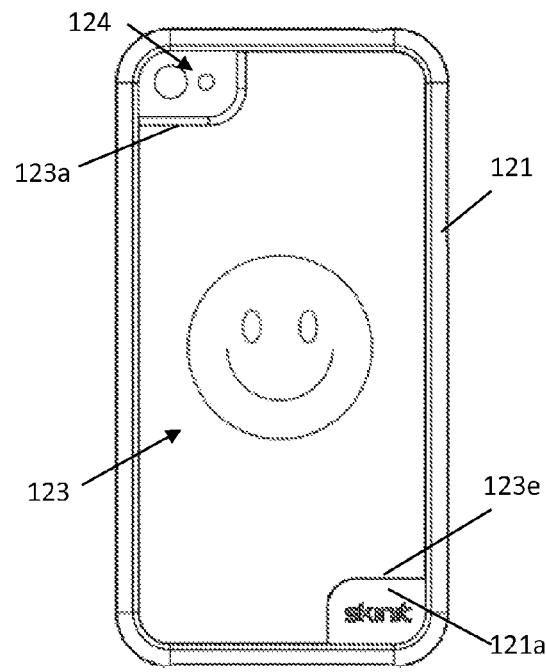
FIGS. 12A-12B are plan views of another embodiment of a design element and connector having a mating arrangement configured such that the design element may be rotated and coupled to the connector in more than one orientation of a first surface of the design element according to some embodiments.
Figure 12B:
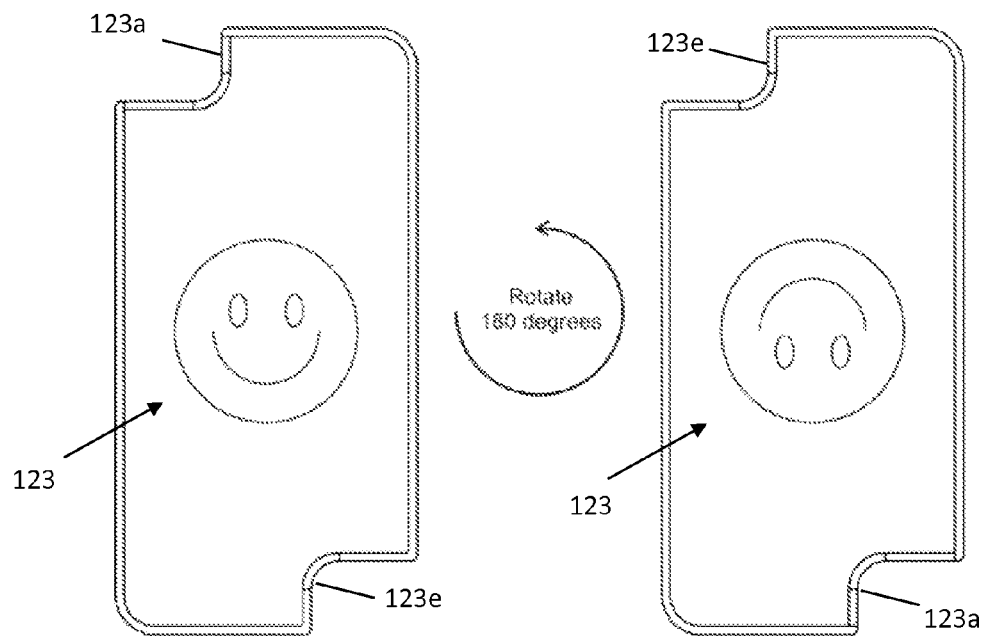
Figure 13A:
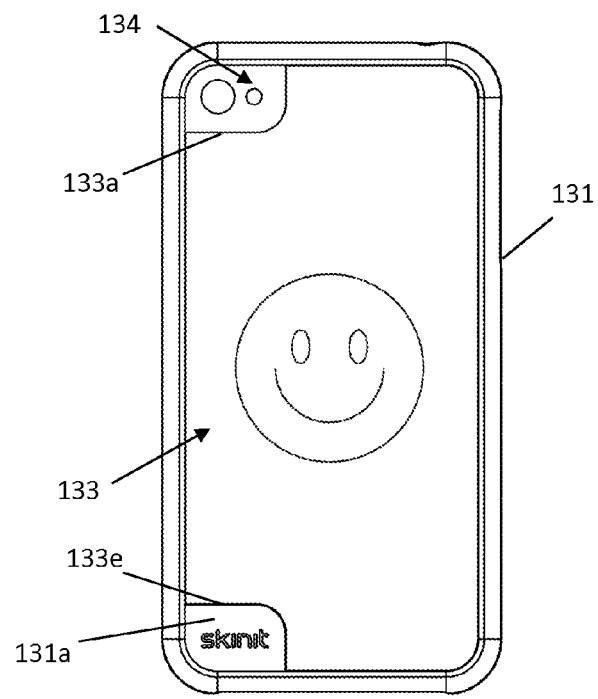
FIGS. 13A-13B are plan views of another embodiment of a design element and connector having a mating arrangement configured such that the design element may be flipped or reversed, and coupled to the connector such that either of a front surface or a back surface of the design element is viewable according to some embodiments.
Figure 13B:
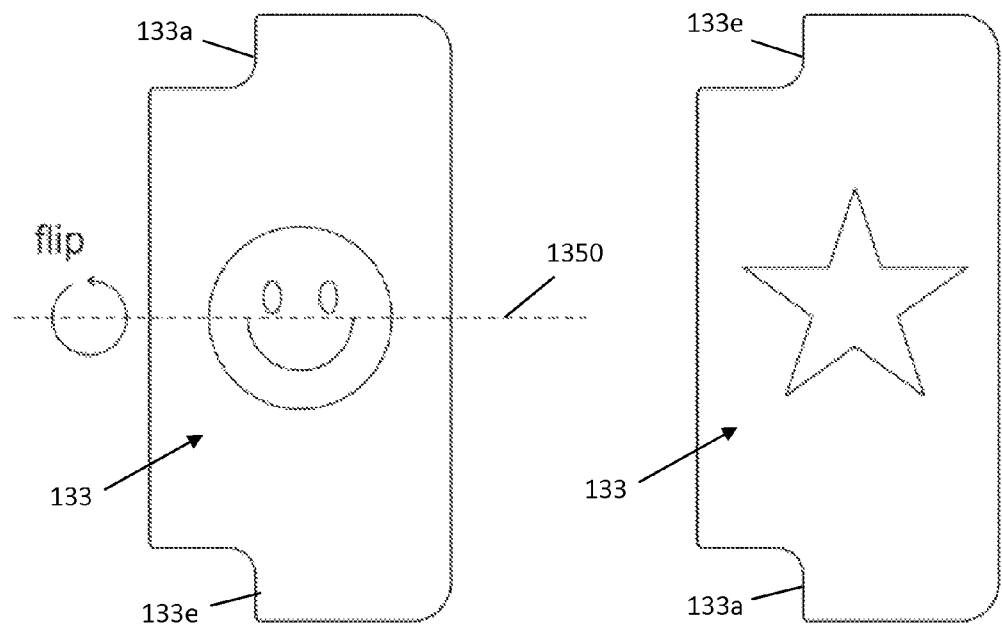

Although the form illustrated in FIGS. 6A-6D shows mating structures 61a, 63e that are symmetrical about a longitudinal axis of the consumer product so that the design element can be designed to be reversible if desired, it should be understood that in alternate forms the mating strictures may be designed such that the substrate and cover have asymmetrical mating structures so that the design element can only be connected to the consumer device via the cover in a limited number of orientations. An example of this is illustrated in FIGS. 8A-8B. In keeping with the above-practice, items that are similar to those discussed above will use the same reference numeral, but with the addition of the prefix "8". Thus, in the form illustrated, the consumer product is a smart phone 84, the design element is a plate or substrate 83 secured to the phone 84 via a connector, such as bumper or cover 81. The design element 83 has a stepped configuration and is secured to the phone 84 via, one leg of the U-shaped bumper 81 overlapping with the non-raised surface or rim 83d of the design element 83. The design element defines a camera opening 83a and a mating or alignment member or structure, such as recess 83e. In these embodiments, the alignment structure 83e is configured so that the cover 81 is not symmetrical about the longitudinal axis of the cover. For example, as illustrated, the camera opening 83a and the recess 83e are on opposite corners, and are both differently shaped. Thus, the cover 81 is asymmetrical about its longitudinal axis and, in the form illustrated, only allows the design element 83 to be secured to the consumer device 84 in one orientation. In some embodiments, the camera opening 83a and the recess 83e are sized the same such that the design element can be selectively secured to the consumer device in one of two orientations such as illustrated in the embodiments of FIGS. 12A-12B. In other embodiments, the design element 83 and mating structure 81a may be designed so that the design element may be selectively flipped and coupled to the connector or cover 81 so that either the front surface or the back surface of the design element is visible to the consumer in order to change the appearance of the consumer product, such as illustrated in the embodiments of FIGS. 13A and 13B. It is noted that in this, and some other embodiments described herein that the bumper or cover is configured to removably connect to at least two sides of the phone, where the at least two sides are substantially perpendicular to the back surface of the phone, e.g., such as the Apple™ iPhone™ is shaped.

Again, as stated above, the mating structures 81a, 83e may be designed in a variety of different ornamental shapes and sizes. Some corresponding in shape and size with one another, while others either do not correspond with one another in shape and size, or correspond only very generally in shape and size (e.g., one being large enough to receive the other, but not necessarily having a similar shape). Even with the mating structures that correspond in shape and size, however, it should be understood that numerous different ornamental shapes and sizes may be used for these mating structures and, thus, the shapes selected do not themselves make-up the functionality of this mating feature. In addition, it should be understood that in alternate embodiments the mating structures 81a, 83e may be reversed, so that the cover contains the notch and the design element contains the projection. In still other forms, both the design element 83 and cover 81 may include one or more combination of mating structures (e.g., projections and notches, tongue and grooves, tenon and mortise, etc).

In the form illustrated in FIGS. 8A-8B, the consumer product is illustrated as a smart phone 84. However, as mentioned above, the consumer product may be any product purchased by consumers, such as electronic devices like laptop computers, tablet computers, game systems, PDAs, UPS units, two-way communication devices, etc. For example, in FIGS. 9A-9B an alternate embodiment is illustrated showing a tablet computer as the consumer product. As done above, items that are similar to those previously discussed will use the same reference numeral but include the prefix "9" to help distinguish one embodiment from another. In the form illustrated, a cover 91 similar to the cover previously discussed with respect to FIGS. 5A-5B is illustrated but having a mating structure 91a to align with a design element 93 having a corresponding mating structure somewhat similar to those discussed with respect to FIGS. 8A-8B. More particularly, in the form illustrated, a stepped design element 93 is connected to the tablet computer 94 via cover 91. The raised portion 93c and the non-raised portion 93d of design element. 93 and shoulder created by same helps position the design element 93 in cover 91 and on tablet 94. Like the cover of FIGS. 5A-5B, cover 91 further includes a plurality of functional openings to allow the cover to be used without negatively affecting the functionality of the consumer product 94. For example, cover 91 includes a camera opening 95a, volume and mute input opening 95b, docking port opening 95d, speaker opening 95e and consumer product cover opening 95f.

In the illustrated embodiment, the cover 91 and design element 93 have an asymmetrical design that only allows the design element 93 to be positioned within the cover 91 in one orientation. More particularly, the cover 91 includes a mating structure, such as projection or tab 91a and a corresponding mating structure, such as recess or notch 93g in the design element 93 which corresponds in shape with projection 91a and, together with projection 91a, helps align and orientate the design element 93 on the consumer product 94. More particularly, the tab 91a and recess 93g correspond in shape with one another and the asymmetrical design of these mating structures 91a, 93g is such that the design element 93 can only be connected to the tablet computer 94 via cover 91 in one direction due to the fact the design element 93 does not also define an opening, for the camera like the embodiment of FIGS. 8A-8B did (rather in this embodiment the camera opening 91a is defined by the cover 91, not the design element 93). Thus, if a user tries to place the design element 93 in an orientation other than the one shown, the design element 93 will not it within the main opening of the cover 91 and, thus, would either prevent the cover 91 from fully connecting to the consumer product 94 or cause the tab 91a to stick up from the consumer product 94 in an undesirable fashion.

It is also noted that generically, the mating structures 81a, 83e, 91a and 93g may be referred to as first and second alignment members (or mating members or structures) that mate or align together in order to ensure a desired fit, position and/or orientation of the personalizing structure.

In some embodiments, the cover may be designed with a symmetrical tab 91a and recess 93g on the opposite corner of the cover 91 such that the design element can be selectively secured to the consumer device in one of two orientations, for example, in a manner similar to that illustrated in the embodiments of FIGS. 12A-12B. In other embodiments, the design element 93, cover 91 and mating structures 91a and 93g may be designed so that the design element may be selectively flipped and coupled to the connector or cover 91 so that either the front surface or the back surface of the design element is visible to the consumer in order to change the appearance of the consumer product, for example, in a manner similar to that illustrated in the embodiments of FIGS. 13A and 13B. It is noted that in this, and some other embodiments described herein that the cover is configured to removably connect to at least two sides of the tablet computer, where the at least two sides join the front surface and the back surface, the at least two sides curve into the back surface of the tablet computer, phone or other device.

Figure 9A:
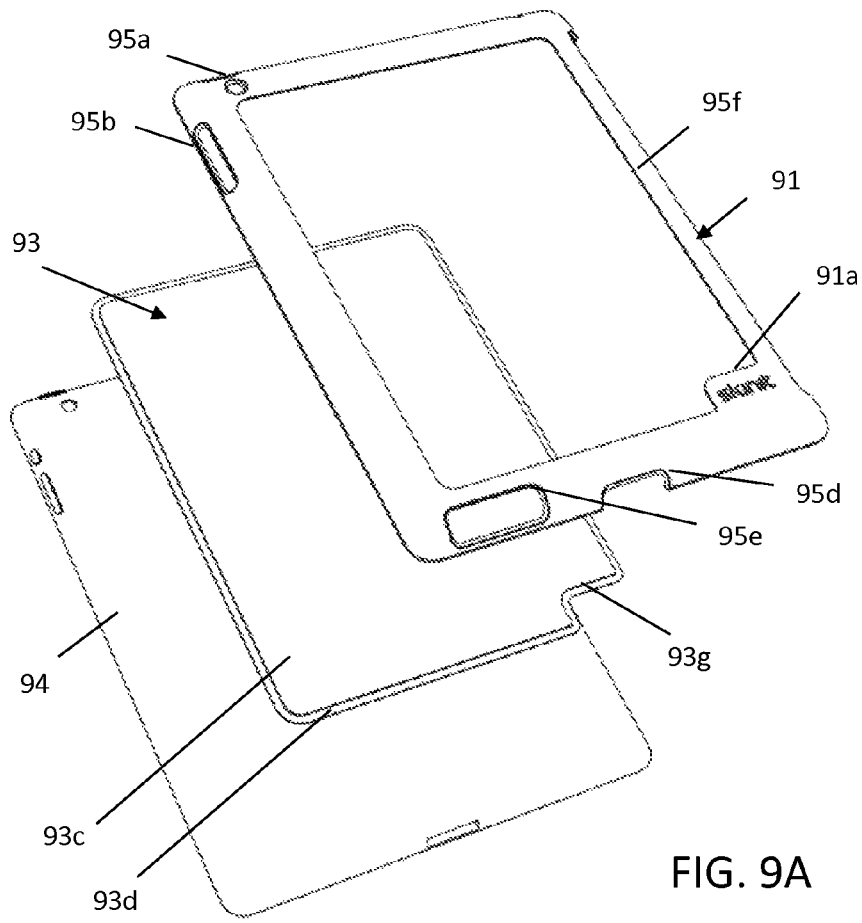
FIGS. 9A-9B are perspective and enlarged views, respectively, of another structure used to personalize an exemplary consumer product, such as a tablet computer, in accordance with another embodiment, with the illustrated structure comprising a design element and Connector similar to that illustrated in FIGS. 8A-8B.
Figure 9B:
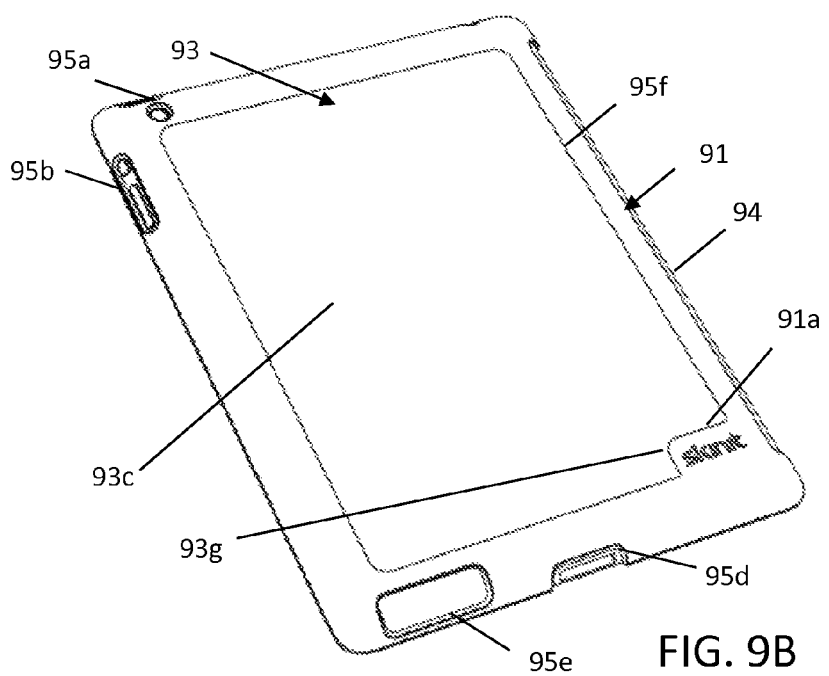
Figure 11A:
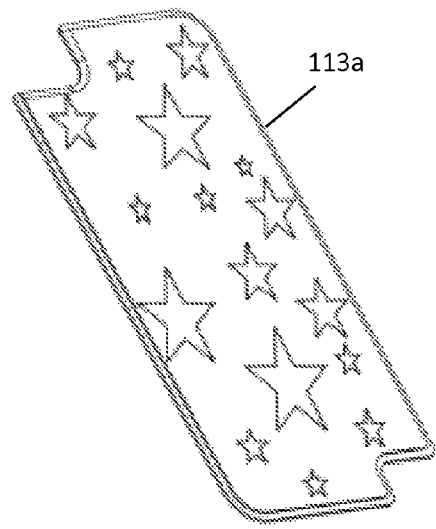
FIGS. 11A-11C are perspective views of different design elements that ma be interchangeably used with another exemplary consumer product, such as that shown in FIGS. 8A-8B in accordance with some embodiments.
Figure 11B:
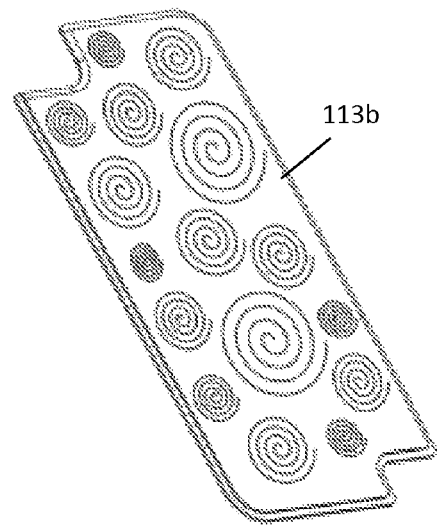
Figure 11C:
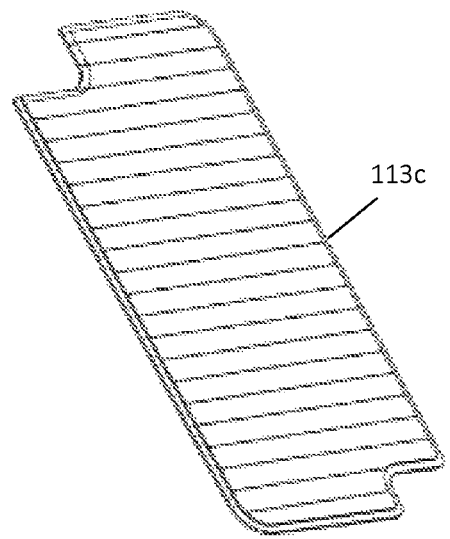

Referring next to FIGS. 10A-10D, perspective views are shown of a structure used to personalize an exemplary consumer product, such as a tablet computer, in accordance with another embodiment, with the illustrated structure comprising a design element and connector similar to that illustrated in FIGS. 9A-9B where a user can select and interchange between different design elements 103a, 103b, 103c (FIGS. 10B-10D) to differently personalize the product in this way, the user can selectively insert/remove, connect/disconnect and/or couple/uncouple a selectable one of a plurality of differently appearing design elements 103a, 103b, 103c, and so on. In some cases, a user may purchase or may be provided a set of different design elements for the user to select from. At any time, the user could remove a given design element and select a different design element having a different design or imagery. It is understood this level of interchangeability of design elements is applicable to any of the embodiments described herein. For example, referring to FIGS. 11A-11C, perspective views are shown of different design elements 113a, 113b, and 113c that may similarly be interchangeably used with another exemplary consumer product, such as the consumer product 84 and cover 81 shown in FIGS. 8A-8B in accordance with some embodiments.

Referring next to FIGS. 12A-12B, plan views are shown of another embodiment of a design element 123 and connector or cover 121 having a mating arrangement configured such that the design element 123 may be rotated and coupled to the cover 121 in more than one orientation of a first surface of the design element 123 according to some embodiments. In this exemplary embodiment, the camera opening 123a is sized similarly to the recess 123e of the design element 123 so that it can mate with the mating structure 121a. Accordingly, the design element 123 can be selectively secured to the consumer device in one of two orientations, i.e., in one orientation (left orientation of FIG. 12B) and the other orientation where the design element 123 is rotated one hundred eighty degrees (180°) but with the same side facing up from the consumer product 124 (right orientation of FIG. 12B). It is understood that the features of this embodiment may be applied to any of the embodiments described herein.

Referring next to FIGS. 13A-13B, plan views are shown of another embodiment of a design element 133 and connector or cover 131 having a mating arrangement configured such that the design element may be flipped or reversed and coupled to the connector such that either of a front surface or a back surface of the design element is viewable on the consumer product 134 according to some embodiments.

In this exemplary embodiment, the camera opening 133a is sized similarly to a recess 133e of the design element 133. The recess 133e is configured to mate or align with a mating structure, e.g., protrusion or tab 131a. In the illustrated embodiment, the tab 131a and the recess 133e are located opposite of the camera opening 133a and on the same side of the element 133 as the camera opening 133a. That is, the design element 133 is symmetrical or mirrored about a horizontal axis 1350. Accordingly, the design element 133 can be selectively secured to the consumer device in one of two orientations, i.e., in one orientation (left orientation of FIG. 13B) and the other orientation where the design element 123 is rotated or flipped one hundred eighty degrees (180°) about the axis 1350 with the opposite side facing up from the consumer product 124 to reveal a different image or design (right orientation of FIG. 13B). It is understood that the features of this embodiment may be applied to any of the embodiments described herein.

As illustrated in the embodiment of FIGS. 4A-4B, an optional protective film or layer may be applied to the design element or substrate to protect the design thereon, however, in other forms, the substrate may be entirely replaced with a protective film or layer such as protective coating 2 mentioned above with respect to FIGS. 1A-1B which may be placed over a surface of the consumer product 44 to protect the surface. In still other forms, no substrate or protective film or coating may be used as has been mentioned above.

Although some of the above mentioned embodiments have discussed covers (e.g., guards, bumpers, connectors, etc.) that can make-up part of the overall customization of the consumer product (e.g., collage cover 1, colored or reversible bumper 11, slotted cover 41), it should be understood that in other forms the cover itself might make-up the entire customizing structure for the consumer product. For example, a cover or protector like the collage cover 1, colored or reversible bumper 11 or slotted cover 41 mentioned above, may be provided that defines the entire customizing design element of the component. In yet other forms, the cover and substrate may be designed to collectively form the desired customizing design element for the consumer product. For example, a skin may be applied to the consumer product with a two dimensional design element and the cover may be designed to coordinate with the skin and continue the design across the combined surfaces of the cover and skin and/or possibly form a three dimensional portion of the design, as discussed or incorporated herein.

It is noted that in some embodiments, imagery provided by the design elements described throughout this specification are directly visible to a user via the opening/s formed in the connector structure. For example, a user does not need view the imagery through a transparent intermediary structure (such as a clear plastic cover piece) separate from the design element. Such transparent pieces may become scratched, scuffed or yellowed (sun exposure) that inhibits the user's ability to clearly view the imagery of the design element.

In addition to the above embodiments, it should be understood that several methods are disclosed herein or are incorporated herein by reference for personalizing consumer products. For example, disclosed herein is a method for personalizing consumer products including the steps of providing, a personalizing structure having a cover defining a plurality of cutouts and a substrate containing a collage of images, applying the substrate to a consumer device and aligning and/or orientating the collage of imam and cover so that the collage of images are visible and displayed through the plurality of cutouts in the cover when connected to the consumer device. In addition, methods are disclosed including providing a structure having a first image on a first side of a reversible structure and a second image that may or may not be different from the first image on a second side of the reversible structure, and installing the reversible structure on the consumer product such that the reversible structure may be alternated between having the first image visible when looking at the consumer product and having the second image visible when looking at the consumer product such that a consumer can readily change between the first and second images as desired. Yet other methods are also disclosed including providing swappable cover members and/or substrates and removing and replacing said swappable cover members and/or substrates with flipped or alternate swappable cover members and/or substrates to allow a consumer to customize or personalize their consumer product as they desire. Still other methods are disclosed including methods of customizing a consumer product wherein a substrate, a cover or a combination of both the substrate and cover are used to customize the consumer product with a desired design element. Further methods include providing customizing structures with mating mechanisms for aligning and/or orientating, the design element with respect to the consumer product and/or the cover, or both. These mating mechanisms may be symmetrical or asymmetrical and may have stepped configurations or functional openings for maintaining the functionality of the consumer product and/or accessories for the consumer product such as attachable covers, such as the IPAD smart cover. Still other methods are provided for applying designs to the cover itself rather than an attachable design element and/or applying designs that either replicate the appearance of the consumer product covered by the cover or mimic the appearance of another device. In addition, methods for ensuring the quality of products used with a product are provided. For example, a method of ensuring that a vendor's products are used with its products is disclosed in the above-mentioned embodiments having mating structures. In addition this method maintains the ability of the vendor's products to be used with other vendors' products due to the lack of such mating structures. Other methods relating to the ability to limit the orientations in which a design element is mounted or secured to a device or displayed from a device are also disclosed herein.

It should also be understood that personalized structures like those disclosed herein can be produced in a variety of different ways and using a variety of different business models. For example, personalized structures having unique designs can be manufactured and sold using traditional business models. Alternatively, forecasting business models may be used to create and sell such structures in limited quantities or runs. In yet other forms, on-demand customization business models may be used to create and sell such personalizing structures with unique designs as well.

With respect to on-demand customization, such structures may be made and sold using either an "out of box" business model or an "in box" business model as described in U.S. patent application Ser. No. 13/103,997, filed May 9, 2011 and entitled "Systems and Methods of On Demand Manufacturing of Customized Products", and U.S. Provisional Patent Application No. 61/332,745, filed May 7, 2010 and having the same title, which are both incorporated herein by reference in their entirety. In either model a software management platform, or on-demand platform, may be provided that performs many of the functions described herein. An example of an on-demand platform primarily suited for the out of box model is described in U.S. patent application Ser. No. 11/935,382, filed Nov. 5, 2007 and entitled "Order Fulfillment and Content Management Systems and Methods", published as US Publication No. 2008/0154750, which is also incorporated herein by reference in its entirety.

An example of an interactive interface allowing a user to create a virtual design, for example, in creating imagery for application to products, portions thereof, accessories to products such as covers, shells and/or adhesive skins or materials in both the inbox and out of box models, is described in U.S. patent application Ser. No. 12/267,527, filed Nov. 7, 2008 and entitled "Customizing Print Content", Published as US Publication No. 2009/0122329, which is incorporated herein by reference in its entirety.

An example of a path creation utility for use within an interactive image editor useful to allow a user to create customized image content by overlaying one or more images upon one or more background images to create or define a selected portion of the image content is described in U.S. patent application Ser. No. 12/684,781, filed Jan. 8, 2010 and entitled "Path Creation Utility for Image Editor", which is incorporated herein by reference. One or more of the processes and systems described in one of more of these patent documents may be applied in one or more embodiments of processes implementing various inbox models and/or out of box models such as those described herein.

With respect to on-demand customization, figures incorporated herein by reference illustrate various selectable features that may be specified by an end-user when placing an order for a personalized structures or that may be specified by an OEM or other entity when setting up a catalog entry for an available and pre-approved set of customized imagery for later selection by an end customer in accordance with one embodiment. These illustrations are not meant to be an exhaustive list of all selectable features, and may farther include other features or parameter selections described herein. Optional material preparation parameters for metal or plastic parts include a pre-treatment (typically for metal), base coat, edge trim and/or powder coat. On demand direct to surface substrate printing options for metal or plastic parts, including keyboards, include color, graphics/images, texture (e.g., laser etched texture, topographical texture, primed texture through selective application of print layers), gloss matte, legend (localized), asset tag/barcode (either 2D or 3D barcode), and/or printable UV sealant. UV topcoat options for metal or plastic parts include gloss, semi gloss, matte and/or soft touch. It is understood that any other options such as described herein may also be included such as text, size, font, language, transparency, etc.

As will be described further below, in different embodiments, customized imagery may be applied in a variety of ways. For example, imagery may be applied or printed to a pressure sensitive film (e.g., a form of skin) or an adhesive material applied to a substrate that is, in turn, connected to the product, a portion of the product or to an accessory. For example, this adhesive material may be printed with the desired imagery and then permanently or removably applied to the substrate in a 3D manner, with another image or complimentary image applied to another substrate or portion of substrate in a 2D manner, in yet other forms designs may be applied via painting or priming directly to the consumer product, portions thereof or accessories therefor.

In one example, the 3D substrate is applied to a cellular telephone while the 2D substrate is applied to a cover of the phone. In another form, both the 3D and 2D portions are connected directly to the phone or, alternatively, directly to the phone or to a portion of the phone, such as a battery door. In still other forms, a single 2D or 3D design may be applied to the consumer product, portions thereof or accessories therefor. The designs may be single sided or double sided and may use a panel that is connected to the consumer product via an outer bumper or frame. In other forms variety of different types of consumer products, parts thereof or accessories therefor may be used to apply the designs and personalize the consumer product. For example, in an alternate form the designs may be applied or connected a lid cover and/or base for a notebook computer. In still other forms, collectable designs, such as 3D skins, may be provided which can be removed and traded or swapped for other designs. In other embodiments, at least a portion of the imagery (e.g., 2D, 3D, etc.) is directly panned, printed, transferred, etched or otherwise formed on the consumer product, or alternatively, on a surface of substrate that is in turn connected to the product, portion of the product and/or an accessory of the product. In still other forms, a single 3D skin may be used to customize the consumer product without a complimentary or additional 3D or 2D skin.

Figure 14A:
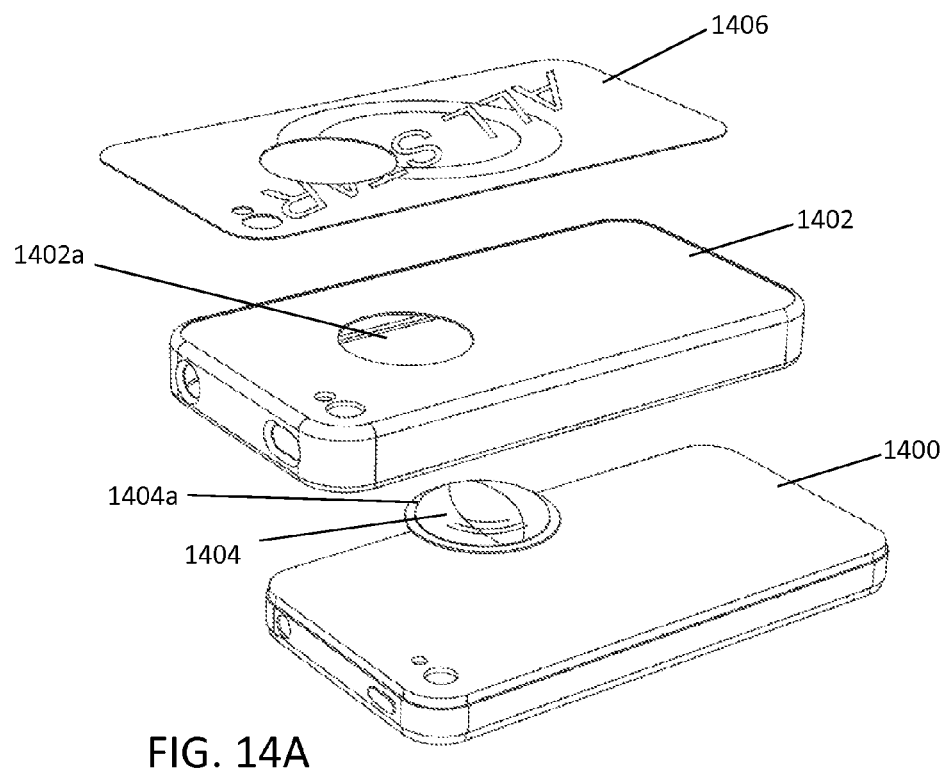
FIGS. 14A and 14B are exploded and perspective views, respectively, of a three dimensional ("3D") skin used to personalize a consumer product in accordance with at least one embodiment of the invention, with the 3D skin connected to the consumer product and a two dimensional ("2D") skin connected to a cover covering at least a portion of the consumer product.
Figure 14B:
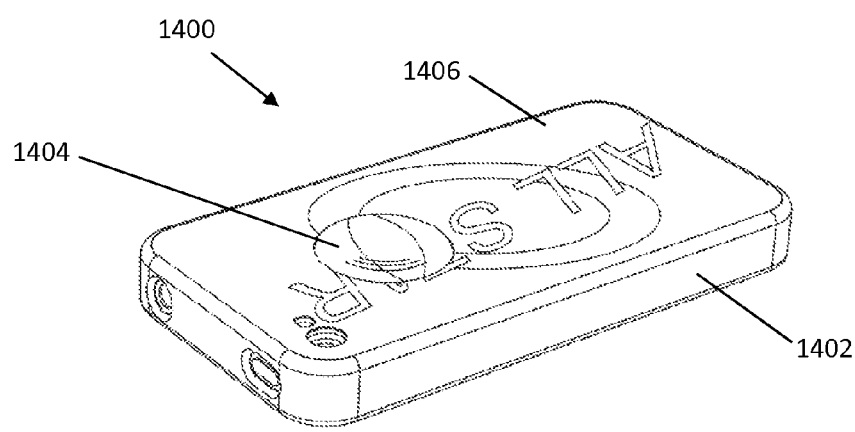

Referring now to FIGS. 14A-14B, there is illustrated a consumer product (also generically referred to as a product or device), such as mobile phone 1400, having an accessory, such as cover 1402, connected thereto, and having 3D and 2D skins 1404, 1406, respectively, connected to at least one of the phone 1400 and/or cover 1402 to personalize the consumer product 1400 in a manner desired by the consumer. In the form illustrated, the 3D skin 1404 is connected directly to the phone 1400 and the 2D skin 1406 is connected directly to the protective cover 1402. In this embodiment, the 3D skin 1404 is in the shape of a round basketball and has a puffy design that can be depressed by a consumer's figure if desired. The 3D skin 1404 has a protective finish coat applied over the outer surface thereof to protect the design that is applied to the 3D substrate that makes up the skin.

In one form, the 3D skin may be connected to the phone 1400 via a fastener, such as an adhesive. While in other forms, the 3D skin 1404 may be designed with a structure that corresponds or mates with cover 1402 in order to secure the 3D skin to the phone 1400 in a desired position. For example, in the form illustrated in FIGS. 14A-14B, 3D skin 1404 includes an annular wall or rim 1404a, which is generally flat and has an outer diameter that is bigger than the diameter of the puff portion of the skin 1404 and/or bigger than the diameter of the opening 1402a defined by cover 1402 so that the portion of cover 1402 that defines opening 1402 rests as a lip over the top of annular wall/rim 1404a to secure the 3D rim to phone 1400 and/or in a desired position. In yet other forms, the 3D skin 1404 may be configured to fit within a corresponding recess or opening on the phone or cover. The fit could be a friction fit to secure the 3D skin to the phone in a desired position without the need for a cover 1402, or alternatively, the fit may be such that the 3D skin merely rests in the recess or on an exterior surface of phone 1400 and is secured into position via the overlying cover 1402 as mentioned above. In still other forms, the 2D skin 1406 or another skin of any type/dimension may be used to secure the 3D skin 1404 in a desired position. In some embodiments, the 3D skin or 3D design element has a height that extends through an opening in the case or other element.

The 3D skin may also be themed to coordinate with the theme of the design applied to the 2D skin 1406 and/or to a theme associated with the phone 1400 or cover 1402. For example, in the thrill illustrated, the 2D skin 1406 has an NBA All Star Game theme and the 3D skin 1404 is in the shape and design of a 3D basketball that extends out from an outer surface of at least one of the phone 1400, cover 1402 and/or 2D skin 1406 (as illustrated in FIG. 14B). The theme of the 3D and 2D skins 1404, 1406, also are coordinated with a theme of cover 1402 in that they are color coordinated with cover 1402. In alternate forms any one or more of these components (e.g., phone 1400, cover 1402, skins 1404, 1406) may be designed to coordinate themes or not coordinate themes if desired.

Figure 15:
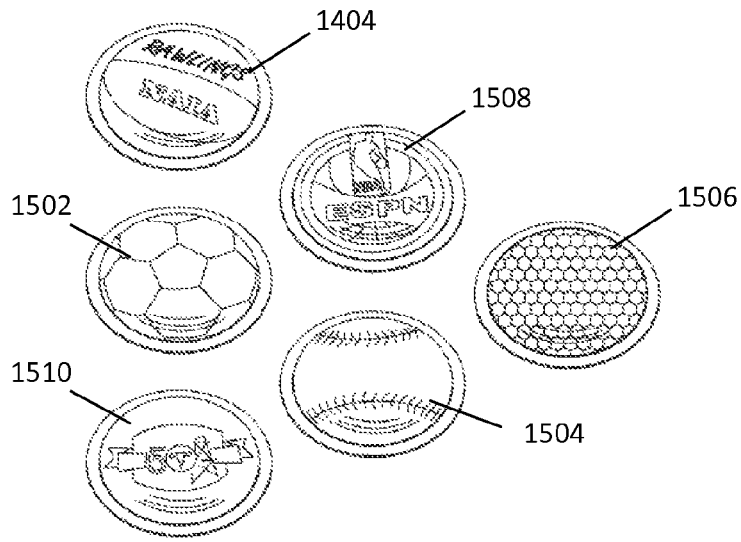
FIGS. 15 and 16 are perspective views of 3D skins in accordance with at least one embodiment of the invention, which may be used with the consumer product of FIGS. 14A-14B or other consumer products.
Figure 16:
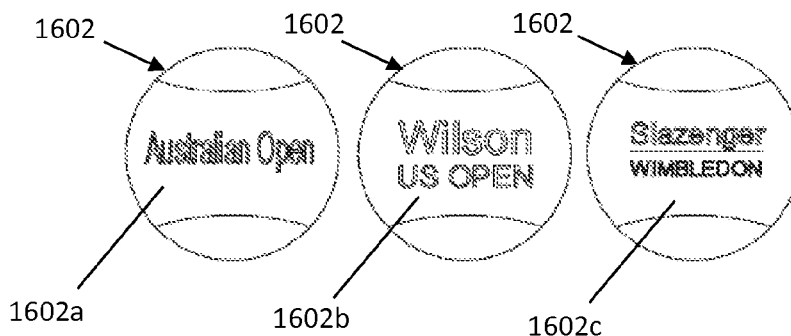

It should be appreciated that the 3D skin 1404 can be designed in a variety of different ways. For example, instead a basketball (as shown in FIGS. 14A-14B), the 3D skin 1404 could be in the shape and design of a soccer ball 1502, baseball 1504, golf ball 1506, tennis ball 1602, etc. (as shown in FIGS. 15-16), or other designs, such as logos or symbols like the ESPN network NBA logo 1508, the Tennessee Oiler franchise NFL logo 1510, etc, (as shown in FIG. 15). In addition, as mentioned above, the 3D skin may be customized on-demand to include indicia (e.g., designs, symbols, logos, sayings, phrases, artwork, trademarks, etc.) desired by any consumers. For example, in FIG. 16, three different 3D skins are illustrated depicting indicia (e.g., Australian Open 1602*a*, Wilson US Open 1602*b*, and Slazenger Wimbledon & design 1602*c*).

In yet other embodiments, the actual shape of the all skin 1404 may also be changed. This could be in order to keep with a theme (such as using a football shaped 3D skin to coordinate with a football themed 2D skin), or simply to provide 3D skins in different shapes and sizes without having any coordination to another component or component theme. In fact, in some forms, as 3D skin 1404 may be used alone, (e.g., without an accompanying 2D skin), if desired. For example, 3D skin 1404 could be provided with an adhesive to secure the skin 1404 to an exterior surface of phone 1400 or cover 1402, without having any other skin present. Alternatively, two or more 3D skins may be applied to the consumer product if desired.

Figure 17:
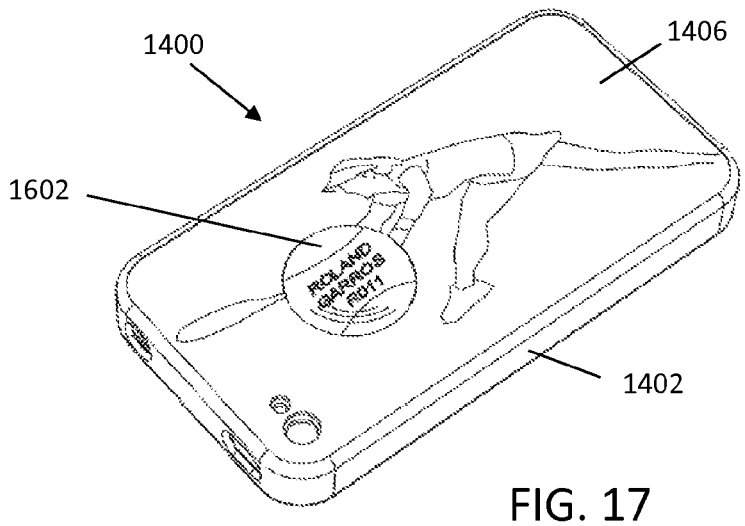
FIG. 17 is a perspective view of a 3D skin used to personalize a consumer product in accordance with at least one embodiment of the invention, with both the 3D and 2D skins being connected to a cover covering at least a portion of the consumer product.

It should also be understood that in other forms, the skins 1404, 1406 may be connected to the same surface or component, rather than different surfaces/components as in FIGS. 14A-14B. For example, in FIG. 17, the 3D skin 1602*d* and 2D skin 1406 are both connected to an outer surface or outer surfaces of cover 1402. In this form, the covet may be of the OtterBox™ type supplied by Otter Products, LLC of Fort Collins, Colo., United States of America, such as those covered by U.S. Pat. No. 7,889,489 issued Feb. 15, 2011, U.S. Pat. No. 7,907,394 issued Mar. 15, 2011 and U.S. Pat. No. 7,933,122 issued Apr. 26, 2011, which are hereby incorporated by reference in their entirety. In this form, a case 1402 similar to the OtterBox™ Defender Series Case, Commuter Series Case, Reflex Series case or Impact Series case for the iPhone 4™ smart phone is shown with the 3D skin 1602*d* rested in the circular recess formed by the window of the case (which normally makes the Apple logo visible), while the 2D skin 1406 is applied to an exterior surface of the case body. As mentioned above, the 3D skin 1602*d* could be designed such that it simply rests on the window, is friction fit in the window opening or is adhered to the window if desired. In addition the tennis ball theme of 3D skin 1602*d* coordinates with the tennis theme of 2D skin 1406.

In other forms, a bumper or frame may be used to cover a portion of a consumer product and to connect an accessory such as a panel or plate to the consumes product. For example, in the form illustrated in FIGS. 18A-18B, a flexible frame 1802 having a U-shaped cross section connects around the outer perimeter of phone 1800, with one leg of the U-shape structure abutting and capturing a surface of the phone 1800 (e.g., the front corner or edge of a phone) and the other leg of the U-shape structure abutting and capturing a portion of a panel or plate 1804 (e.g., the rear corner or edge of plate 1804), thereby holding the phone and plate together. In this form, either side of the panel 1804 (or both sides) can have a design applied thereto using any of the processes described herein (e.g., painting, priming, painting & printing, etc.) or the panel can be made of a transparent or translucent material (such as glass, clear plastic, etc.) to protect a design that is positioned beneath the panel either on the consumer product itself or an accessory connected thereto, or even the underside of the panel 1804. In other forms, the panel 1804 may be connected to the frame 1804 via a fastener, as adhesive, tongue & groove mating connections, etc.

Figure 18A:
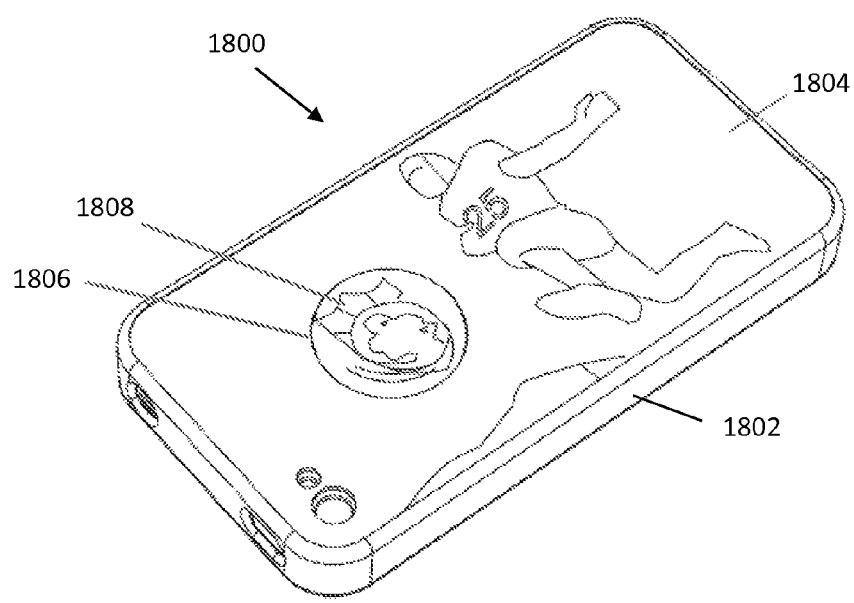
FIGS. 18A-18B are perspective and partial exploded views of an apparatus for personalizing a consumer product in accordance with at least one embodiment of the invention, with an outer frame structure and a plate or panel that can be connected via the frame to a consumer product in order to personalize the consumer product (with the phone not shown in FIG. 18B for illustrative purposes only)
Figure 18B:
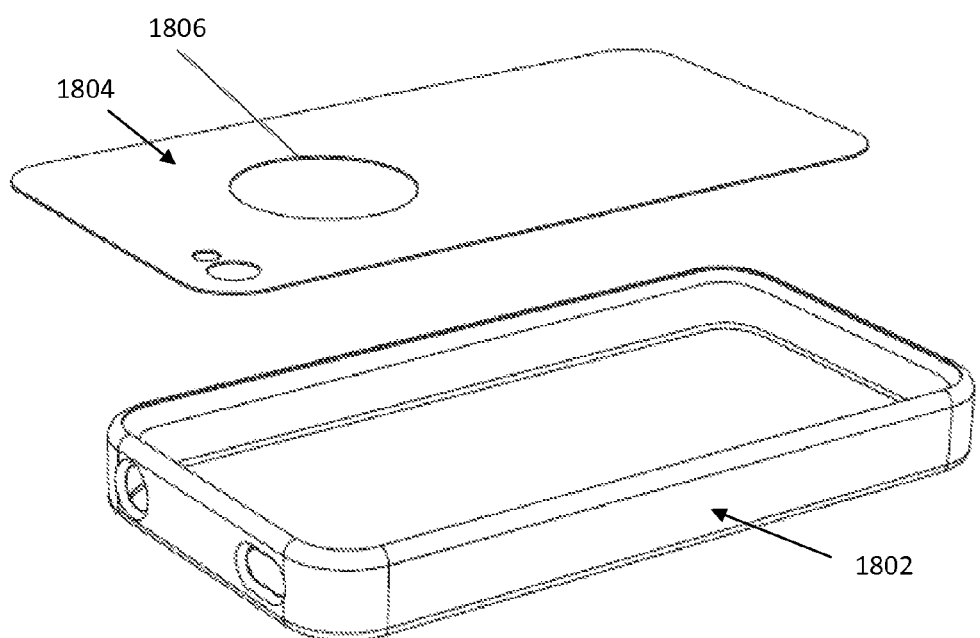
Figure 19A:
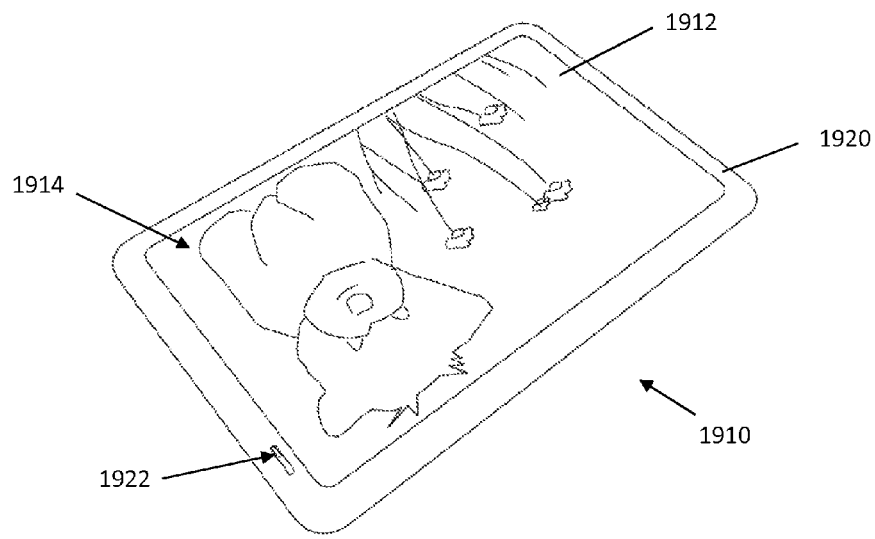
FIGS. 19A-19B are perspective and exploded views, respectively, of a reversible structure used to personalize a consumer product in accordance with at least one embodiment of the invention, with the reversible structure connected to the consumer product with a first image visible in FIG. 19A and removed from the consumer product in FIG. 19B.
Figure 19B:
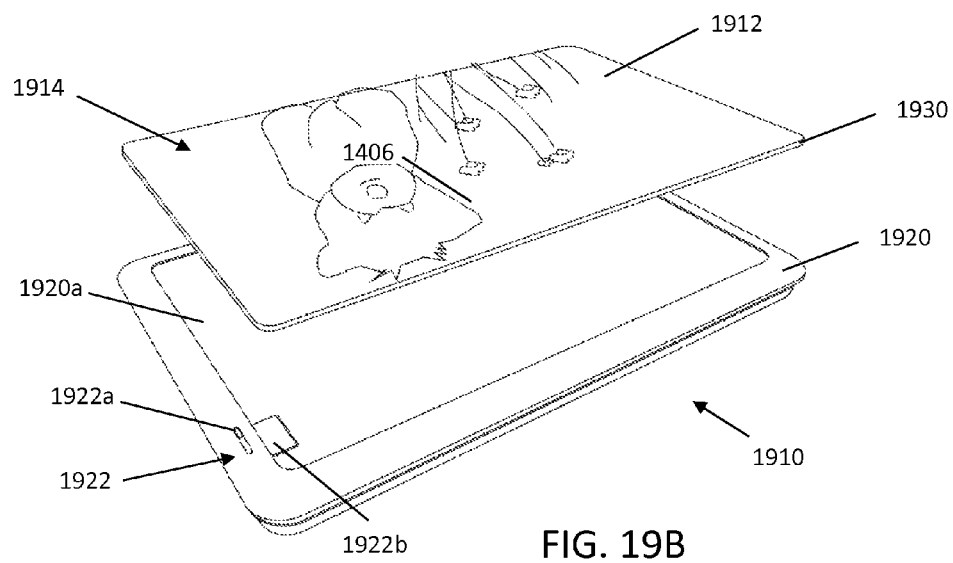
Figure 19C:
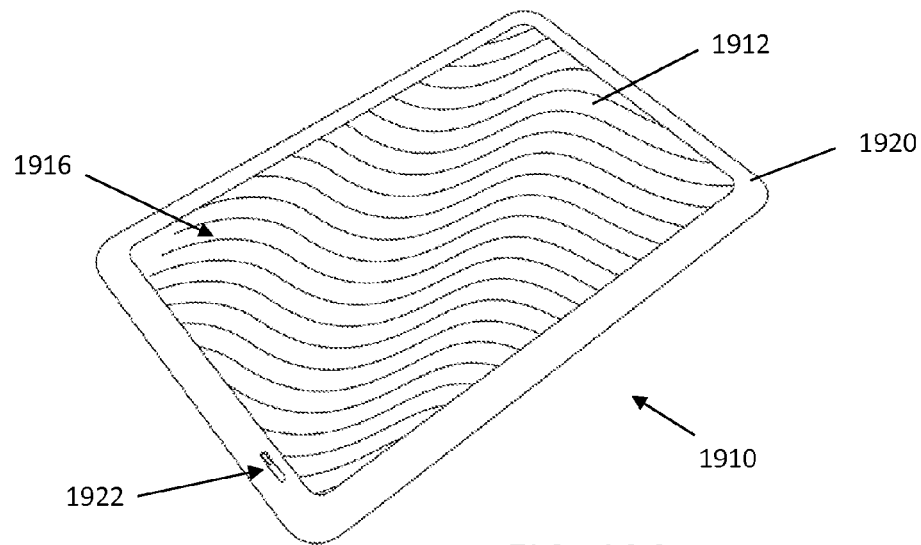
FIGS. 19C-19D are perspective views of the reversible structure of FIGS. 19A-19B illustrating the reversible structure having been turned over or reversed and reconnected to the consumer product with the second image visible in accordance with one embodiment.
Figure 19D:
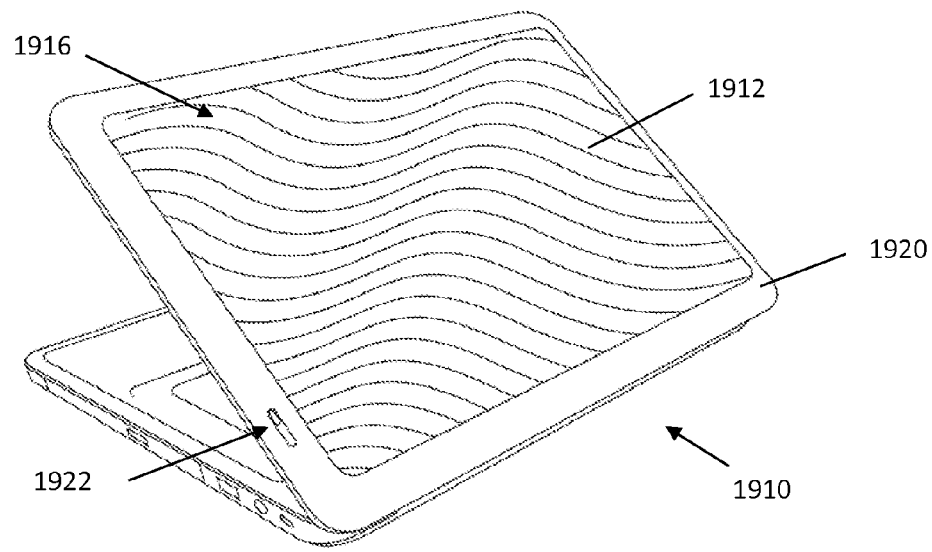

In the form illustrated in FIG. 18A, a 2D design is applied to one side of the panel 1804, which is made of glass or plastic, and the panel defines an opening 1806 through which at least a portion of 3D skin 1808 is disposed. As mentioned above with respect to cover 1402 of FIGS. 14A-14B, the panel 1802 could be designed such that it captures and secures the 3D skin 1808 to the component. Alternatively, as discussed with FIG. 17 above, the 3D skin 1808 may be fastened to the component on its own.

In FIG. 18A, 3D skin 1808 is designed with a football shield to coordinate with the football theme of printing or 2D skin applied to panel 1804, which illustrates a football player hurtling another football player to avoid a tackle. The color of frame 1802 is further coordinated to match the color of the football theme of the 2D skin or print/paint on panel 1804 and/or the 3D skin 1808. As mentioned above, the 3D skin 1808 may be removably connected to the consumer product 1800 and be double sided (e.g., having first and second images on opposite sides thereof) so that an end user can remove the 3D skin 1808, rotate or flip same, and re-attach 3D skin 1808 to the consumer product with a second, preferably different, design showing than what was illustrated on the opposite side of the 3D skin 1808. Alternatively, the 3D skin 1808 could be replaced with a different selected 3D skin 1808. Further, in some embodiments, the panel or plate 1804 does not have an opening 1800 and is itself printed/painted or has a customizable image or skin applied thereto. In such embodiments, plate 1804 may be replaced with other different selected plates having different images or skins applied thereto.

In some embodiments, the panel 1804 may be removably connected to the consumer product 1800 and be double sided (e.g., having first and second images on opposite sides thereof) so that an end user can remove the panel 1804, rotate or flip same, and re-attach panel 1804 to the consumer product with a second, preferably different, design showing than what was illustrated on the opposite side of the panel 1804. Further, in some embodiments, the panel 1804 is glass or at least partially light transmissive to reveal imagery underneath the glass. For example, in one embodiment, the glass reveals a design applied (printed and/or painted) on an underside of the glass. In another embodiment, the glass reveals a design printed and/or painted to a surface of the device underneath, or a paper, plastic or other insert viewable underneath the glass panel.

Although panel 1804 is identified above as being made of glass or plastic and frame 1802 is identified as being made of flexible rubber or plastic, it should be understood that these items can be made from a variety of different materials, such as metal, wood, glass, plastic, fabric, vinyl, etc. In addition, it should be understood that any of the embodiments discussed above may be provided in other configurations. For example, in an alternate form of the embodiment of FIGS. 18A-188, the panel 1804 may not define an opening, but rather a window that covers and/or protects the 3D skin located below the panel 1804 for between the panel 1804 and phone 1800). Similarly, the 3D skin may be connected to the phone 1800 below the circular window discussed with respect to the OtterBox™ cases discussed above for the iPhone 4™ smart phone.

It should also be understood that in alternate embodiments any of the designs may be provided in different locations, with different dimensions (e.g., 2D vs. 3D), textures (e.g., smooth, rippled, grooved, ribbed, etc.), finishes (e.g., glossy, semi-gloss, matte, etc.). For example in FIGS. 18A-18B, instead of or in addition to skin being 3D, other designs or portions of designs may be configured in 2D and 3D. In one form, a portion of the football player leaping over the other player may be made 3D, while the remainder is 2D. For example, the football player's leading foot and leg may be applied as a 3D design, while the remainder of the design on plate 1804 is a 2D design. In still other forms, both sides of the plate 1804 may not only have different designs on them, but may also have different 3D and/or 3D and 2D designs on each side. In other forms, panel 1804 may be mirrored so that the consumer product may also serve as a compact or other useful item, or may be designed to hold or display a design that is positioned on a substrate, such as paper, underneath the panel 1804. In still other forms, the panel 1804 may be etched (e.g., laser etching, milling, etc.) with a design on one or more sides, or may have a first design applied on one side using a first type of design application technique (e.g., etching) and a second design applied on the same or a different side using a different type of design application technique (e.g., painting, printing, etc.). It should also be understood that multiple designs using one or more different types of design application techniques, different dimensions, etc. may be applied to a single side of the panel, cover or phone as well.

In still other versions, both the 3D and 2D skins 1404, 1406 may be connected directly to an exterior surface of the phone, rather than the case 1402 or a combination of the case and phone. It should also be appreciated that the 3D skins may take on various sizes, shapes and indicia (e.g., themes, designs, etc.). For example, in some forms, the 3D skins may be designed as collector items that can be collected and/or traded between individuals as desired. These 3D collectable skins could also be connectable to a consumer product in a removable fashion to allow individuals to change the 3D skin as desired and/or trade or swap for other collectable skins. Thus, in a preferred form no adhesive is used on the 3D skin 1404, but rather it is captured and secured to the phone 1400 via cover 1402 as illustrated in FIGS. 14A-14B.

It is noted that in some embodiments, the 3D skin 1404 extends above the surface of the cover, the panel and/or the 2D skin, whereas in other embodiments, it is flush with or below the surface of the cover, the panel and/or the 2D skin. In some embodiments, the 3D skin is not necessarily a skin, but is a component having a thickness and that may include imagery etched, painted, and/or printed on one or both sides (e.g., a coin-like structure). In such embodiments, the 3D skin may be more generically referred to as a first customization component. Likewise, the 2D skin and/or the cover/plate may be more generically referred to as a second customization component. It is also understood that the cover and/or plate may have more than one opening or window formed therein, and in some embodiments, there are no windows or openings formed therein.

In the form illustrated in FIGS. 14A-14S, the skins 1404, 1406 are multi-layered structures beginning with a substrate and optionally having an additional layer or layers applied to form the indicia (e.g., designs, images, phrases, etc.). An exemplary layering diagram can be seen in U.S. patent application Ser. No. 13/103,997, filed May 9, 2011 and entitled "Systems and Methods of On-Demand Manufacturing of Customized Products", which is hereby incorporated by reference in its entirety. As mentioned therein, the substrate may be any material, such as metal, plastic, ceramic, glass, fabric, leather, etc., or any combination thereof. Additionally, the substrate may be flat or have other dimensions or curvature depending on the consumer product involved and/or intended application.

In the event the substrate is metal or at least partially metallic, in some embodiments, a chemical film treatment layer may be applied using known chemical film treatment processes. The chemical film treatment layer may be applied in advance of an order (for example if inventory or forecasted business models are being followed) or may be done on-demand when an order is received if on-demand business models are being followed).

In the event the substrate is plastic, a chemical film treatment layer might not be applied, and in some cases, the surface of the substrate may be plasma treated to alter or raise dyne levels to ensure good adhesion. As is known in the incorporated references herein, plasma treatment is an electrostatic process that removes oils from the surface and raises dyne levels to create attraction between molecules. In some embodiments, a primer layer or other adhesive layer may be applied as needed depending on the material of the substrate. Similarly, in the event the substrate is glass or ceramic a chemical film treatment layer may not be applied, but an optional) plasma treatment may be performed, if desired.

Next, and optionally, a base paint layer may be applied to the substrate surface or the chemical film treatment layer depending on the substrate material, for example, using a solvent or UV painting process. Again, a plasma treatment may be applied to the base paint layer once cured to ensure good adhesion to any layer applied thereon. Also, in some cases, an adhesive layer may be applied over the base paint layer.

Next, a print layer is applied to the base paint layer or optionally, to the substrate surface or chemical film treatment layer. The print layer may be applied using solvent or UV based printing or other techniques described herein or incorporated herein by reference. Again, a plasma treatment may be applied to the print layer once cured to ensure good adhesion to any layer applied thereon and, although not shown, in some cases, an adhesive layer may be applied over the print layer.

Next, a finish or top coat layer is applied to the print layer to seal the image created by these layers. For example, in some embodiments the coat layer is solvent based or a UV cured paint layer. In some cases, an industrial coating is applied as a top coat layer, for example, by UV curing coating machinery manufactured by Eodex Enterprises LTD of Taiwan. In some embodiments, a clear coat finish is applied as a top coat layer and formulated to be a high gloss, semi-gloss, matte or soft-touch finish.

Additionally, it is understood that the base paint layer, the print layer and the coat layer may use materials or be applied or formed using any of the materials, techniques, processes, technologies described herein or incorporated herein by reference, or as understood by those of ordinary skill in the art.

It is noted that in some embodiments, additional layers may be provided. Additional layering diagrams more specific to pressure sensitive adhesive substrates are described in U.S. patent application Ser. No. 11/726,960, filed Mar. 23, 2007 and entitled "Adhesive Cover for Consumer Devices", published as US Publication No. 2008/0233326; and U.S. patent application Ser. No. 11/759,600, filed. Jun. 7, 2007 and entitled "Fishing Lures and Adhesive Cover for Same", published as US Publication No. 2008/0104880, both of which are incorporated herein by reference.

Furthermore, in some embodiments, the substrate itself may be a multi-layer substrate and/or have different surfaces prior to any imagery applied to either side. For example, in one embodiment, the substrate is a plastic, glass or metal substrate with a fabric, leather or other material substrate adhered thereto such that one surface of the substrate is plastic, glass or metal and the other surface of the substrate is fabric, leather or other material. Additional layers may be then added to achieve a desired appearance on the substrate.

In addition to the above embodiments, it should be understood that several methods are disclosed herein or are incorporated herein by reference for personalizing consumer products. For example, disclosed herein is a method for personalizing consumer products using a 3D skin, a method of installing a 3D skin on a consumer product, and a method of applying a themed skin or skins to a consumer product via a 3D skin.

With respect to on-demand customization, such skins may be made and sold using either an "out of box" business model or an "in box" business model as described in U.S. patent application Ser. No. 13/103,997, filed May 9, 2011 and entitled "System and Methods of On Demand Manufacturing of Customized Products", and U.S. Provisional Patent Application No. 61/332,745, filed May 7, 2010 and having the same title, which are both incorporated herein by reference. In either model a software management platform, or on-demand platform, may be provided that performs many of the functions described herein. An example of an on-demand platform primarily suited for the out of box model is described in U.S. patent application Ser. No. 11/933,382, filed Nov. 5, 2007 and entitled "Order Fulfillment and Content Management Systems and Methods", published as US Publication No. 2008/0154750 which is incorporated, herein by reference.

While many embodiments described herein or incorporated herein by reference are primarily directed to the out of box model, one or more elements of the on-demand platform may also be applicable in the inbox model. Examples of pressure sensitive film, adhesive covers or adhesive materials to be applied to the reversible structure or portions thereof are described in U.S. patent application Ser. No. 11/726,960, filed Mar. 23, 2007 and entitled "Adhesive Cover for Consumer Devices", published as US Publication No. 2008/0233326; and U.S. patent application Ser. No. 11/759,600, filed Jun. 7, 2007 and entitled "Fishing Lures and Adhesive Cover for Same", published as US Publication No. 2008/0104880, both of which are incorporated herein by reference.

An example of an interactive interface allowing a user to create a virtual design, for example, in creating imagery for application to products, portions thereof, accessories to products such as covers, shells and/or adhesive skins or materials in both the inbox and out of box models, is described in U.S. patent application Ser. No. 12/267,527, filed Nov. 7, 2008 and entitled "Customizing Print Content", published as US Publication No. 2009/0122329, which is incorporated herein by reference.

An example of a path creation utility for use within an interactive image editor useful to allow a user to create customized image content by overlaying one or more images upon one or more background images to create or define a selected portion of the image content is described in U.S. patent application Ser. No. 12/684,781, filed Jan. 8, 2010 and entitled "Path Creation Utility for Image Editor", which is incorporated herein by reference. One or more of the processes and systems described in one of more of these patent documents may be applied in one or more embodiments of processes implementing various inbox models and/or out of box models such as those described herein.

Optional material preparation parameters for metal or plastic parts include a pre-treatment (typically for metal), base coat, edge trim and/or powder coat. On demand direct to surface substrate printing options for metal or plastic parts, including keyboards, include color, graphics/images, texture (e.g., laser etched texture, topographical texture, printed texture through selective application of print layers), gloss matte, legend (localized), asset mg/barcode (either 2D or 3D barcode), and/or printable UV sealant. UV topcoat options for metal or plastic pans include gloss, semi gloss, matte and/or soft touch. It is understood that any other options such as described herein may also be included such as text, size, font, language, transparency, etc.

As will be described further below, in different embodiments, customized imagery may be applied in a variety of ways. For example, imagery may be applied or printed to a pressure sensitive film a skin) or an adhesive material applied to a substrate that is, in turn, connected to the product, a portion of the product or to an accessory. For example, this adhesive material may be printed with the desired imagery and then permanently or removably applied to the substrate, with another image applied to the opposite side of the substrate thereby forming a reversible structure with first and second images located on opposite sides thereof. In one example, the substrate is applied to a cellular telephone or to the lid or cover of a notebook computer, or to a portion of the product, such as a battery door of the cellular telephone, and/or to an accessory such as a hard case or shell for the cellular telephone or a snap on lid cover and/or base for a notebook computer and can be removed and reversed and re-applied to the product to change the visible image as desired. In other embodiments, the imagery is directly painted, printed, heat or cold transferred, thermoformed, etched or otherwise formed on a surface of substrate that is in turn connected to the product, portion of the product and/or an accessory of the product. In some embodiments, one or both of the first and second images are permanently or non-permanently applied to the substrate. In some embodiments, texture is formed in one or both of the first image, for example, using an image application process that leaves vertical displacement resulting in texture across the image. For example, texture printing techniques such as described in U.S. Provisional Application No. 61/491,320, filed May 30, 2011 and entitled SYSTEMS AND METHODS FOR USE IN INLINE PRINTING, which is incorporated herein by reference, may be used to print imagery including texture.

Depending on the embodiment, the image is solvent or UV painted, thermal or solvent printed, laser printed. UV inkjet printed, transferred via dye sublimation via a transfer media, pad printed or silk screened directly to the substrate and connected to a surface of the product, a portion of the product or an accessory for the product. In some embodiments, surface treatments are optionally applied, such as chemical film treatments or other treatments to modify the surface energy to promote good adhesion between adjacent layers. Example surface treatments to modify surface energy, e.g., to alter or raise dyne levels to ensure good adhesion between paint and/or print layers, include plasma treatment (atmospheric and flame plasma treatments), corona treatment, and chemical plasma treatments. Direct to substrate printing may be accomplished using post mold decoration or in-mold decoration techniques. In on-demand embodiments, post mold decoration is preferred due to shorter lead times in the printing process. For example, in-mold decoration films are well suited for producing large quantities of a single design on as part/substrate, such that changing a design to be printed requires additional tooling and set up charges with subsequent down time. Thus, in-mold decoration often requires forecast volumes in advance. Whereas, in some embodiments using post mold decoration, can allow for an infinite number of different images and designs or customization options to be printed next to one another and in succession (even on the same image application device) without tear down, set-up or additional tooling.

In embodiments which employ customization in an on-demand manner, manufacturers can quickly manufacture and make available for commercial sale small special edition or limited edition runs of the reversible structures discussed herein to take advantage of current events and interests, promotions and advertising for upcoming events and interests, etc. This allows the manufacturer to adapt to a shape shifting marketplace. Since limited numbers of products can be produced under a typical business model, there is less risk of carrying excess inventory of commercially undesirable products.

In several embodiments, an on-demand software management platform is provided that manages the customization process. In some embodiments the management platform is installed and executed on computing devices of a particular company, or may be stored and executed on servers in an ASP model (i.e., a peer-to-peer hosted solution) providing network access to remote users to interact with the management system. In some embodiments, the management platform generally performs at least one or more of the following functions: provide an interactive image selection and customization tool for customers to upload and/or select then customize imagery for use in customization of one or more products or devices; store and maintain a library of licensed and pre-formatted or pre-approved imagery and selection options; provide an image selection file format to end customers that allows for easy editing and selection of image options; receiving and evaluating purchase orders from a variety of customer types for customized products, parts, accessories, adhesive materials, etc.; scheduling and monitoring in real-time the image application process coordinating a variety of application devices (such as painters, printers, coaters, curing devices, layer applicators, and so on) in order to meet the on-demand nature of customer orders; monitoring and directing inventory and part flow through the image application facility; and coordinating with enterprise resource planning systems of other entities in a manufacturing supply chain.

Referring now to FIGS. 19A-19D, there is illustrated a consumer product (also generically referred to as a product or device), such as laptop computer 1910, having a reversible structure 1912 connected thereto with respective first and second images 1914, 1916 on the front and back sides 1912a, 1912b of the reversible structure to personalize the consumer product 1910 in a manner desired by the consumer. In the form illustrated, the first image 1914 is a photograph of a family pet and the second image 1916 is a more conservative or formal leather surface with a corporate logo depicted thereon or in. In this embodiment, the reversible structure 1912 is a dual sided leather piece with printable and/or paintable surfaces on the opposite sides thereof. Thus, a consumer can readily change the product 1910 from containing a more personal image (e.g., family dog) 1914 to a more professional or formal image (e.g., exposed leather side with embossed and/or etched corporate logo) 1916, as desired or as situations and circumstances may call for.

Although illustrated in FIGS. 19A-19D as a dual-sided large rectangular leather piece that covers a large portion of the computer 1910, it should be appreciated that the reversible structure 1912 may be made in many different forms, shapes, sizes and materials, as mentioned above. For example, in alternate embodiments, the substrate of the structure 1912 may be made of wood, metal, plastic, glass, fibrous material (whether natural or synthetic) or any combination thereof, and may be in the shape of a smaller or larger geometrical or non-geometrical design or combinations thereof, and/or may be symmetrical or asymmetrical.

Further, the structure may be of varying degrees of rigidity or flexibility. In other forms, the reversible structure 1912 may be provided in a plurality of pieces, rather than as one single piece. It also should be appreciated that the imagery elected to be used on the opposite sides of the reversible structure 1912 may be any of the examples of imager described herein and may be selected from any number of different designs, shapes, sires and materials. For example, one image may be of the substrate material itself, such as the raw leather of the material (as illustrated, with respect to image 1916). Whereas, another image may be selected from anything such as, but not limited to, a logo picture, design, pattern, word, words, drawing, texture, etc., or may be of the substrate material itself (whether the same or different than that used in the first image) or an outer layer applied to the substrate.

Figure 21:
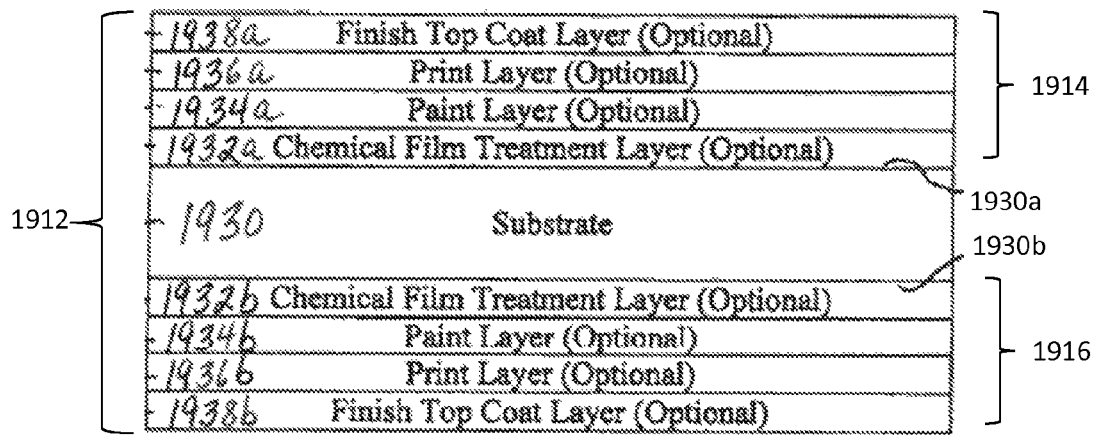
FIG. 21 is an illustration of a layering diagram of imagery applied to a substrate in accordance with at least one embodiment of the invention.

In the form illustrated in FIGS. 19A-19D, the reversible structure 1912 is a multi-layered structured beginning with a substrate 1930 and optionally having an additional layer or layers applied on each side 1930a, 1930b of substrate 1930 to form the first and second images 1914, 1916, respectively, and the reversible structure 1912 itself. An exemplary layering diagram of imagery applied to the substrate 1930 is illustrated in FIG. 21 in accordance with several embodiments. This layering may be created using any of the devices and techniques described herein or incorporated herein by reference.

As mentioned above, the substrate 1930 may be any material, such as metal, plastic, ceramic, glass, fabric, leather, etc., or any combination thereof. Additionally, the substrate 1930 may be flat or have other dimensions or curvature depending on the consumer product involved and/or intended application.

In the event the substrate 1930 is metal or at least partially metallic, in some embodiments, chemical film treatment layers 1932a, 1932b may be applied using known chemical film treatment processes. The chemical film treatment layers 1932a, 1932b may be applied in advance of an order (for example if inventory or forecasted business models are being followed) or may be done on-demand when an order is received (if on-demand business models are being followed).

In the event the substrate 1930 is plastic, chemical film treatment layers 1932a. 1932b might not be applied, and in some cases, the surfaces of the substrate 1930a, 1930b may be plasma treated to alter or raise dyne levels to ensure good adhesion. As is known in the art, plasma treatment is an electrostatic process that removes oils from the surface and raises dyne levels to create attraction between molecules. In some embodiments, a primer layer (not shown) or other adhesive layer (not shown) may be applied as needed depending on the material of the substrate 1930. Similarly, in the event the substrate 1930 is glass or ceramic, chemical film treatment layers 1932a, 1932b May not be applied, but an optional plasma treatment may be performed, if desired.

Next, and optionally, base paint layers 1934a, 1934b may be applied to the substrate surfaces 1930a, 1930b or the chemical film treatment layers 1932a, 1932b depending on the substrate material, for example, using a solvent or UV painting process. Again, a plasma treatment may be applied to the base paint layers 1934a, 1934b once cured to ensure good adhesion to any layer applied thereon. Again, although not shown in the illustration of FIG. 21, in some cases, an adhesive layer may be applied over the base paint layers 1934a. 1934b.

Next, print layers 1936a, 1936b are applied to the base paint layers 1934a, 1934b or optionally, to the substrate surfaces 1930a, 1930b or chemical film treatment layers 1932a, 1932b. The print layers 1936a, 1936b may be applied using solvent or UV based printing or other techniques described herein or incorporated herein by reference. Again, a plasma treatment may be applied to the print layers 1936a, 1936b once cured to ensure good adhesion to an layer applied, thereon and, although not shown, in some cases, an adhesive layer may be applied over the print layers 1936a, 1936b.

Next, finish or top coat layers 1938a, 1938b are applied to the print layers 1936a. 1936b to seal the images 1914, 1916 created by these layers. For example, in some embodiments the coat layers 1938a, 1938b are solvent based or UV cured paint layers. In some cases, an industrial coating is applied as top coat layers 1938a, 1938b, for example, by UV curing coating machinery manufactured by Eodex Enterprises LTD of Taiwan. In some embodiments, clear coat finish is applied as top coat layers 1938a, 1938b and formulated to be a high gloss, semi-gloss, matte or soft-touch finish.

Additionally, it is understood that the base paint layers 1934a, 1934b, the print layers 1936a, 1936b and the coat layers 1938a, 1938b may use materials or be applied or formed using any of the materials, techniques, processes, technologies described herein or incorporated herein by reference, or as understood by those of ordinary skill in the art.

It is noted that in some embodiments, additional layers may be provided. Additional layering diagrams more specific to pressure sensitive adhesive substrates are described in U.S. patent application Ser. No. 11/726,960, filed Mar. 23, 2007 and entitled "Adhesive Cover for Consumer Devices", published as US Publication No. 2008/0233326; and U.S. patent application Ser. No. 11/759,600, filed Jun. 7, 2007 and entitled "Fishing Lures and Adhesive Cover for Same", published as US Publication No. 2008/0104880, both of which are incorporated herein by reference.

Furthermore, in some embodiments, the substrate 1930 itself may be a multi-layer substrate and/or have different surfaces prior to any imagery applied to either side. For example, in one embodiment, the substrate is a plastic, glass or metal substrate with a fabric, leather or other material substrate adhered thereto such that one surface of the substrate 30 is plastic, glass or metal and the other surface of the substrate 30 is fabric, leather or other material. Additional layers may be then added to either side as discussed to achieve a desired appearance on both sides. In some cases, a leather substrate is selected that already has a specific image in that it has a specific color and texture creating a desired appearance without need for additional paint, print or top coat layers, or other embossing, etching, pressing, etc.

It is understood that in embodiments not using printing techniques to apply imagery to one or both sides of the substrate 1930, such as image transfer techniques thermoforming), different layers may be present. Such cold and heat transfer techniques are well known in the art and not explained further herein.

It is understood that the layer diagram of FIG. 21 is also applicable to the formation of any of the design elements described herein, whether images or imagery are applied to one or both sides of the design element substrate. In the event imagery is applied only to one side of the substrate, the substrate may appear as having one or more of the chemical film treatment layers 1932a, the primer layer, the base paint layer 1934a, the print layer 1936a, and the top coat layer 1938a.

Now turning back to FIGS. 19A-19D, a connecting structure may also be used for releasably connecting the reversible structure 1912 to the consumer product 1910 so that the substrate can be connected to the consumer product 10 in a first orientation wherein the first image 1914 is visible when looking at the consumer product, or removed, reversed and re-connected to the consumer product 1910 in as second orientation wherein the second image 1916 is visible when looking at the consumer product 1910.

In the embodiment illustrated, the connecting structure includes magnetic material embedded in the substrate 1930 or between any layers of the reversible structure 1912, which is attracted to corresponding magnetic material located on or in the consumer product 1910. These magnetic fasteners releasably connect the reversible structure 1912 to the consumer product 1910 so that the reversible structure 1912 can be readily removed and/or alternated between orientations depicting the first or second images 1914, 1916 as desired or as situations and circumstances may call for.

It should be understood that in alternate embodiments any form of connecting structure may be used for releasably connecting the reversible structure 1912 to the consumer product 1910. For example, in alternate embodiments, fasteners such as screws, toggles, clamps, bolts, clasps, snaps, buttons, hook and mating loop mating structures, adhesives, etc, may be used for releasably connecting the reversible structure 1912 to the consumer product 1910. In addition, it should be appreciated that the positioning of the fasteners can be swapped or alternated between the reversible structure 1912 and the consumer product 1910, or even between the reversible structure 1912 and an intermediate structure connected to the consumer product 1910. For example, in one form, hook type structures may be mounted on the reversible structure 1912 and corresponding mating loop structures may be mounted on the consumer product 1910 to releasable connect the reversible structure 1912 to the consumer product 1910 using conventional hook and loop fasteners. In other forms, the hook type structures may be located on the consumer product 1910 with the mating loop type structures mounted on the reversible structure 1912. Similarly, one form the consumer product 1910 may have a toggle clamp or clasp structure or structures and both sides of the reversible structure 1912 may be configured with mating clamp or clasp structures that are engaged by or with the toggle clamp or clasp structure or structures located on the consumer product 1910.

With respect to the latter structure mentioned above (e.g., wherein an intermediate structure is used to connect the reversible structure 1912 to the consumer product 1910) and as illustrated in FIGS. 19A-19D, the consumer product 1910 may include an intermediate structure, such as an accessory cover or lid 1920, connected to the consumer product 1910 similar to that disclosed in U.S. patent application Ser. No. 11/176,778, filed Jul. 7, 2005 and entitled "Method and Apparatus for Customizing a Chassis" and published as US Publication No. 2007/0008684, which discloses a conventional snap-on lid and is incorporated herein by reference. In the form illustrated in FIGS. 19A-19D, the cover 1920 is a snap fit or friction fit lid that is connected to the screen or display housing of the laptop computer 1910 (e.g., the "A cover" of the computer). Thus, in this embodiment, the cover 1920 removably fits into position over the existing "A cover" of the computer device and removably receives and/or retains the structure 1912 in the intended Orientation to reveal the intended one of the first and second image 1914, 1916. In this way, the cover 1920 can be offered as a way of retrofitting the reversible structure 1912 to consumer products that have been on the market or for consumer products that are not equipped with connecting structures that would otherwise allow the reversible structure 1912 to be removably connected to the consumer product 1910. It is understood that devices other than notebook computers can be retrofitted with such a cover and reversible structure. In other embodiments, the cover 1920 is integrated into the consumer device during manufacturing (e.g., see the embodiments of FIGS. 20A-20B). For example, in such embodiments the cover 1920 is the "A cover" of a notebook style computer. U.S. patent application Ser. No. 10/966,452, filed Oct. 15, 2004, and entitled "Composite Cover for Notebook-Type Computer" and published as US Publication No. 2006/0082956, which discloses a conventional A cover for a notebook computer and is incorporated herein by reference.

In the illustrated embodiment, the cover 1920 further includes a recess 1920a in which at least a part of the reversible structure 1912 is disposed. The recess forms a mating surface to which at least a portion of the reversible structure 1912 is connected. In a preferred form, the recess 1920a has a shape that corresponds to the shape of the reversible structure 1912 in order to assist in orientating the reversible cover 1912 on the consumer product 1910. The recess 1920a is preferably deep enough and corresponds sufficiently in shape to the reversible structure 1912 such that the reversible cover 1912 forms a generally smooth outer surface of the consumer product 1910 when disposed in the recess 1920a. This configuration can be designed to help prevent the reversible structure 1912 from being inadvertently or unintentionally knocked off of the consumer product 1910, such as when the consumer products is inserted into and/or removed from a storage sleeve, bag, case, etc.

The cover 1920 or cover recess 1920a may also be designed such that the reversible structure 1912 can only be positioned on the cover in one orientation per side in order to ensure that the images 1914, 1916 are displayed right-side-up. For example, the cover 1920 or cover recess 1920a could have an alignment mechanism or structure, such as a protrusion or guide, that mates with a corresponding socket or recess located in the reversible structure 1912 such that the reversible structure 1912 can only be positioned on the cover 1920 in one orientation per side. As mentioned above, it should be understood that the protrusion or orientation guide could alternatively be located on the reversible structure 1912 and the mating recess or groove could be located on the consumer product 1910. In other forms, multiple alignment mechanisms or structures, such as orientating protrusions and mating recesses or groves could be present or, in still other embodiments, the orientating protrusions and mating recesses or groves could alternate on either or both the reversible structure 1912 and consumer product 1910.

The cover 19211 may also be provided with a mechanism for assisting in the removal of the reversible structure 1912 from the recess 1920a defined by the cover or lid 1920. In one form, the mechanism is a release mechanism 1922 connected to either the cover 1920 or consumer product 1910 and movable between a first position wherein the reversible structure 1912 rests against the mating portion of the consumer product 1910 and a second position wherein at least a portion of the reversible structure 1912 is spaced apart from at least a portion of the consumer product 1910 to provide a gap between the reversible structure 1912 and the consumer product 1910 that a user may use to help remove the reversible structure 1912 from the consumer product 1910. In the form illustrated the release mechanism 1922 includes an actuator 1922a and a lever 1922b, which when actuated via the actuator 1922a lifts at least a portion of the reversible structure 1912 up from the mating structure of the cover 1920 or consumer product 1910 to form a gap therebetween that a consumer can use to grasp and remove the reversible structure 1912 and/or reverse and re-position the reversible structure 1912 on the consumer product 1910 so that a different image is visible when the reversible structure 1912 is connected to the consumer product 1910.

The lifting of the reversible structure 1912 interferes with or interrupts the reversible structure's connection to the consumer product so that when the actuator 1922a is moved from the first position (wherein the reversible structure is connected to the commercial product 1910 or cover 1920 without interruption) to the second position, an interruption is presented between the reversible structure 1912 and the consumer product 1910 or cover 1920 to assist a consumer or user in removing the reversible structure 1912 from the consumer product 1910 or cover 1920.

Further, in the form illustrated in FIGS. 19A-19D, the release mechanism 1922 is normally biased in a position that allows the reversible structure 1912 to be connected to the consumer product 1910 or cover 1920 in an uninterrupted manner and the release mechanism 1922 can be moved, to a second position wherein the reversible structure 1912 is connected to the consumer product 1910 or cover 1920 but in an interrupted manner and the interruption assists in the removal of the reversible structure 1912 from the consumer product 1910. For example, when the actuator 1922s is moved from its normally biased position to the release position, the generally rectangular shaped lever 1922b lifts at least a portion of the reversible structure 1912 up from the exterior surface of the consumer product 1910 or cover 1920 (depending on the embodiment used) via a post or lever so that a consumer can grasp the reversible structure 1912 and remove and/or flip and re-connect the reversible structure 1912 so that a different image is visible when connected to the consumer product 1910.

As mentioned above, although the illustrations show a specific sliding switch type form of release mechanism 1922, it should be understood that in alternate embodiments different types of release mechanisms may be used. For example, instead of a switch type mechanism, a push-button type release mechanism, a clasp type mechanism or a cantilever type mechanism could be used to raise the reversible structure 1912. In other embodiments a completely different type of re lease mechanism may be used, such as a switch for either disabling the magnetic connection between the reversible structure 1912 and the consumer product 1910/cover 1920, or altering the magnetic properties so that the reversible structure 1912 and consumer product 1910/cover 1920 want to repel one another rather than be drawn toward one another.

It should also be understood that in alternate embodiments, the reversible structure 1912 may be connected directly to the consumer product 1910, rather than to an intermediate cover 1920, as alluded to above. For example, in the embodiment illustrated in FIGS. 20A-20B, the reversible structure 1912 is directly connected to or integrated with a portion of the consumer product. For convenience, items which are similar to those discussed above with respect to the embodiment illustrated in FIGS. 19A-19D and FIG. 21 will be identified in FIGS. 20A-20B using the same last two digit reference numerals in combination with the prefix "20" instead of prefix "19" like in FIGS. 19A-19D and FIG. 21 merely to distinguish one embodiment from the other. Thus, in the embodiment illustrated in FIGS. 20A-20B the consumer product is identified using reference numeral 2010 and the reversible structure is identified using reference numeral 2012.

Figure 20A:
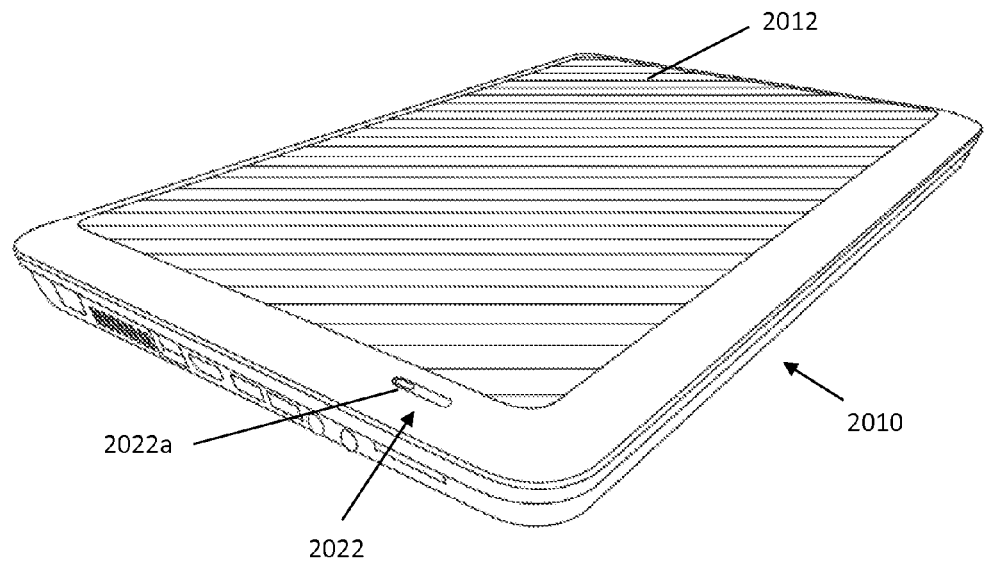
FIGS. 20A-20B are perspective views of an alternate embodiment of a reversible structure illustrating a form of a release mechanism for assisting in the removal of the reversible structure from the consumer product, where
Figure 20B:
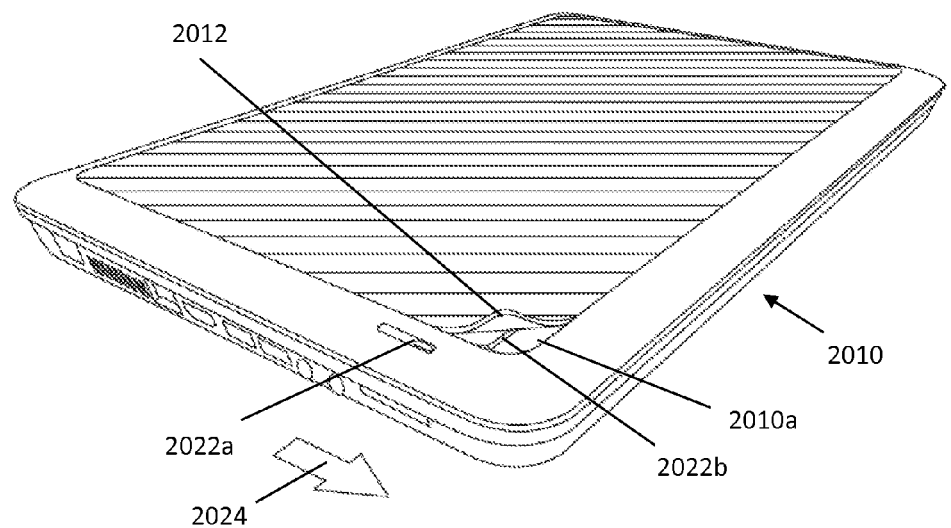

In the embodiment of FIGS. 20A-20B, the consumer product 2010 is designed with a mating surface for receiving the reversible structure 2012 and, in a preferred form, the consumer product 2010 further includes an integral recess 2010a similar to the recess 1920a described above with respect to cover 1920 of FIGS. 19A-19D. The integral recess 2010a preferably helps align the reversible structure 2012 and is deep enough to allow the reversible structure 2012 to form a generally smooth exterior surface with the remainder of the consumer product 2010. In one form, the recess 2010a will be formed in the "A cover" of the depicted laptop so that the images of reversible structure 2012 are visible when the display screen of the consumer product is in its opened or closed position. One advantage to this configuration over the use of an intermediate cover is that the size of the consumer product does not increase as much as it otherwise would by adding a snap-on cover or the like; thereby making it easier to transport and store while still allowing the product to be personalized. It is understood that the recess can be formed in a portion (e.g., mating cover, recess or other mating portion) of any consumer device, such as a battery door or frame of a cell phone, a portion of a housing of a game console or controller, etc. It is also noted that the recess may be formed in another portion of a computer device, such as formed in a portion of the "C cover" of the computer device, i.e., the tray portion surrounding the keyboard and touchpad, it is further noted that in some embodiments, the structures described herein: may seat fully within a recess such that the visible structure surface is lower than an outer surface of the cover forming the recess; may seat within a recess such that the visible structure surface is flush with an outer surface of the cover forming the recess; or may seat within a recess such that the visible structure surface is raised above an outer surface of the cover forming the recess.

The consumer product 2010 will also preferably include a mechanism for assisting in the removal of the reversible structure 2012 from the recess 2010a defined by the consumer product 2010. In the form illustrated, the consumer product 2010 includes a release mechanism 2022, that is similar to release mechanism 1922 discussed above with respect to FIGS. 19A-19D. Thus, when the actuator 2022a of release mechanism 2022 is slid in the direction of arrow 2024 (as illustrated in FIG. 20B), the lever 2022b is raised thereby lifting at least a portion of the reversible structure 2012 so that a user can grasp the reversible structure 2012 and either remove it from the consumer product 2010 or reverse (or flip) it and reposition it on the consumer product 2010 so that an alternate image is visible on the consumer product 2010. As mentioned above, in alternate embodiments, different forms of mechanisms may be used to assist in the removal of the reversible structure 2012 and different forms of reversible structures 2012 and consumer products 2010 and/or locations of the reversible structure on the consumer products may be used to allow for personalizing of the consumer product 2010.

Turning now to FIGS. 23A-23B and 24A-24B, there are illustrated exemplary embodiments of alternate consumer products and reversible structures that may be used in keeping with the above discussion. More particularly, these drawing figures illustrate exemplary notebook style computers including "A covers" personalized with different forms of imagery. For convenience, these embodiments will be identified using similar latter two digit reference numerals, but adding the prefix "23" and "24", respectively, to distinguish between embodiments. In FIGS. 23A-23B, a notebook computer 2310 is illustrated having a reversible structure 2312 that is personalized with a picture and company name and slogan as the first image 2314 and a less formal smile face as the second image 2316. This shows how the reversible structure 2312 can be used to personalize the consumer product 2310 and still allow the consumer to alternate between a more formal work-appropriate image and a less formal and/or more personal non-work related image.

In FIGS. 24A-24B, a notebook computer 2410 is illustrated having a reversible structure 2412 with a movie themed picture and title as the first image 2414 and a related, but alternate, image 2416 on the opposite side of the reversible structure 2412. This shows how the reversible structure 2412 can also be used for promotional purposes and/or by parties who are personalizing consumer products for use by others rather than themselves.

Yet another form of an exemplary reversible structure is illustrated in FIGS. 25A-25B. In keeping with the above, this embodiment will use similar latter two digit reference numerals, but add the prefix "25" to help distinguish this embodiment from embodiments previously discussed. In FIGS. 25A-25B, the consumer product 2510 is a mobile phone having a protective case or covering 2520 over same. In a preferred form, the cover 2520 has a mating surface to which the reversible structure 2512 is attached, which can be recessed as discussed above with respect to recesses 1920a and 2010a if desired. For example, in the form illustrated, the reversible structure 2512 has a photograph of a woman as image 2514 and is connected to a rear portion of cover 2520. A second image is available on the opposite side of the reversible structure 2512 which the consumer or user can flip to if and when desired. The cover 2520 may be a retrofit cover that fits over an existing portion or cover of the phone or may be integrated into the existing portion of cover of the phone as manufactured.

It should be understood that in alternate embodiments the reversible structure may be made up of one or more separate pieces if desired and/or that the reversible structure may be of any shape or, in the case of a multi-piece reversible structure, that the pieces themselves may be of different sizes or shapes. For example, additional exemplary embodiments of a consumer product and reversible structure are illustrated in FIG. 26. For convenience, these embodiments will use latter two digit reference numerals that are similar to those used above when discussing similar components, but with the addition of a prefix "26" to distinguish embodiments. In the form illustrated, the consumer product 2610 is a cover for a tablet computer which has a reversible structure 2612 that is broken into two separate pieces 2612a, 2612b, respectively, in this form, either one or both of the reversible structure pieces 2612a, 2612b can be removed and/or flipped and replaced on the consumer product 2610 as desired. This configuration provides consumers with the ability to mix and match different designs and to make up different designs as he or she may please.

In addition to the above embodiments, it should be understood that several methods are disclosed herein or are incorporated herein by reference for personalizing consumer products. For example, disclosed herein is a method for personalizing consumer products including the steps of providing a reversible structure having a first image on a first side of the reversible structure and a second image that may or may not be different from the first image on a second side of the reversible structure, and installing the reversible structure on the consumer product such that the reversible structure may be alternated between having the first image visible when looking at the consumer product and having the second image visible when looking at the consumer product such that a consumer can readily change between the first and second images as desired.

The method may further include providing a mating portion connected to the consumer product that defines a recess within which at least a portion of the reversible structure is disposed and a release mechanism for assisting in the removal of the reversible structure from the consumer product, and operating the release mechanism to disconnect at least a portion of the reversible structure from the consumer product so that the reversible structure may be grasped and removed from consumer product or removed and replaced on the consumer product so that an alternate image is visible when looking at the consumer product.

It should also be understood that reversible structures like those disclosed herein can be produced in a variety of different ways and using a variety of different business models. For example, reversible structures having unique designs on the opposite sides thereof can be manufactured and sold using traditional business models. Alternatively, forecasting business models may be used to create and sell reversible structures with unique designs in limited quantities or runs. In yet other forms, on-demand customization business models may be used to create and sell reversible structures with unique designs as well.

With respect to on-demand customization, such reversible structures may be made and sold using either an "out of box" business model or an "in box" business model as described in U.S. patent application Ser. No. 13/103,997, filed May 9, 2011 and entitled "Systems and Methods of On Demand Manufacturing of Customized Products", and U.S. Provisional Patent Application No. 61/332,745, filed May 7, 2010 and having the same title, which are both incorporated herein by reference. In either model a software management platform, or on-demand platform, may be provided that performs many of the functions described herein. An example of an on-demand platform primarily suited for the out of box model is described in U.S. patent application Ser. No. 11/935,382, filed Nov. 5, 2007 and entitled "Order Fulfillment and Content Management Systems and Methods", published as US Publication No. 2008/0154750, which is incorporated herein by reference.

While many embodiments described herein or incorporated herein by reference are primarily directed to the out of box model, one or more elements of the on-demand platform may also be applicable in the inbox model. Examples of pressure sensitive film, adhesive covers or adhesive materials to be applied to the reversible structure or portions thereof are described in: U.S. patent application Ser. No. 11/726,960, filed Mar. 23, 2007 and entitled "Adhesive Cover for Consumer Devices", published as US Publication No. 2008/0233326; and U.S. patent application Ser. No. 11/759,600, filed Jun. 7, 2007 and entitled "Fishing Lures and Adhesive Cover for Same", published as US Publication No. 2008/0104880, both of which are incorporated herein by reference.

An example of an interactive interface allowing a user to create a virtual design, for example, in creating imagery for application to products, portions thereof, accessories to products such as covers, shells and/or adhesive skins or materials in both the inbox and out of box models, is described in U.S. patent application Ser. No. 12/267,527, filed Nov. 7, 2008 and entitled "Customizing Print Content", published as US Publication No. 2009/0122329, which is incorporated herein by reference.

An example of a path creation utility for use within an interactive image editor useful to allow a user to create customized image content by overlaying one or more images upon one or more background images to create or define a selected portion of the image content is described in U.S. patent application Ser. No. 12/684,781, filed Jan. 8, 2010 and entitled "Path Creation Utility for Image Editor", which is incorporated herein by reference. One or more of the processes and systems described in one of more of these patent documents may be applied in one or more embodiments of processes implementing various inbox models and/or out of box models such as those described herein.

Figure 22:
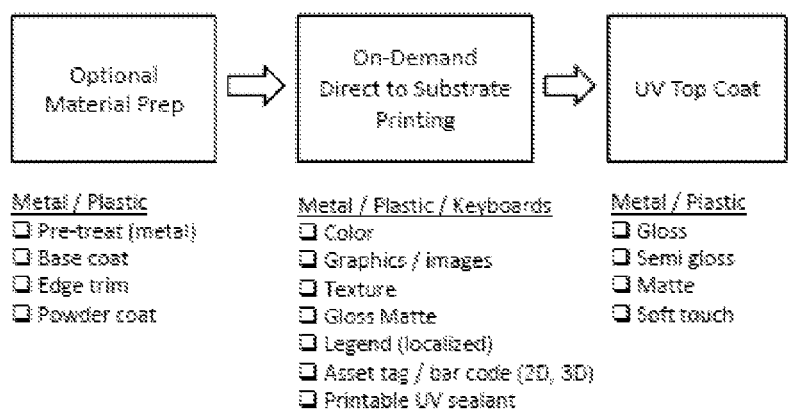
FIG. 22 is a diagram illustrating various selectable features that may be specified by a consumer or an end user when placing an order for a customized reversible structure in accordance with at least one embodiment of the invention.

With respect to on-demand customization, FIG. 22 illustrates a diagram of various selectable features that may be specified by an end-user when placing an order for a personalized reversible structure or that may be specified by an OEM or other entity when setting up a catalog entry for an available and pre-approved set of customized imagery for later selection by an end customer in accordance with one embodiment. This diagram is not meant to be an exhaustive list of all selectable features, and may further include other features or parameter selections described herein. Optional material preparation parameters for metal or plastic parts include a pre-treatment (typically for metal), base coat, edge trim and/or powder coat. On demand direct to surface substrate printing options for metal or plastic parts, including keyboards, include color, graphics/images, texture (e.g., laser etched texture, topographical texture, printed texture through selective application of print layers), gloss matte, legend (localized), asset tag/barcode (either 2D or 3D barcode), and/or printable UV sealant UV topcoat options for metal or plastic parts include gloss, semi gloss, matte and/or soft touch. It is understood that any other options such as described herein may also be included such as text, size, font, language, transparency, etc.

In still other forms, the reversible structure may take the form of many different shapes and sizes. For example, in some embodiments, the consumer device may include reversible plates, coins or the like that can be rotated to alternate between images to allow the consumer or end user to choose between various images. In addition, the reversible structures may be two dimensional, three dimensional and/or a combination of both. For example such reversible structures are disclosed in pending U.S. Provisional Patent Application No. 61/495,374 filed Jun. 9, 2011 and entitled "Method and Apparatus for Personalizing Consumer Products", which is incorporated herein by reference.

Several embodiments provide various devices and methods of personalizing an appearance of a consumer product. In some embodiments, a device for personalizing an appearance of a consumer product comprises a design element having a substrate having a first image applied on a first side of the substrate; and a connector in contact with the design element, wherein the connector has an opening and is configured to be removably connected to the consumer product, wherein at least a portion of the first image is directly visible to a user via the opening. In one form, the connector is configured such that the at least the portion of the first image is directly visible to the user via the opening without passing through a transparent intermediary structure separate from the design element. In another form, the connector has a shape configured to wrap around at least two sides of the consumer product and not covering a display screen on a front surface of the consumer product, wherein the opening is formed on a portion of connector such that the opening is adjacent at least a portion of a back surface of the consumer product. In a further thrill, the design element substantially fits within the opening and blocks view of the back surface of the consumer product in order to alter an appearance of the consumer product. In a further form, the opening comprises a single opening adjacent a majority of the back surface of the consumer product, wherein the design element is configured to fit within the single opening and block view of the majority of the back surface of the consumer product. In a further form, the opening comprises a plurality of openings adjacent the back surface of the consumer product, wherein the first image of the design element comprises multiple separate images, wherein at least a portion of each of the multiple separate images is viewable via a respective one of the plurality of openings. In a further form, the opening comprise a plurality of parallel openings separated by slats extending from one side of the connector to another side of the connector, wherein the first image is at least partially directly visible to the user via the plurality of parallel openings.

In a further form, an outer surface of the design element is flush with an outer edge of the connector at the at least one opening. In another form, the connector covers at least a portion of the consumer product and comprises at least one of a frame, a bumper, and a protective case. In a further form, the design element has a first alignment member and the connector has a corresponding alignment member such that the design element fits within the opening in a given orientation. In another form, the second alignment member is configured to prevent other design elements not having a corresponding alignment member from fitting within the opening. In another form, one of the first alignment member and the second alignment member comprises a tab, a protrusion, a knob, or a guide, and wherein the other of the first alignment member and the second alignment member comprises a notch, a kerf, a recess, or a groove. In another form, the design element includes a cutout portion configured to allow user access to a functional feature of the consumer product, e.g., a a camera feature.

In another form, the design element includes an element opening to allow a second design element to be visible via the element opening. In another form, the design element has an asymmetric peripheral shape and the opening of the connector has a corresponding asymmetric shape such that the design element fits within the opening in a given orientation. In another thin, the design element has a peripheral shape and the opening has a corresponding shape such that the design element can be rotated and fit within the opening in at least two orientations. In another form, wherein the design element further comprises a first alignment member and the connector further comprises a corresponding alignment member such that the design element fits within the opening in the at least two orientations. In another form, the substrate of the design element has second image applied an a second side of the substrate, wherein design element is configured to be flippable by the user to contact the connector such that one of the first image or the second image is directly visible to the user via the opening when the connector is removably connected to the consumer product. In another form, the design element further comprises a first alignment member and the connector further comprises a corresponding alignment member such that the design element fits within the opening in a given orientation with either the first side or the second side facing outward and visible to the user via the opening.

In another form, the design element comprises a three dimensional element configured to fit through the opening in the connector and having a height extending above an outer dimension of the opening. In another form, the design element further comprises a plate substrate having an element opening and a three dimensional element configured to fit through the element opening and having a height extending above an outer dimension of the plate substrate. In another form. In another form, the first image of the substrate of the design element comprises one or more of a chemical film treatment layer, a paint layer, a print layer and a finish layer. In another form, the first image comprises one or more of color, text, photographic elements, graphic images, designs, patterns, artwork elements and logo elements. In another form, the design element has a stepped configuration such that a lip thereof extends underneath a periphery of the opening and the design element is held in position against the consumer product when the connector is removably connected to the consumer product. In another form, the design element may be interchangeably selected from one of a plurality of design elements each having a separate image applied thereto in order to provide a different appearance, such that the user may alter the appearance of the consumer product in the selection of the design element used with the connector. In another form, the substrate of the design element is substantially rigid. In another form, the substrate of the design element is flexible. In another form, the design element comprises wood, metal, glass, plastic, vinyl, fabric, natural fibrous material, synthetic fibrous material or any combination thereof. In another form, the connector is configured to removably connect to the consumer device, the consumer device comprising a cellular telephone, a tablet-style computer device, a notebook-style computer, or an electronic device having a display screen. In another form, the device further comprises the consumer product removably connected to the connector, the consumer product comprising a cellular telephone, a tablet-style computer device, a notebook-style computer or an electronic device having a display screen.

In some embodiments, a device for personalizing an appearance of an electronic consumer product comprises: a bumper having a from opening and a back opening, the bumper having a shape configured to wrap around at least two sides of the electronic consumer product, wherein the front opening is configured to allow a display screen on a front surface of the electronic consumer product to be directly viewed therethrough, wherein the back opening is configured to be adjacent to at least a portion of a back surface of the electronic consumer product, wherein the bumper is configured to be removably connected to the electronic consumer product at least partially covering, the at least two sides of the electronic consumer product; and a plate baying a first image applied on a first side of the plate, wherein the plate is configured to be removably received within the back opening and held in position against the back surface of the electronic consumer device by a periphery edge of the bumper at a periphery of the back opening when the bumper is removably connected to the electronic consumer product, wherein the plate is substantially rigid, wherein the first image comprises a print layer, wherein an outer surface of the plate is flush with an outer surface of the bumper; wherein at least a portion of the first image is directly visible to a user via the back opening; and wherein the plate comprises a first alignment member and the bumper comprises a corresponding alignment member such that the plate fits within the opening in as given orientation. In one form, the bumper is configured to removably connect to at least two sides of the electronic consumer device, where the at least two sides are substantially perpendicular to the back surface of the electronic consumer product. In another form, the bumper is configured to removably connect to at least two sides of the electronic consumer device, where the at least two sides join the front surface and the back surface, the at least two sides curve into the back surface of the electronic consumer product. In another form, the electronic consumer product comprises a cellular telephone. In another form, the electronic consumer product comprises a tablet-style computer device. In another form, the plate may be interchangeably selected from one of a plurality of plates each having a separate image applied, thereto in order to provide a different appearance, such that the user may alter the appearance of the electronic consumer product in the selection of the plate used with the bumper.

In some embodiments, method of personalizing a consumer product comprises: providing a design element having a substrate having a first image applied on a first side of the substrate; and removably connecting a connector having an opening to the consumer product such that the design element is positioned between a portion of the consumer product and a portion of the connector, wherein at least a portion of the first image is directly visible to a user via the opening.

In some embodiments, a reversible structure for connecting to a consumer product to personalize the consumer product is provided, the structure comprising: a substrate having a first side and a second side; a first image located on the first side of the substrate; a second image located on the second side of the substrate that, together with the first image, forms the substrate into the reversible structure for connecting to the consumer product; and a connecting structure for releasably connecting the reversible structure to the consumer product so that the substrate can be connected to the consumer product in a first orientation wherein the first image is visible when looking at the consumer product, or removed, reversed and re-connected to the consumer product in a second orientation wherein the second image is visible when looking at the consumer product. In one form, the first image and the second image comprise at least one of a chemical film treatment layer, a paint layer, a print layer and a finish layer per side of the substrate. In a further form, the first image and the second image comprise print and finish layers on each side of the substrate and the respective print layers are ink jet printed onto respective sides of the substrate to allow for high resolution image pouting on both sides of the substrate. In another form, the first image and the second image comprise paint, print, and finish layers on each side of the substrate, with the respective paint layers being applied directly to respective sides of the substrate, the respective print layers being applied directly to respective paint layers, and the respective finish layers being applied directly to respective print layers. In another form, first image and the second image comprise chemical film treatment, paint, print, and finish layers on each side of the substrate, with the respective chemical film treatment layers being applied directly to respective sides of the substrate, the respective paint layers being applied directly to respective chemical film treatment layers, the respective print layers being applied directly to respective paint layers, and the respective finish layers being applied directly to respective print layers. In some embodiments, the connecting structure comprises a fastener coupled to the reversible structure for releasably connecting the reversible structure to the consumer product. In a further form, the fastener comprises as magnetic material disposed within the substrate that is magnetically attracted to a corresponding magnetic material located on or in at least a portion of the consumer product to which the reversible structure is to be attached such that the reversible structure can be secured to the consumer product with either the first image or the second image visible when looking at the consumer product. In another form, the substrate comprises a dual sided piece of leather with the magnetic material embedded between the sides of the piece of leather and the first image appearing on the first side of the piece of leather and the second image appearing on the second side of the piece of leather. In some embodiments, the structure further comprising a consumer product having a mating portion to which the reversible structure is connected. In one form, the mating portion of the consumer product is at least one of a panel, a side member, housing portion, a cover or a lid and the reversible structure connects to the mating portion in a first orientation wherein the first image is visible when looking at the consumer product and a second orientation when the reversible structure connects to the mating portion in a second orientation wherein the second image is visible when looking at the consumer product. In another form, the mating portion defines a recess within which at least a portion of the reversible structure is positioned to connect the reversible structure to the consumer product. In another form, the reversible structure has a specific shape and the recess defined by the mating portion has a shape that corresponds to the specific shape of the reversible structure to help orientate the reversible structure on the consumer product. In a further form, the specific shape of the reversible structure and the corresponding shape of the mating portion recess are designed so that the reversible structure can only be connected to the mating portion in one orientation per side to ensure that the reversible structure is positioned on the mating structure in a right-side-up manner. In another form, the mating portion of the consumer product is a cover or lid that attaches to at least a portion of the consumer product, the cover or lid having a magnetic material disposed therein that attracts the corresponding magnetic material of the reversible structure and defining a recess within which the reversible structure is disposed to form a generally smooth outer surface of the consumer product. In some embodiments, the cover or lid snap or friction fits onto an "A cover" of a laptop computer and includes a mechanism for assisting in the removal of the reversible structure from the recess defined by the cover or lid. In one form, at least one of the reversible structure and the mating portion have a mechanism for assisting in the removal of the reversible structure from consumer product. In another form, the mechanism is a release mechanism connected to the consumer product and movable between a first position wherein the reversible structure rests against the mating portion of the consumer product and a second position wherein at least a portion of the reversible structure is spaced apart from at least a portion of the consumer product to provide a gap between the reversible structure and the consumer product that a user ma use to help remove the reversible structure from the consumer product. In another form, the mechanism is a release mechanism normally biased in a position that allows the reversible structure to be connected to the consumer product in an uninterrupted manner and can be moved to a second position wherein the reversible structure is connected to the consumer product but in an interrupted, manner and the interruption assists in releasing the reversible structure from connection to the consumer product. In some embodiments, the first image and the second image are created using on-demand customization.

In some embodiments, a method of personalizing a consumer product is provide, the method comprising: providing a reversible structure having a first image on a first side of the reversible structure and a second image on a second side of the reversible structure, and connecting the reversible structure on the consumer product such that the reversible structure may be alternated between having the first image visible when looking at the consumer product and having the second image visible when looking at the consumer product such that a consumer can readily change between the first and second images as desired. In one form, the method further comprises providing a mating portion connected to the consumer product that defines a recess within which at least a portion of the reversible structure is disposed and a release mechanism for assisting in the removal of the reversible structure from the consumer product; and operating the release mechanism to disconnect at least a portion of the reversible structure from the consumer product so that the reversible structure may be grasped and removed from consumer product or removed and replaced on the consumer product so that an alternate image is visible when looking at the consumer product.

While the invention herein disclosed has been described by means of specific embodiments, examples and applications thereof, numerous modifications and variations could be made thereto by those skilled in the art without departing from the scope of the invention set forth in the claims.

What is claimed is:

1. A device for personalizing an appearance of a consumer product comprising:
   a design element having a substrate having a first image applied on a first side of the substrate;
   and a connector in contact with the design element, wherein the connector has an opening and is configured to be removably connected to the consumer product, wherein at least a portion of the first image is directly visible to a user via the opening, and wherein the connector as a shape configured to wrap around at least two sides of the consumer product and not cover a display screen on a front surface of the consumer product wherein the opening is formed on a portion of connector such that the opening is adjacent at least to a portion of a back surface of the consumer product.

2. The device of claim 1 wherein the connector is configured such that the at least the portion of the first image is directly visible to the user via the opening without passing through a transparent intermediary structure separate from the design element.

3. The device of claim 1 wherein the design element substantially fits within the opening and blocks view of the back surface of the consumer product in order to alter an appearance of the consumer product.

4. The device of claim 1 wherein the opening comprises a single opening adjacent to a majority of the back surface of the consumer product, wherein the design element is configured to fit within the single opening and block view of the majority of the back surface of the consumer product.

5. The device of claim 1, wherein the opening comprises a plurality of openings adjacent to the back surface of the consumer product, wherein the first image of the design element comprises multiple separate images, wherein at least a portion of each of the multiple separate images is viewable via a respective one of the plurality of openings.

6. The device of claim 1 wherein the opening comprise a plurality of parallel openings separated by slats extending from one side of the connector to another side of the connector, wherein the first image is at least partially directly visible to the user via the plurality of parallel openings.

7. The device of claim 1 wherein an outer surface of the design element is flush with an outer edge of the connector at the at least one opening.

8. The device of claim 1 wherein the connector covers at least a portion of the consumer product and comprises at least one of a frame, a bumper, and a protective case.

9. The device of claim 1 wherein the design element has a first alignment member and the connector has a corresponding alignment member such that the design element fits within the opening in a given orientation.

10. The device of claim 9 wherein the second alignment member is configured to prevent other design elements not having a corresponding alignment member from fining, within the opening.

11. The device of claim 9 wherein one of the first alignment member and the second alignment member comprises a tab, a protrusion, a knob, or a guide, and wherein the other of the first alignment member and the second alignment member comprises a notch, a kerf, a recess, or a groove.

12. The device of claim 1 wherein the design element includes a cutout portion configured to allow user access to a functional feature of the consumer product.

13. The device of claim 12 wherein the functional feature comprises a camera feature.

14. The device of claim 1 wherein the design element includes an element opening to allow a second design element to be visible via the element opening.

15. The device of claim 1 wherein the design element has an asymmetric peripheral shape and the opening of the connector has a corresponding asymmetric shape such that the design element fits within the opening in a given orientation.

16. The device of claim 1 wherein the design element has a peripheral shape and the opening has a corresponding shape such that the design element can be rotated and fit within the opening in at least two orientations.

17. The device of claim 16 wherein the design element further comprises a first alignment member and the connector further comprises a corresponding alignment member such that the design element fits within the opening in the at least two orientations.

18. The device of claim 1 wherein the substrate of the design element has second image applied on a second side of the substrate, wherein design element is configured to be flippable by the user to contact the connector such that one of the fast image or the second image is directly visible to the user via the opening when the connector is removably connected to the consumer product.

19. The device of claim 18 wherein the design element further comprises a first alignment member and the connector further comprises a corresponding alignment member such that the design element fits within the opening in a given orientation with either the first side or the second side facing outward and visible to the user via the opening.

20. The device of claim 1 wherein the design element comprises a three dimensional element configured to fit through the opening in the connector and having a height extending above an outer dimension of the opening.

21. The device of claim 1 wherein the design element further comprises a plate substrate having an element opening and a three dimensional element configured to fit through the element opening and having a height extending above an outer dimension of the plate substrate.

22. The device of claim 1 wherein the first image of the substrate of the design element comprises one or more of a chemical film treatment layer, a paint layer, a print layer and a finish layer.

23. The device of claim 1 wherein the first image comprises one or more of color, text, photographic elements, graphic images, designs, patterns, artwork elements and logo elements.

24. The device of claim 1 wherein the design element has a stepped configuration such that a lip thereof extends underneath a periphery of the opening and the design element is held in position against the consumer product when the connector is removably connected to the consumer product.

25. The device of claim 1 wherein the design element may be interchangeably selected from one of a plurality of design elements each having a separate image applied thereto in order to provide a different appearance, such that the user may alter the appearance of the consumer product in the selection of the design element used with the connector.

26. The device of claim 1 wherein the substrate of the design element is substantially rigid.

27. The device of claim 1 wherein the substrate of the design element is flexible.

28. The device of claim 1 wherein the design element comprises wood, metal, glass, plastic, vinyl, fabric, natural fibrous material, synthetic fibrous material or any combination thereof.

29. The device of claim 1 wherein the connector is configured to removably connect to the consumer device, the consumer device comprising a cellular telephone, a tablet-style computer device, a notebook-style computer, or an electronic device having a display screen.

30. The device of claim 1 further comprising the consumer product removably connected to the connector, the consumer product comprising a cellular telephone, a tablet-style computer device, a notebook-style computer or an electronic device having a display screen.

31. A device for personalizing an appearance of an electronic consumer product comprising:
a bumper having a front opening and a back opening, the bumper having a shape configured to wrap around at least two sides of the electronic consumer product, wherein the front opening is configured to allow a display screen on a front surface of the electronic consumer product to be directly viewed therethrough, wherein the back opening is configured to be adjacent to at least a portion of a back surface of the electronic consumer product, wherein the bumper is configured to be removably connected to the electronic consumer product at least partially covering the at least two sides of the electronic consumer product; and
a plate having a first image applied on a first side of the plate, wherein the plate is configured to be removably received within the back opening and held in position against the back surface of the electronic consumer device by a periphery edge of the bumper at a periphery of the back opening when the bumper is removably connected to the electronic consumer product, wherein the plate is substantially rigid, wherein the first image comprises a print layer, wherein an outer surface of the plate is flush with an outer surface of the bumper;
wherein at least a portion of the first image is directly visible to a user via the back opening; and
wherein the plate comprises a first alignment member and the bumper comprises a corresponding alignment member such that the plate fits within the opening in a given orientation.

32. The device of claim 31 wherein the bumper is configured to removably connect to at least two sides of the electronic consumer device, where the at least two sides are substantially perpendicular to the back surface of the electronic consumer product.

33. The device of claim 31 wherein the bumper is configured to removably connect to at least two sides of the electronic consumer device, where the at least two sides join the front surface and the back surface, the at least two sides curve into the back surface of the electronic consumer product.

34. The device of claim 31 wherein the electronic consumer product comprises a cellular telephone.

35. The device of claim 31 wherein the electronic consumer product comprises a tablet-style computer device.

36. The device of claim 31 wherein the plate may be interchangeably selected from one of a plurality of plates each having a separate image applied thereto in order to provide a different appearance, such that the user may alter the appearance of the electronic consumer product in the selection of the plate used with the bumper.

37. A method of personalizing a consumer product comprising:
providing a design element having a substrate having a first image applied on a first side of the substrate; and
removably connecting a connector having an opening to the consumer product such that the design element is positioned between a portion of the consumer product and a portion of the connector, wherein the connector has a shape configured to wrap around at least two sides of the consumer product and not cover a display screen on a front surface of the consumer product wherein the opening is formed on a portion of connector such that the opening is adjacent at least to a portion of a back surface of the consumer product, and wherein at least a portion of the first image is directly visible to a user via the opening.

* * * * *